US010556622B1

(12) United States Patent
Calliari et al.

(10) Patent No.: US 10,556,622 B1
(45) Date of Patent: Feb. 11, 2020

(54) FRAME ASSEMBLY FOR A VEHICLE

(71) Applicant: Oshkosh Defense, LLC, Oshkosh, WI (US)

(72) Inventors: David Calliari, Oshkosh, WI (US); Cody Bauer, Oshkosh, WI (US); Bjoern Gillstroem, Oshkosh, WI (US); Jonathan King, Oshkosh, WI (US); Mark Chapin, Oshkosh, WI (US); Brian Koppa, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 15/957,505

(22) Filed: Apr. 19, 2018

Related U.S. Application Data

(60) Provisional application No. 62/487,819, filed on Apr. 20, 2017, provisional application No. 62/487,835, filed on Apr. 20, 2017, provisional application No. 62/487,705, filed on Apr. 20, 2017.

(51) Int. Cl.

| | |
|---|---|
| *B62D 21/03* | (2006.01) |
| *B60D 1/48* | (2006.01) |
| *B62D 27/06* | (2006.01) |
| *B62D 24/00* | (2006.01) |
| *B62D 33/063* | (2006.01) |
| *B60K 17/344* | (2006.01) |
| *B60K 17/04* | (2006.01) |
| *B60K 5/00* | (2006.01) |
| *B62D 65/02* | (2006.01) |
| *B62D 33/06* | (2006.01) |

(52) U.S. Cl.
CPC ............. *B62D 21/03* (2013.01); *B60D 1/488* (2013.01); *B60K 5/00* (2013.01); *B60K 17/04* (2013.01); *B60K 17/344* (2013.01); *B62D 24/00* (2013.01); *B62D 27/06* (2013.01); *B62D 33/06* (2013.01); *B62D 33/063* (2013.01); *B62D 65/02* (2013.01)

(58) Field of Classification Search
CPC ...... B62D 21/03; B62D 33/06; B62D 33/063; B62D 65/02; B62D 24/00; B62D 27/06; B60K 5/00; B60K 17/04; B60K 17/344; B60D 1/488
See application file for complete search history.

(56) References Cited

U.S. PATENT DOCUMENTS

| | | | |
|---|---|---|---|
| 7,896,606 B2 | 3/2011 | Ethington et al. | |
| 8,215,892 B2 | 7/2012 | Calliari | |
| 8,723,948 B2 | 5/2014 | Gotz et al. | |

(Continued)

*Primary Examiner* — Erez Gurari
(74) *Attorney, Agent, or Firm* — Foley & Lardner LLP

(57) ABSTRACT

A frame assembly for a vehicle includes a frame having a first end and an opposing second end. The frame has a first frame rail defining a first channel and a second frame rail defining a second channel. The second frame rail is spaced from the first frame rail. The frame assembly further includes a cross member assembly coupled to the first end of the frame and extending between the first frame rail and the second frame rail. The cross member assembly has a first end plate positioned within, and releasably received by, the first channel of the first frame rail; a second end plate positioned within, and releasably received by, the second channel of the second frame rail; and a cross member extending between the first end plate and the second end plate.

19 Claims, 43 Drawing Sheets

(56) References Cited

U.S. PATENT DOCUMENTS

| | | |
|---|---|---|
| 8,813,981 B2 | 8/2014 | Ethington |
| 9,033,165 B2 | 5/2015 | Aus et al. |
| 9,139,409 B2 | 9/2015 | Perron |
| 9,938,121 B2 | 4/2018 | Aus et al. |
| 2009/0151483 A1* | 6/2009 | Kim ............... B62D 33/063 |
| | | 74/3 |
| 2016/0121947 A1* | 5/2016 | Lyle ............... E02F 3/325 |
| | | 180/306 |
| 2016/0122973 A1* | 5/2016 | Lyle ............... E02F 3/301 |
| | | 414/687 |

* cited by examiner

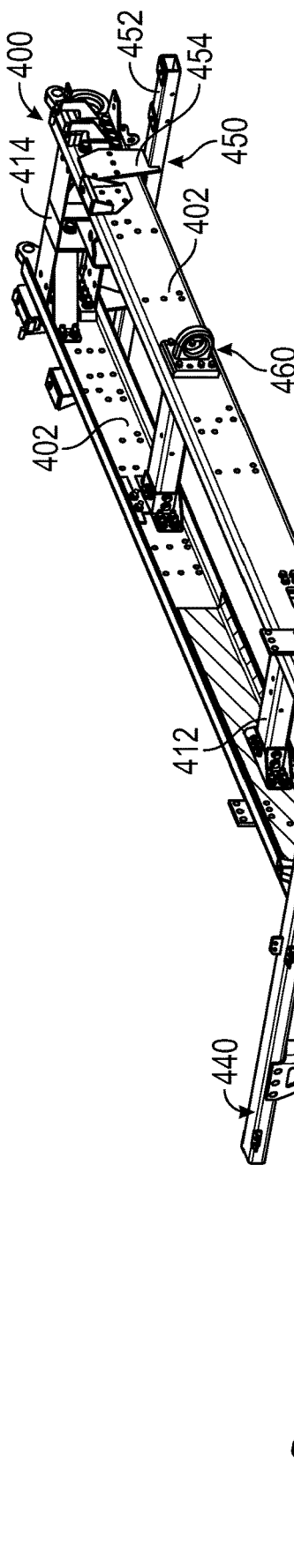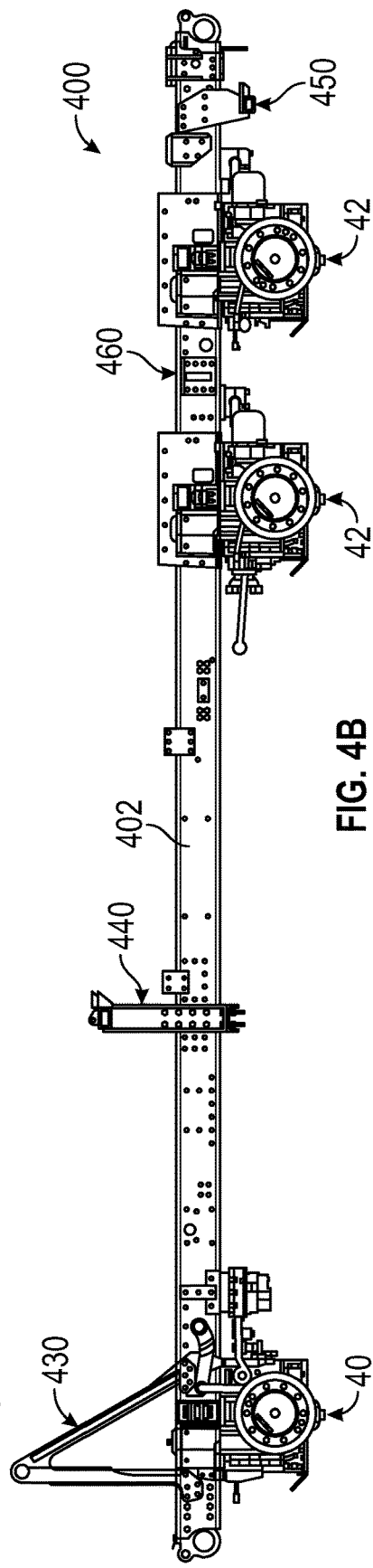
FIG. 4A
FIG. 4B

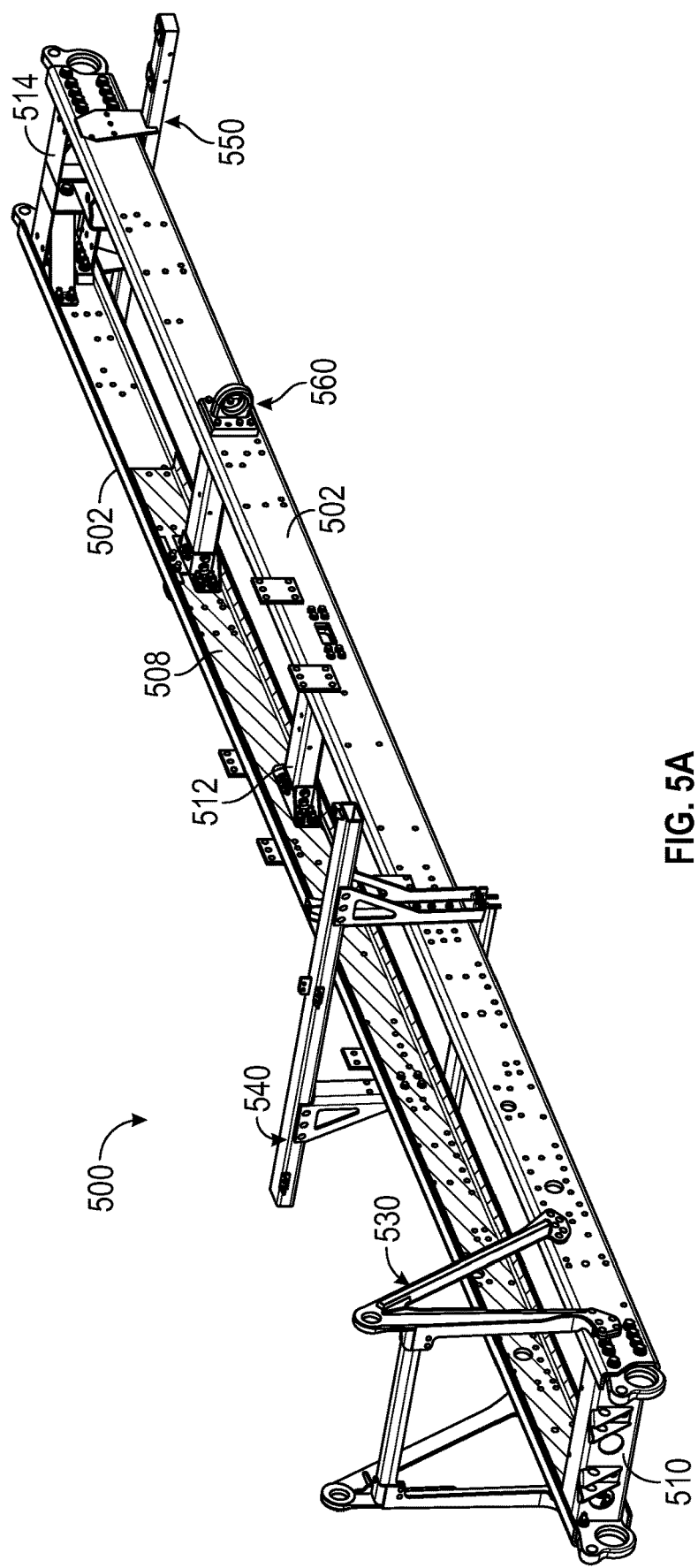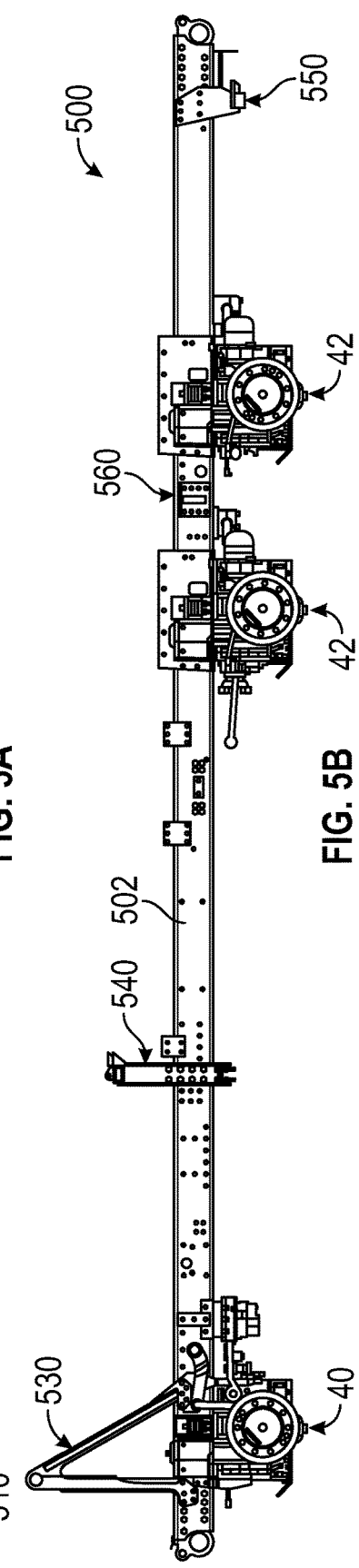
FIG. 5A
FIG. 5B

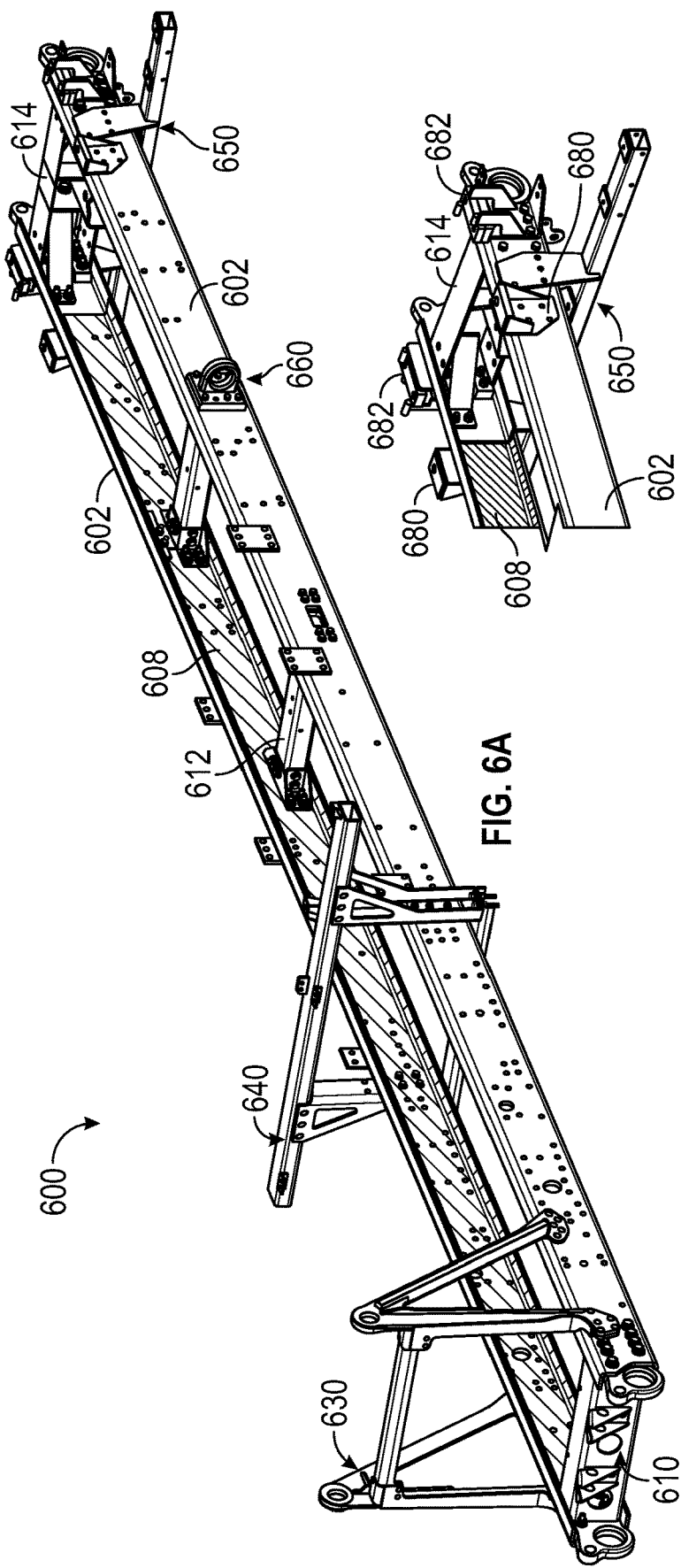
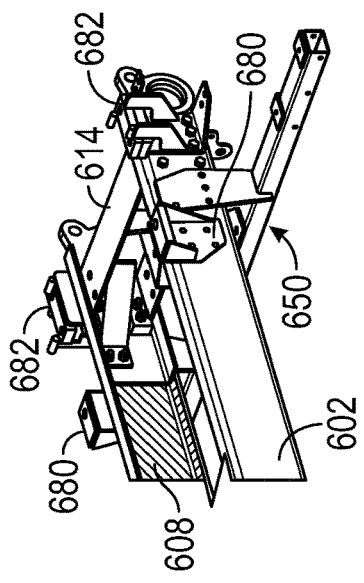
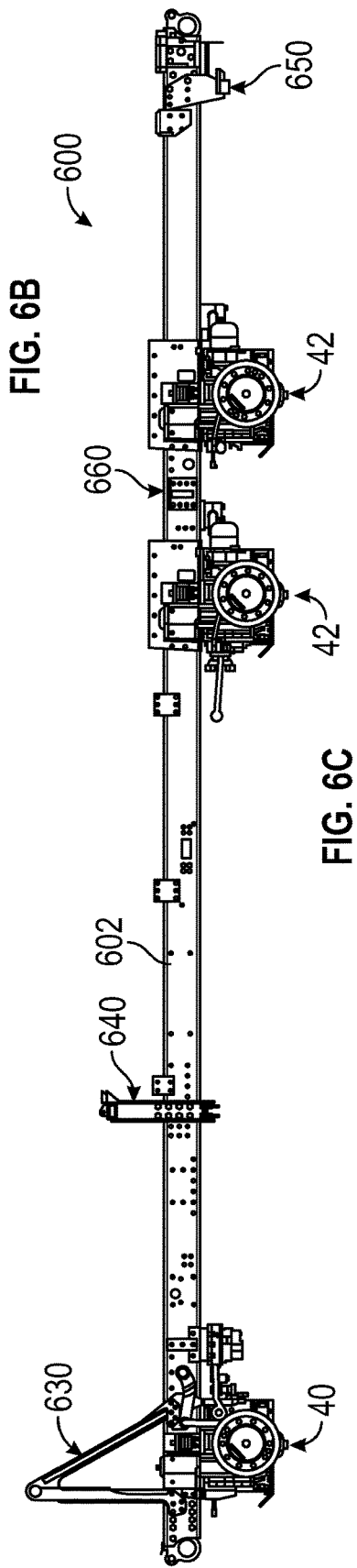
FIG. 6A
FIG. 6B
FIG. 6C

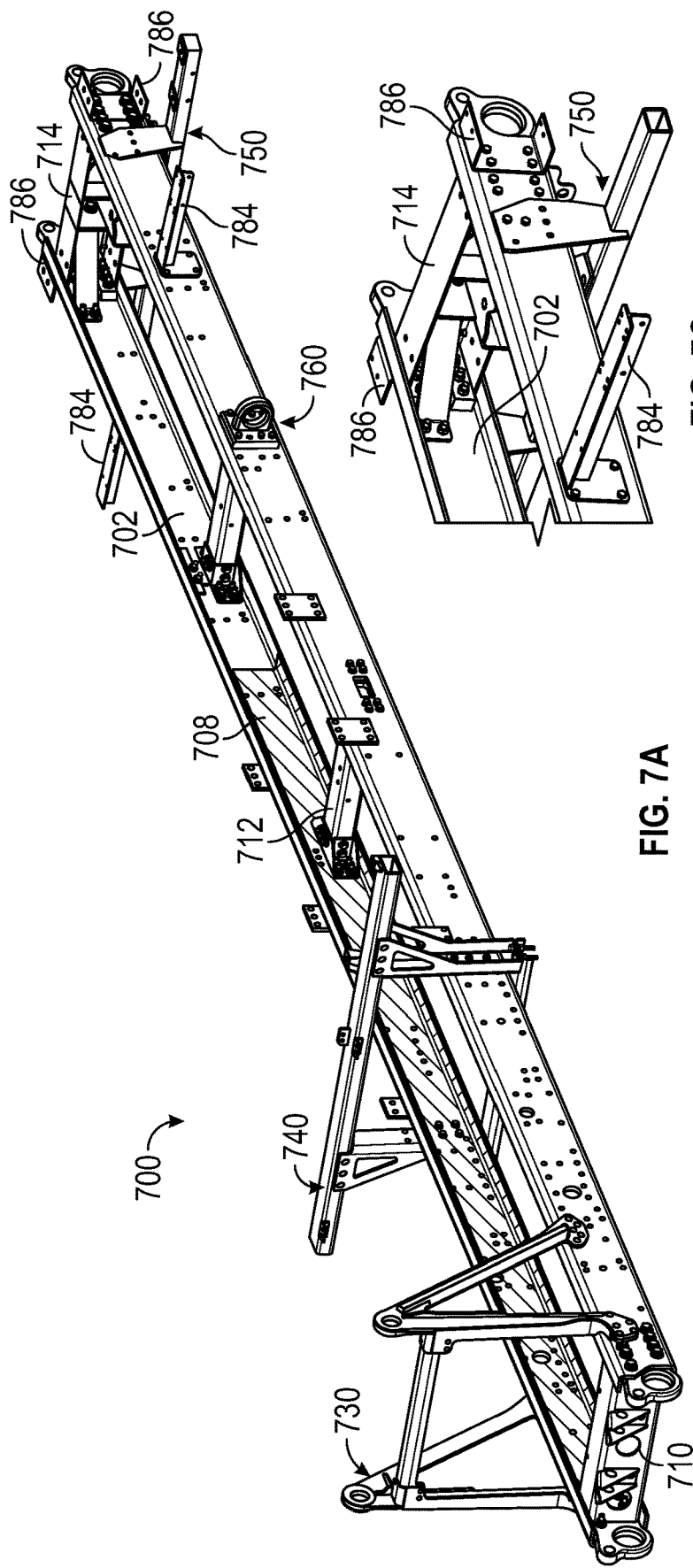
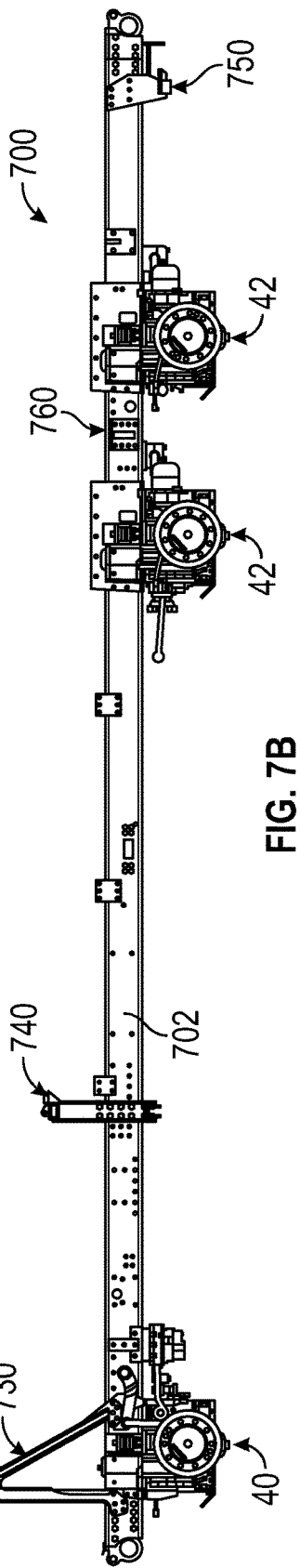
FIG. 7A
FIG. 7C
FIG. 7B

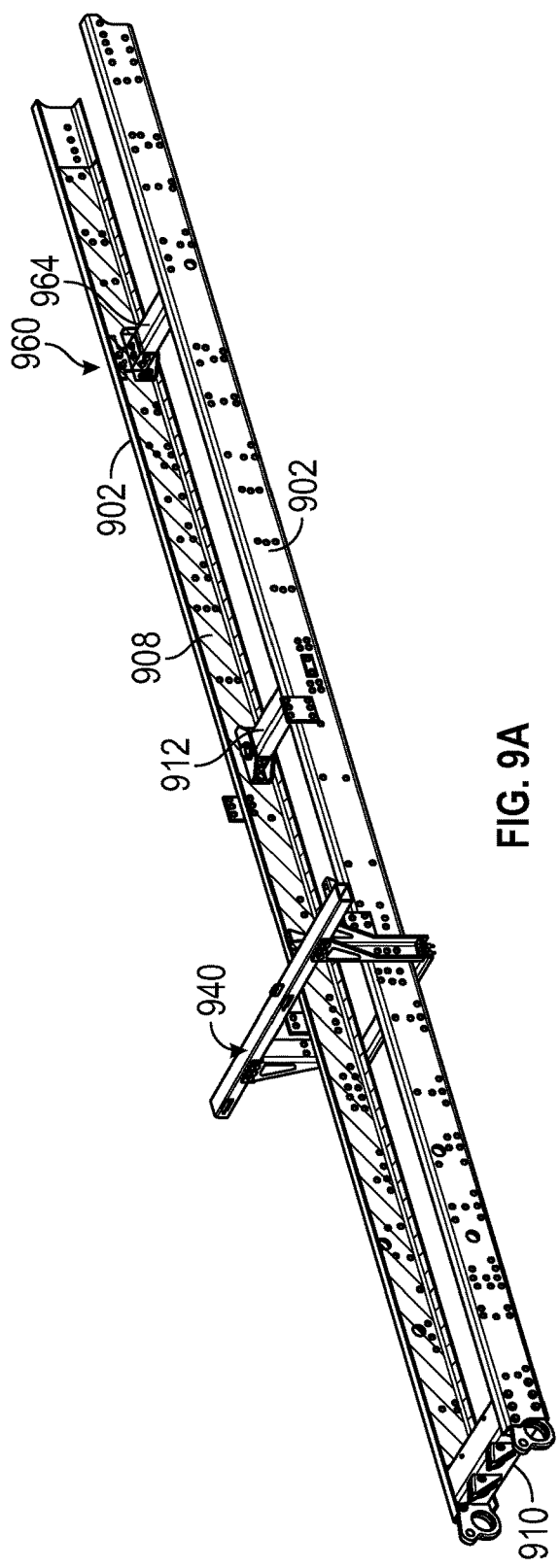
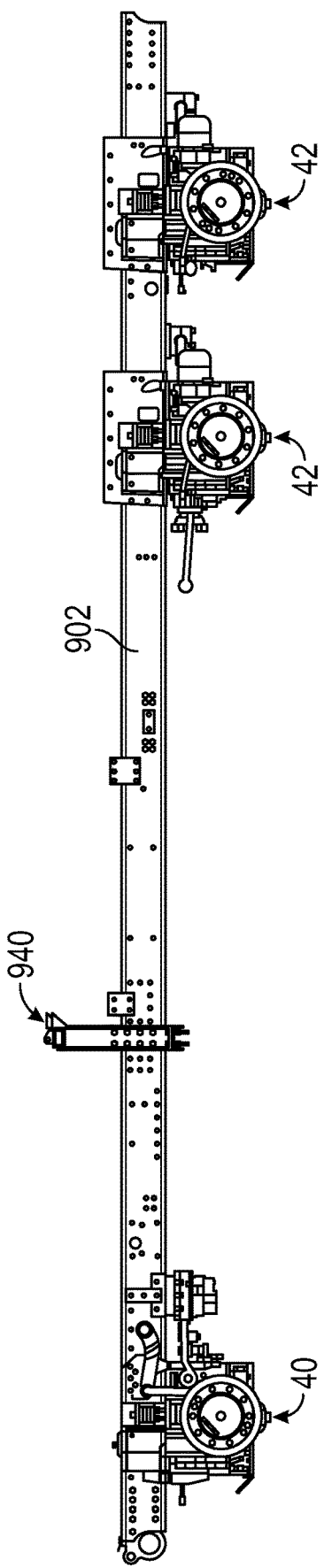
FIG. 9A
FIG. 9B

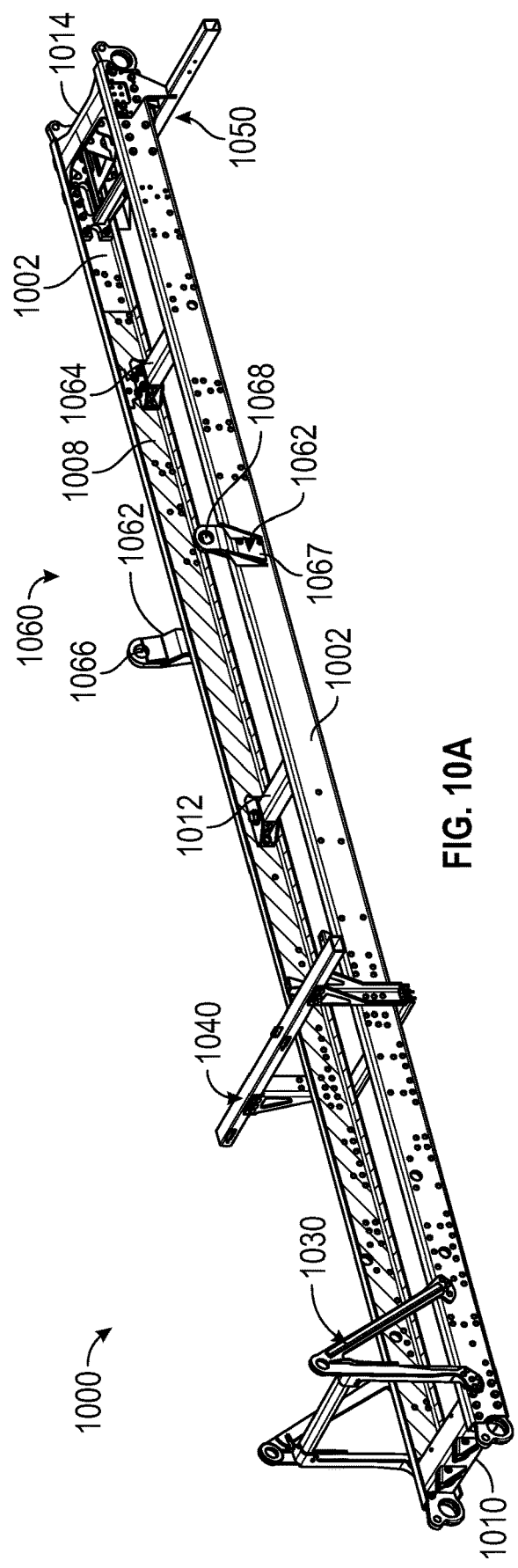
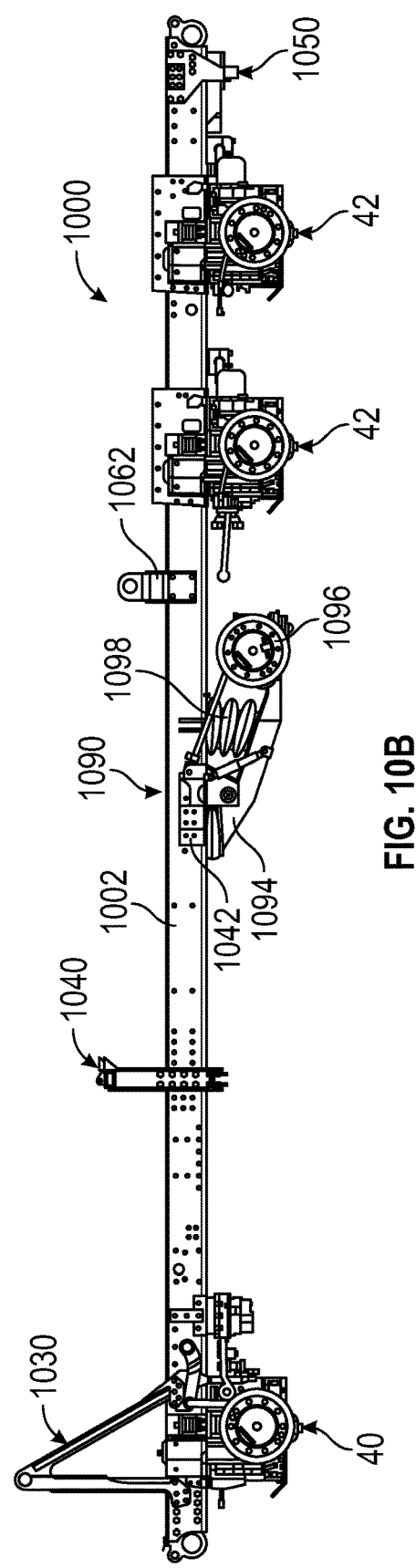
FIG. 10A
FIG. 10B

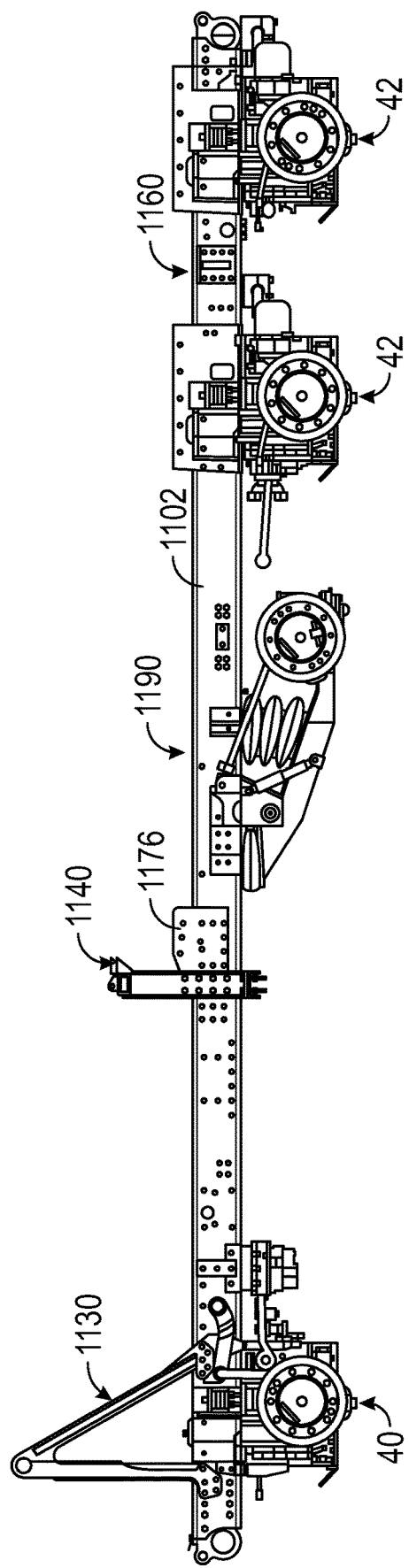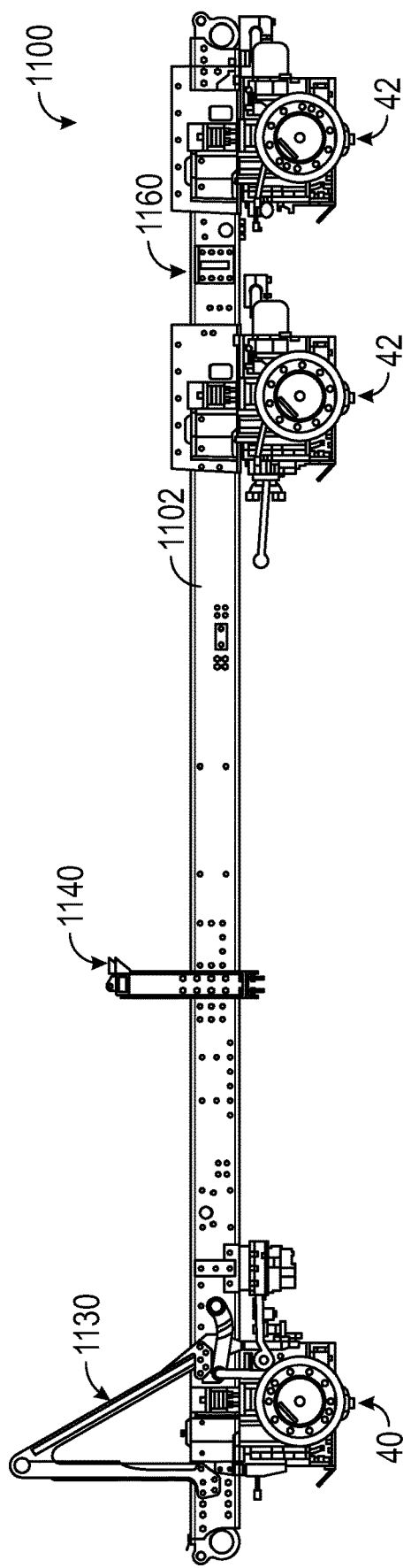
FIG. 11B
FIG. 11C

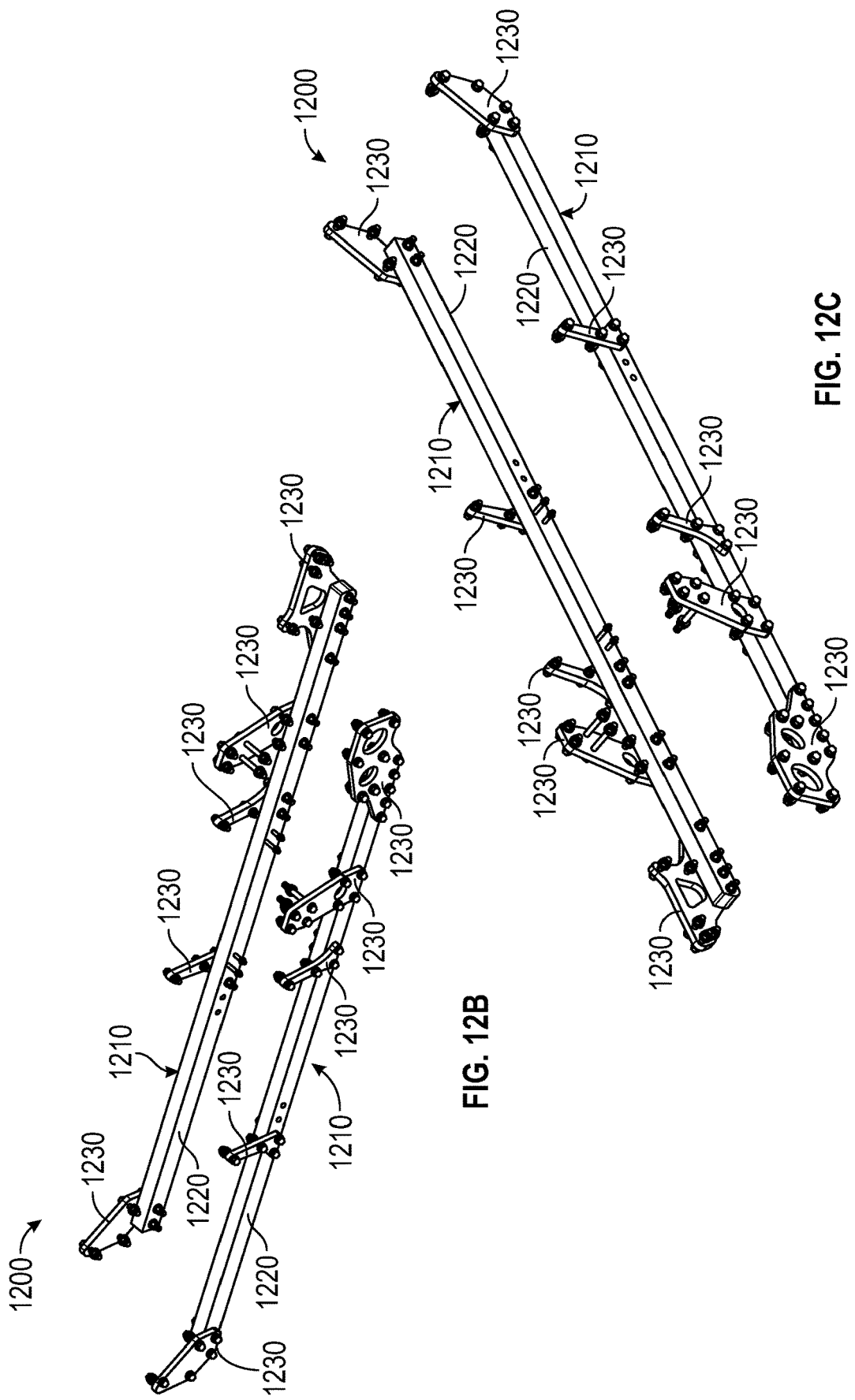

FRAME ASSEMBLY FOR A VEHICLE

CROSS-REFERENCE TO RELATED PATENT APPLICATIONS

This application claims the benefit of U.S. Provisional Application No. 62/487,705, filed Apr. 20, 2017, U.S. Provisional Application No. 62/487,819, filed Apr. 20, 2017, and U.S. Provisional Application No. 62/487,835, filed Apr. 20, 2017, all of which are incorporated herein by reference in their entireties.

BACKGROUND

Vehicles may have limited ability to be modified to produce vehicle variants suitable for different applications. In some cases, modifying a vehicle to be suitable for a different application may require a significant amount of redesign work to adapt the frame of the vehicle to the application. A frame of a vehicle may support various components of the vehicle including a body assembly, a powertrain, tractive elements, etc. Traditional frames lack modularity and have to be designed for a specific application or vehicle. Further, vehicles may have limited ability to support additional weight. In certain applications, vehicle cabins are required to support substantial loads, such as the weight of armor plating. Some vehicles include a cabin disposed directly above and/or in front of a front axle assembly, such that the front axle assembly supports the vast majority of the cabin weight. The addition of weight to the cabin causes the front axle assembly to support significantly more weight than the rear axle assembly/assemblies.

SUMMARY

One embodiment relates to a frame assembly for a vehicle. The frame assembly includes a frame having a first end and an opposing second end. The frame has a first frame rail defining a first channel and a second frame rail defining a second channel. The second frame rail is spaced from the first frame rail. The frame assembly further includes a cross member assembly coupled to the first end of the frame and extending between the first frame rail and the second frame rail. The cross member assembly has a first end plate positioned within, and releasably received by, the first channel of the first frame rail; a second end plate positioned within, and releasably received by, the second channel of the second frame rail; and a cross member extending between the first end plate and the second end plate.

Another embodiment relates to a vehicle. The vehicle includes a chassis, a rear axle assembly coupled to the chassis, a front axle assembly coupled to the chassis, a cabin coupled to the chassis, and an engine configured drive at least one of the front axle assembly and the rear axle assembly. The cabin has a frontmost surface. The cabin is pivotable relative to the chassis between a lowered position and a raised position. The engine is disposed entirely rearward of the frontmost surface of the cabin. A central axis of the front axle assembly is disposed entirely forward of the frontmost surface of the cabin.

Still another embodiment relates to a method of manufacturing a frame for a vehicle. The method includes providing a longitudinal frame rail having a first end and an opposing second end; coupling a frame liner to an interior surface of the longitudinal frame rail; and coupling a front lift structure to the longitudinal frame rail. A length of the longitudinal frame rail is varied in order to produce different vehicle variants. At least one of a length and a position of the frame liner is varied based on a respective vehicle variant. The front lift structure is positioned in a consistent location relative to the first end of the longitudinal frame rail regardless of the length of the longitudinal frame rail and the respective vehicle variant.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIGS. 4A-4E are various views of a frame structure for a vehicle, according to various exemplary embodiments;

FIGS. 5A and 5B are various views of a frame structure for a vehicle, according to various exemplary embodiments;

FIGS. 6A-6C are various views of a frame structure for a vehicle, according to various exemplary embodiments;

FIGS. 7A-7C are various views of a frame structure for a vehicle, according to various exemplary embodiments;

FIGS. 9A and 9B are various views of a frame structure for a vehicle, according to various exemplary embodiments;

FIGS. 10A-10E are various views of a frame structure for a vehicle, according to various exemplary embodiments;

FIGS. 11A-11C are various views of a frame structure for a vehicle, according to various exemplary embodiments;

FIGS. 12A-12F are various views of a frame reinforcement system, according to various exemplary embodiments;

DETAILED DESCRIPTION

Figure 1:
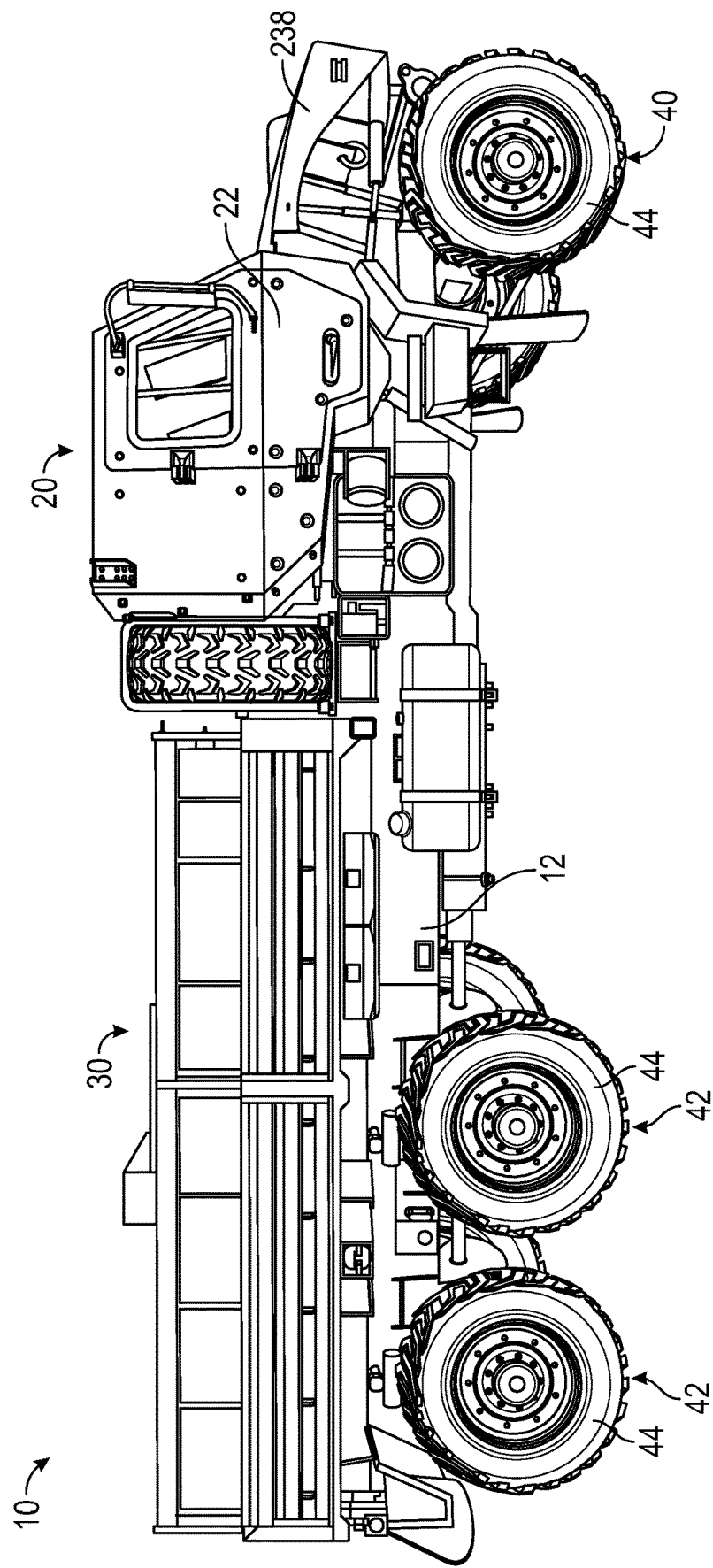
FIG. 1 is a side view of a vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, a vehicle includes various components that improve performance relative to traditional systems. The vehicle includes a frame that is modularly modifiable to suit a number of different applications. Aspects such as the length of the frame rails, the length and location of the frame liners, and the mounting locations of various components can be varied to suit applications that require various carrying capacities and mission equipment. Some aspects of the front end of the vehicle are located in a similar (e.g., identical, etc.) location throughout various embodiments to facilitate providing a consistent front end structure (e.g., consistent cabin and lifting point locations, etc.).

According to an exemplary embodiment, the vehicle includes a frame assembly having a frame, a front cross member assembly, and a rear cross member assembly. The frame has a front end and a rear end. The frame includes a first frame rail defining a first channel and a second frame rail defining a second channel. The front cross member assembly is coupled to the front end of the frame and extends between the first frame rail and the second frame rail. The rear cross member assembly is coupled to the rear end of the frame and extends between the first frame rail and the second frame rail. Each of the front cross member assembly and the rear cross member assembly includes a first end plate positioned within, and releasably received by, the first channel of the first frame rail, a second end plate positioned within, and releasably received by, the second channel of the second frame rail, and a cross member extending between the first end plate and the second end plate. In other embodiments, the first end plate and/or the second end plate are otherwise coupled to the frame rails (e.g., to sides thereof, etc.). Each of the first end plates defines a first tow eye and a first tie down, and each of the second end plates defines a second tow eye and a second tie down. Each of the end plates further defines a plurality of apertures positioned to facilitate releasably coupling the respective end plate to the frame with a plurality of fasteners. According to an exemplary embodiment, the rear cross member assembly has an at least partially different structure than the front cross member assembly. By way of example, the cross member of the rear cross member assembly may define an aperture configured to receive a towing receiver positioned to align with the aperture and extend from the cross member. The towing receiver may be configured to selectively and slidably receive a towing mechanism. According to an exemplary embodiment, releasably coupling the front cross member assembly and the rear cross member assembly to the frame rails provides a modular frame assembly. By way of example, the cross member assemblies may be selectively interchangeable based on various applications (e.g., a light duty cross member assembly, a heavy duty cross member assembly, etc.). By way of another example, repairing and/or replacing damaged cross member assemblies may be performed with relative ease (e.g., without having to cut and weld the frame assembly, etc.).

According to an exemplary embodiment, the vehicle includes a cabin that may be armored for use in a military operation. The cabin may be rotatable to facilitate access to an engine, the majority of which is disposed beneath and/or rearward of the cabin. The vehicle further includes a front axle assembly and one or more rear axle assemblies. The cabin is offset rearward from the front axle assembly, distributing the weight of the armored cabin between the front and rear axle assemblies. Such positioning lowers the amount of weight supported by the front axle assembly.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Frame Assembly

Figure 2A:
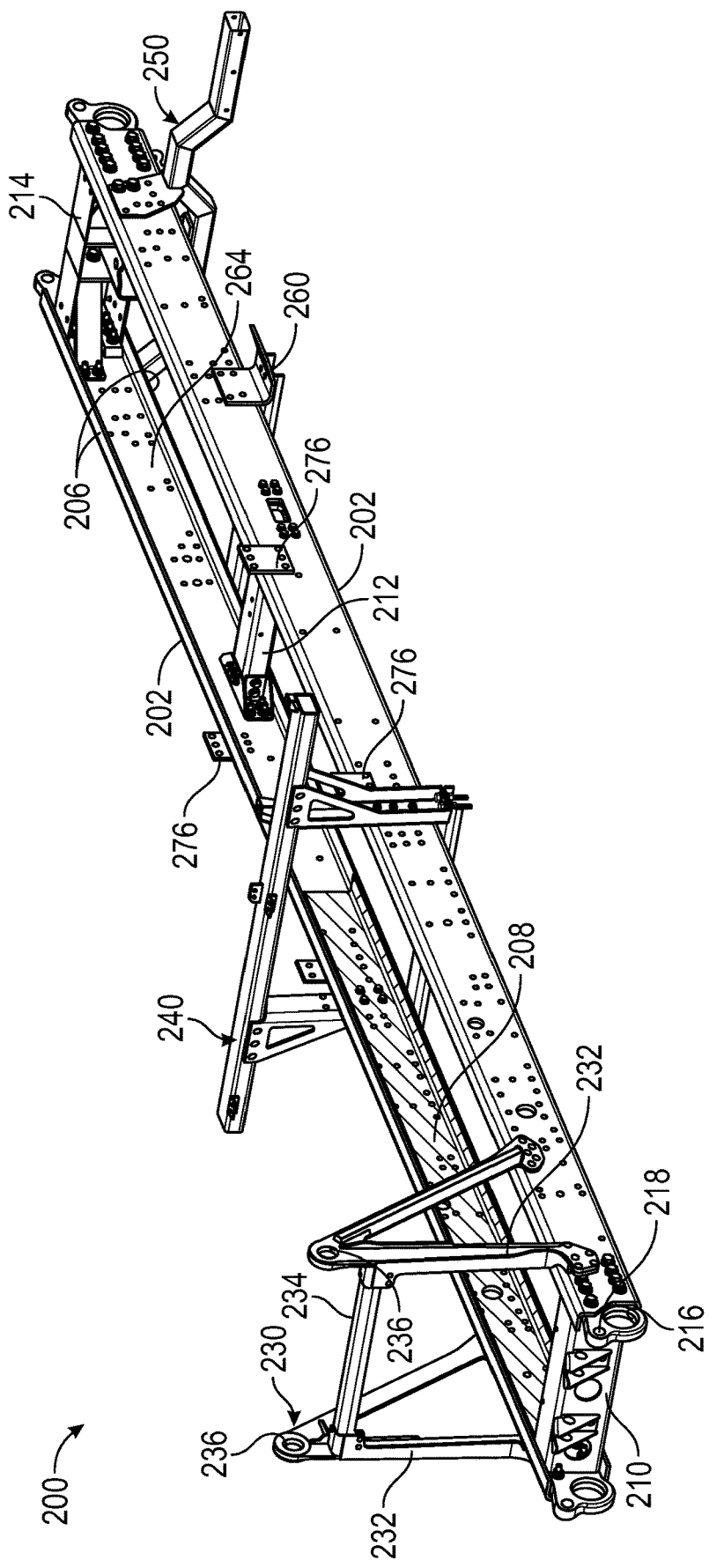
FIGS. 2A-2M are various views of a frame structure for a vehicle, according to an exemplary embodiment.

Referring to FIG. 2A, a vehicle frame, shown as frame 200, is illustrated. The frame 200 includes a number of components that are modularly modifiable to suit a particular application. The frame 200 includes two longitudinal frame rails, shown as longitudinal frame rails 202, that define a longitudinal axis of the frame 200. In some embodiments, the frame rails 202 have a C-channel cross-section that includes a base 204 and two legs 206 oriented perpendicular to the base 204. In other embodiments, the frame rails 202 may have a different cross-sectional shape (e.g., tubular, etc.). The legs 206 define a width of the frame rail 202, and the base 204 defines a height of the frame rail 202.

Frame liners 208 may be coupled (e.g., bolted, welded, etc.) to the interior of the frame rails 202 and provide additional structural rigidity (e.g., in areas of high stress, etc.). In areas with lesser stresses, the frame liners 208 may be omitted from the frame rails 202 in order to reduce weight. In some embodiments, the frame liners 208 have a C-channel cross-section. In other embodiments, the frame liners 208 have various cross-sections (e.g., angle, rectangular tube, etc.). In some embodiments, the frame liners 208 extend from immediately behind a front cross member 210 to between an accessory bracket 240 and a mid-section cross member 212. Placing the liners 208 on the interior of the frame rails 202 keeps the outside surface of the base 204 of the frame rails 202 free for mounting side plates, which can then be used to mount other components (e.g., suspension components, lift points, etc.). In some embodiments, the use of external reinforcement plates (i.e., fishplates) as opposed to liners is precluded in some locations by the presence of other side plates. By way of example, the front tractive assembly side plates 270, shown in FIG. 2M, prevent the use of fishplates near the front end of the frame rails 202.

Figure 2B:
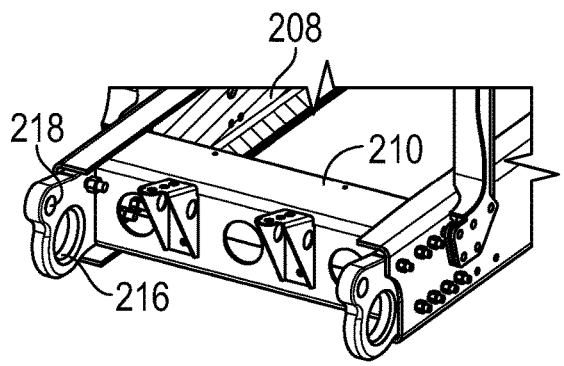
Figure 2C:
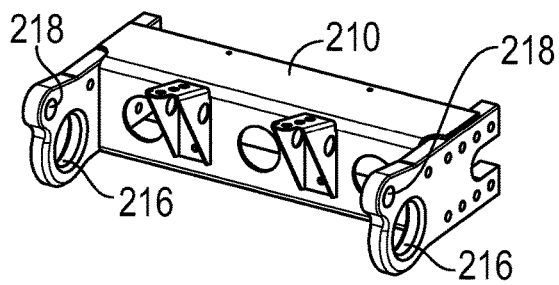
Figure 2D:
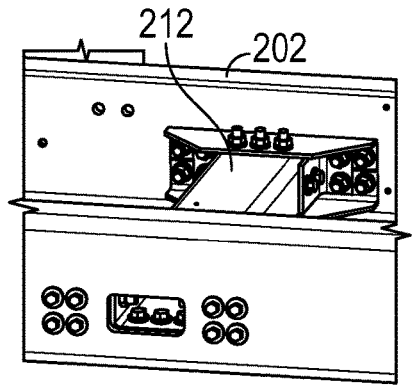
Figure 2E:
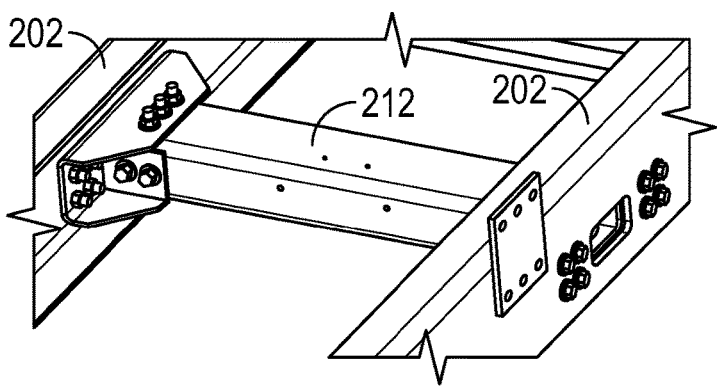
Figure 2F:
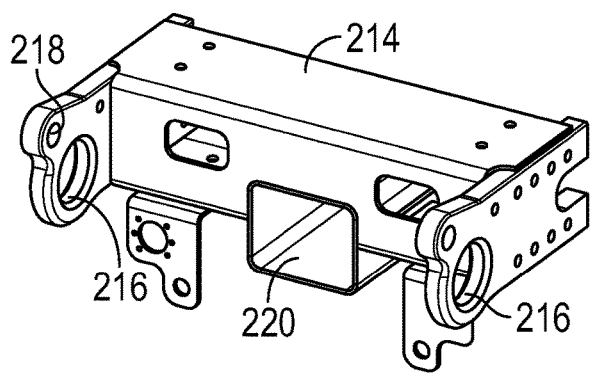
Figure 2G:
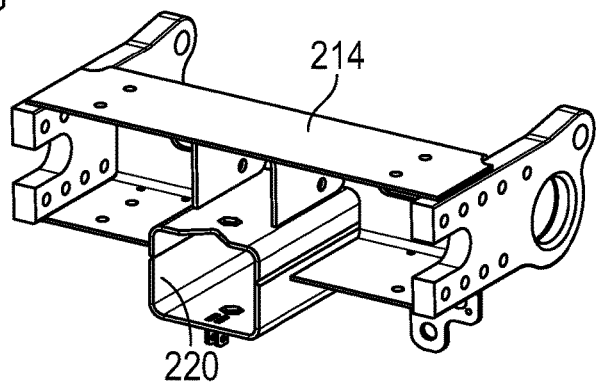

The frame 200 may include the front cross member 210, shown in FIGS. 2B and 2C, the mid-section cross member 212, shown in FIGS. 2D and 2E, and the rear cross member 214, shown in FIGS. 2F and 2G. The cross members 210, 212, and 214 are coupled (e.g., bolted, welded, etc.) to the frame rails 202. In some embodiments, as shown in FIG. 2D, the frame rails 202 are cut away to facilitate access to the interior of the cross members 210, 212, and 214 (e.g., to access mounting hardware, etc.). The cross members 210, 212, and 214 may be made from various materials (e.g., steel, aluminum, etc.) with various cross-sections (e.g., square tube, C-channel, angle, etc.). In some embodiments, the frame 200 includes more than one mid-section cross member 212. In some embodiments, the front and rear cross members 210 and 214 incorporate tow eyes 216 and tie down points 218. The tow eyes 216 may act as an interface for a connection to another object (e.g., with a strap or chain), may facilitate towing (e.g., push, pull) another object, and/or for the vehicle to be towed. The tie down points 218 may act as interface for securing the vehicle to another object. By way of example, the tie down points 218 might be used to secure the vehicle to a rail car. In some embodiments, the rear cross member 214 incorporates a receiver 220. Referring to FIGS. 2F and 2G, the receiver 220 has a tubular cross-section and is perpendicular to the rear cross member 210. The receiver 220 is configured to translatably couple a towing mechanism (e.g., a pintle hook, a ball, etc.) to the frame 200. The receiver 220 may include a component that fixes the towing mechanism relative to the receiver 220. By way of example, a pin may be configured to pass through both the receiver 220 and the towing mechanism.

Figure 2H:
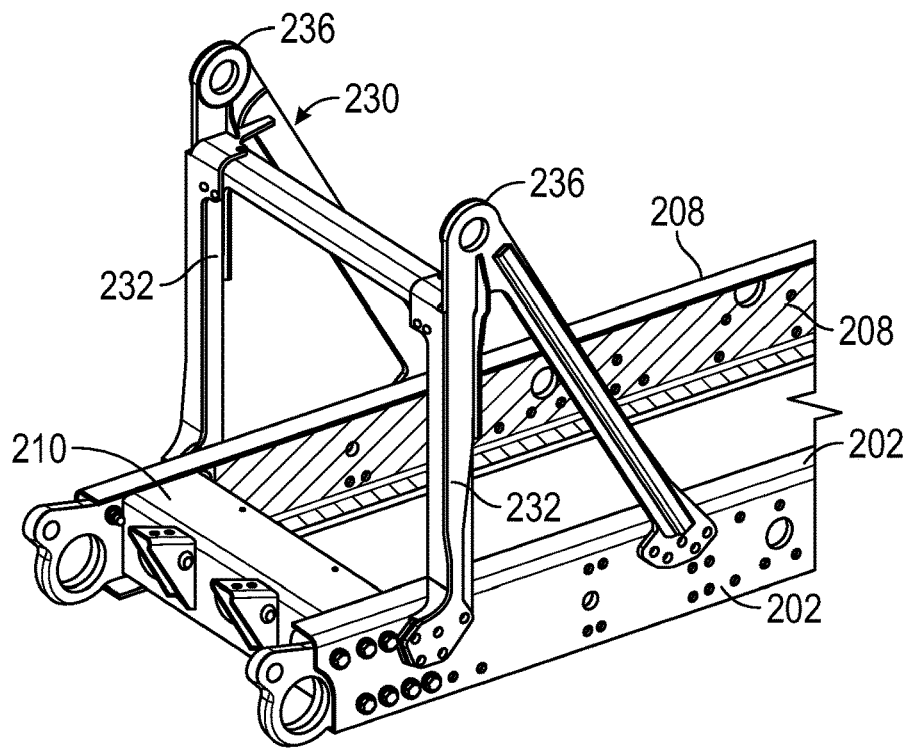

Referring to FIG. 2A, the frame 200 further includes a front lift structure, shown as lift structure 230. The lift structure 230 may be coupled (e.g., bolted, welded, etc.) to the frame rails 202. In some embodiments, the lift structure 230 is located near the front end portion of the frame rails 202 and provides an interface through which to lift the front end portion of the vehicle 10. Referring to FIG. 2H, the lift structure 230 includes two vertical members 232 and one cross member 234. The cross member 234 is coupled to the vertical member 232 and provides structural rigidity to the vertical members 232. The vertical members 232 each include a lift ring 236 near the top of each member. The lift ring 236 acts as an interface by which the vehicle 10 can be lifted. As shown, the vertical members 232 have a triangular shape or an A-shape to provide resistance to bending about the connection to the frame 200. In other embodiments, the front lift structure 230 is otherwise shaped. In some embodiments, the vertical members 232 incorporate side plates to mount to the exterior of the base 204 of the frame rails 202. In some embodiments, the vertical members 232 are partially or completely covered by a hood 238 (depicted in FIG. 1). In some such embodiments, the lift rings 236 are accessible without adjusting the position of (e.g., opening, etc.) the hood 238.

Throughout a number of the embodiments discussed herein, the front lift structure (e.g., the front lift structure 230) is placed in a consistent (e.g., identical, etc.) location relative to another portion (e.g., the frontmost portion of the frame rails 202) of the frame (e.g., the frame 200, etc.). The front lift structure consistency facilitates having multiple vehicle variants, each with the same or similar front end structure. By way of example, the front cabin 20 and the hood 238 may have a fixed relationship to the front lift structure 230, such that locating the front lift structure 230 in a consistent location also consistently locates the front cabin 20 and the hood 238, facilitating commonality of certain parts of the vehicle 10 (e.g., parts located in the front end of the vehicle) across most or all vehicle variants, reducing manufacturing and design costs. Consistently locating the front lift structure 230 additionally provides a consistent lifting point regardless of the vehicle variant. Various other components (e.g., the accessory bracket 240, discussed below) may be consistently located regardless of vehicle variant.

Figure 2I:
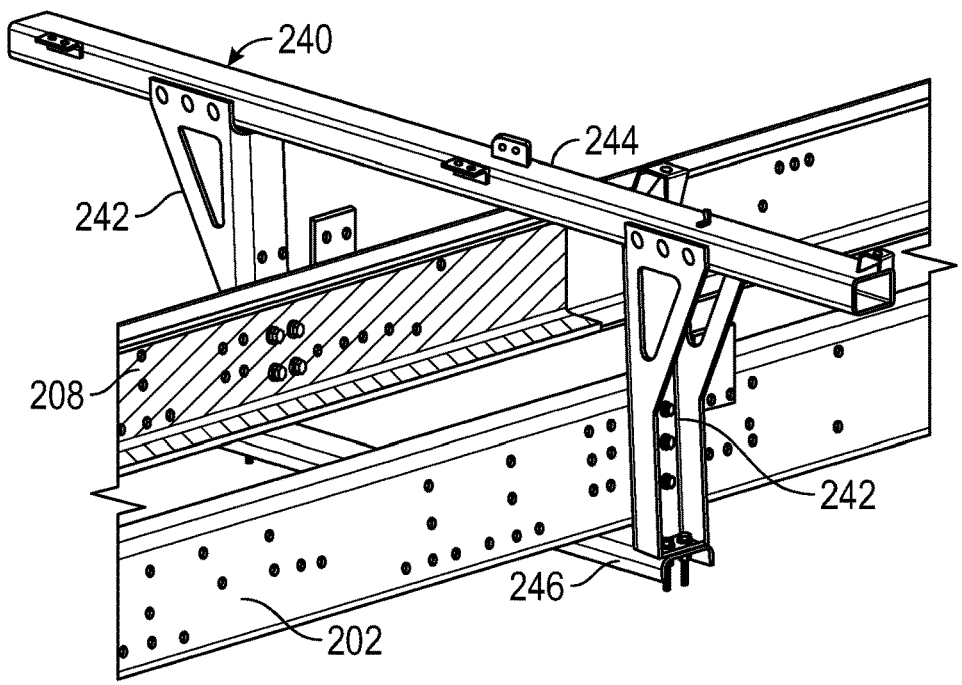

Referring to FIG. 2A, the frame 200 further includes a bracket, shown as accessory bracket 240. The bracket 240 may be coupled (e.g., bolted, welded, etc.) to the frame rails 202. In some embodiments, the bracket 240 is located rearward of the lift structure 230. Referring to FIG. 2I, the bracket 240 includes two vertical members 242, an upper cross member 244, and a lower cross member 246. The vertical members 242 are coupled to the frame rails 202, and the cross members 244, 246 are coupled to the vertical members 242. In some embodiments, the vertical members 242 are perpendicular to the cross members 244, 246. In some embodiments, in addition to providing structural rigidity to the frame members, additional components (e.g., an air cleaner, a spare tire, etc.) are coupled to the accessory bracket 240. In some embodiments, the exact number and type of components coupled to the accessory bracket 240 varies based on the application of the vehicle. In some such embodiments, a platform is coupled to the upper cross member 244.

Figure 2J:
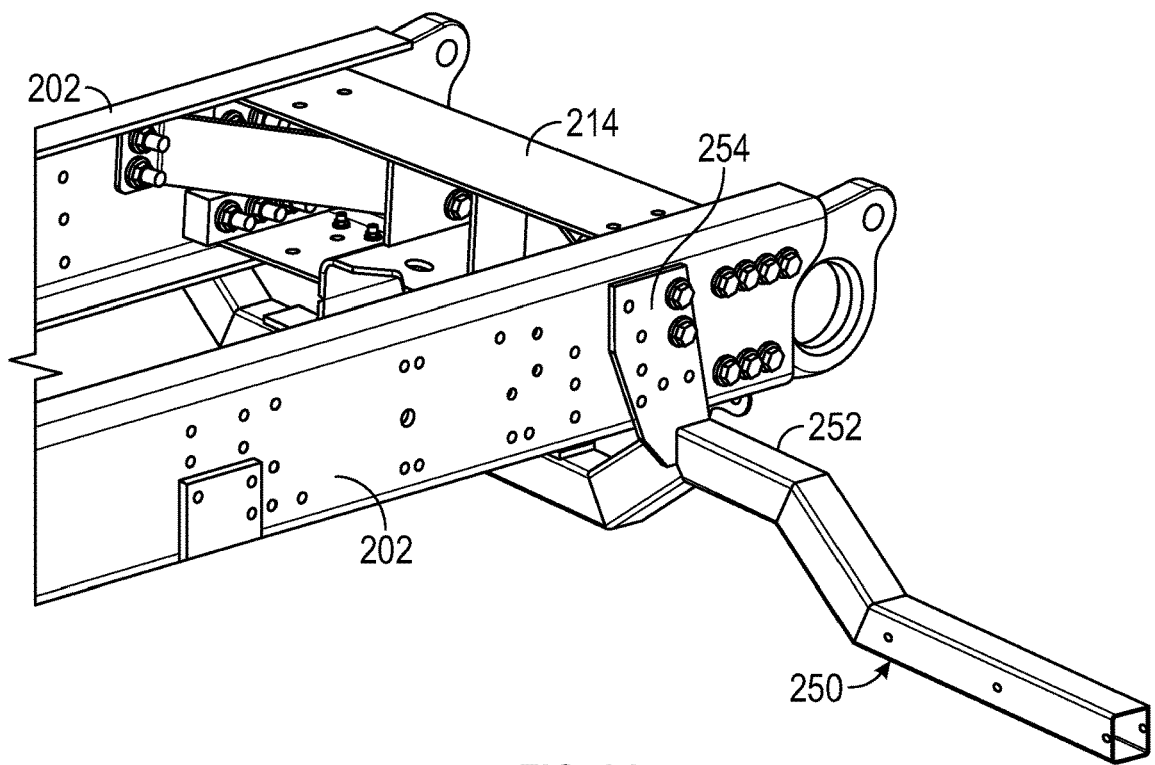

Referring to FIG. 2A, the frame 200 further includes a bumper, shown as rear bumper 250. In some embodiments, the rear bumper 250 is located towards the rear end of the vehicle 10, proximate the rear cross member 214. As shown in FIG. 2J, in some embodiments, the rear bumper 250 includes a structural section 252 and side plates 254. The structural section 252 includes a series of tubular members coupled to one another to form a single member. The shape of the structural section 252 may vary to provide clearance around wheels or other vehicle components, or to facilitate connection to the frame rails 202 without extending the side plates 254. The side plates 254 may be coupled (e.g., welded, bolted, etc.) to the structural section 252. The side plates 254 may be coupled (e.g., welded, bolted, etc.) to the side surface (i.e., the base 204) of the frame rails 202. The location of the side plates 254 relative to the front and the back of the frame rails 202 may vary to avoid conflict with the rear cross member 214. In some embodiments, mounting hardware (e.g., bolts, screws, etc.) that is used to mount the rear bumper 250 extends through both the rear bumper 250 and the rear cross member 214. By way of example, as shown in FIG. 2J, the mounting hardware used to couple the rear bumper 250 to the frame rails 202 also couples a portion of the rear cross member 214 to the frame rails 202.

Figure 2K:
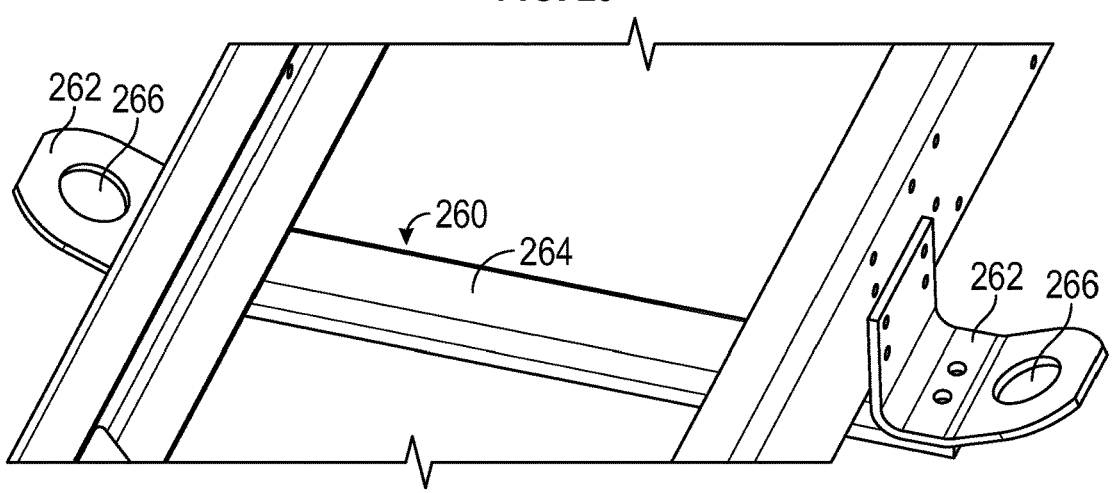
Figure 2L:
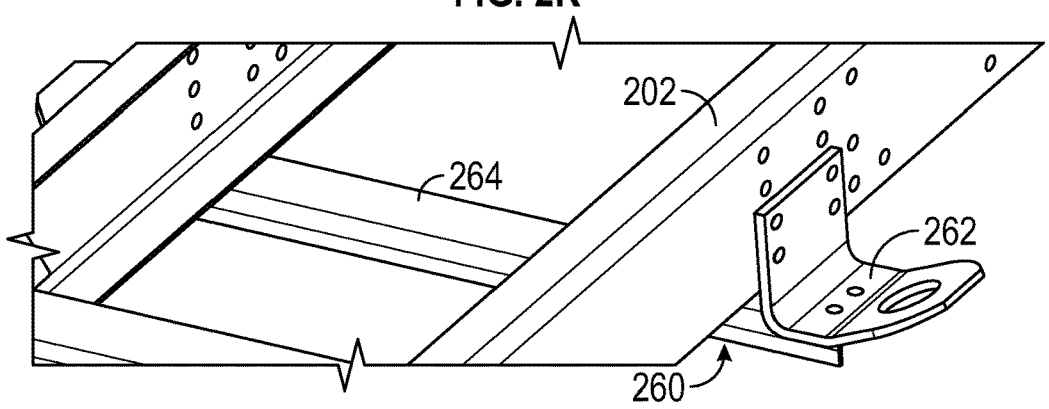

Referring to FIG. 2A, the frame 200 also includes a lift structure, shown as rear lift structure 260. The rear lift structure 260 may be located near the rear end of the vehicle 10. In some embodiments, the rear lift structure 260 is located forward of the rear bumper 250 and rearward of the mid-section cross member 212. The rear lift structure 260 may facilitate lifting the rear end portion of the vehicle 10. The rear lift structure 260, shown in FIGS. 2K and 2L, includes lift brackets 262 and cross member 264. The lift brackets 262 may be coupled (e.g., bolted, welded, etc.) to the to the side surface (i.e., the base 204) of the frame rails 202. In some embodiments, the lift brackets 262 protrude below the bottom surface of the frame rails 202. In some embodiments, the lift brackets 262 are formed using a sheet of bent material and define an upward-facing lift interface 266 (e.g., a hole, etc.). The cross member 264 may provide additional structural rigidity to the frame 200 to support the forces from lifting the vehicle 10. In some embodiments, the cross member 264 is coupled (e.g., welded, bolted, etc.) to one or both of the frame rails 202 and the lift brackets 262. The cross member 264 may have various cross-sections (e.g., square tube, C-channel, angle, etc.).

Referring to FIG. 1, the front cabin 20 is coupled to the frame 12. In an embodiment of the vehicle 10 that includes the frame 200, the cabin 20 is located immediately rearward of the lift structure 230 and immediately forward of the accessory bracket 240. In some embodiments, the cabin 20 is rotatably coupled to the frame 200. In some embodiments, the vehicle 10 includes a rotation controller positioned to prevent relative movement between the cabin 20 and the frame 200. By way of example, a hydraulic cylinder may be coupled to the cabin 20 and the frame 200, and the extension or retraction of the hydraulic cylinder may cause the cabin 20 to rotate relative to the frame 200. The cabin 20 may be coupled to the upper surface (i.e., the legs 206) of the frame rails 202 or coupled to the side surface (i.e., the base 204) of the frame rails 202 using side plates. In some embodiments, the cabin 20 is coupled to the lift structure 230 or the accessory bracket 240.

Figure 2M:
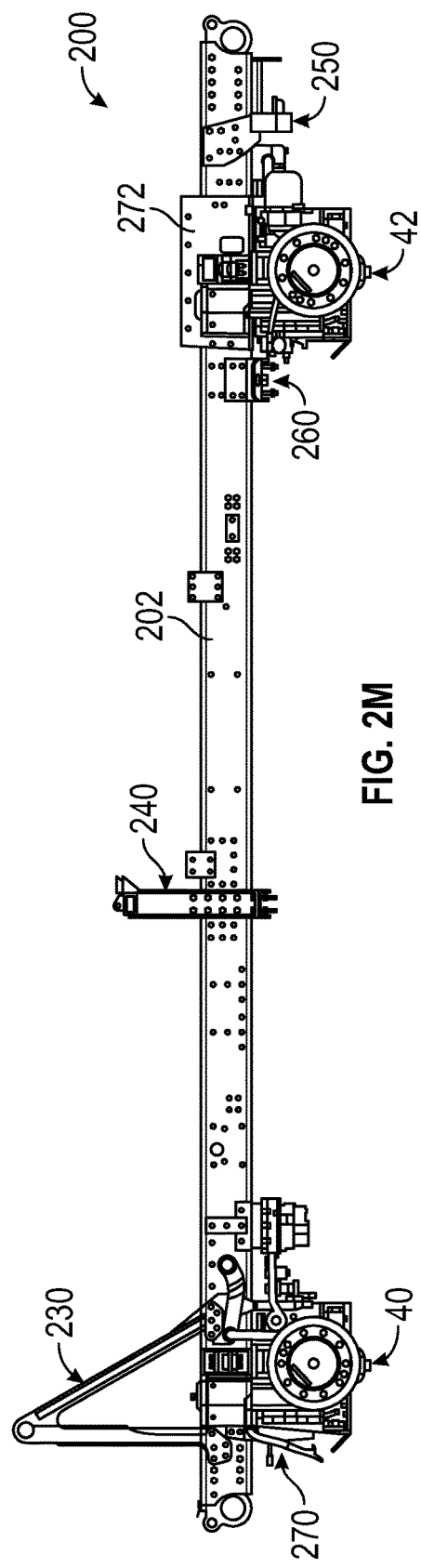

Referring to FIG. 2M, the front tractive assembly 40 and the rear tractive assembly 42 are coupled to the frame 200. The front tractive assembly 40 may be coupled (e.g., bolted, welded, etc.) to the frame rails 202 using front tractive assembly side plates 270. The front tractive assembly 40 is located near the front end of the frame rails 202. In some embodiments, the front tractive assembly 40 is located directly underneath the front lift structure 230. The rear tractive assembly 42 may be coupled (e.g., bolted, welded, etc.) to the frame rails 202 using rear tractive assembly side plates 272. The rear tractive assembly 42 is located near the rear end of the frame rails 202. In some embodiments, the rear tractive assembly 42 is located between the rear lift structure 260 and the rear bumper 250. In some embodiments, the rear tractive assembly side plates 272 extend above the top surface of the frame rails 202 and couple the mission equipment 30 to the frame rails 202. Referring to FIG. 2A, side plates, shown as mounting side plates 276, are coupled to the frame rails 202. The side plates 276 extend above the top surface of the frame rails 202 and may facilitate coupling various components (e.g., the mission equipment 30, other frame members, etc.) to the frame 200.

The construction of the frame 200 facilitates modification thereof to suit different vehicle variants. The incorporation of C-channel frame rails 202, frame liners 208, and mounting of other components to the frame 200 using side plates facilitates modification of the frame 200 by changing only the lengths and locations of certain components. By way of example, the length of the frame rails 202 may be extended to suit a particular application, and the frame liners 208 may be moved, extended, or added to suit the loading of the application. Certain applications may require a longer frame 200 to suit different mission equipment 30 or to carry a greater number of objects and/or objects of greater size. The frame liners 208 may be located in areas of greater stress, the locations of which are dictated by the intended application of the vehicle 10. The extension of the tractive assembly side plates 272 and the mounting side plates 276 above the frame rails 202 facilitates mounting other components to the frame 200. The tractive assembly side plates 272 and the mounting side plates 276 may additionally be moved, added, removed, or sized to suit the application. Coupling other components (e.g., mission equipment 30, front tractive assemblies 40, rear tractive assemblies 42, the rear bumper 250, etc.) to the frame 200 using side plates (e.g., the tractive assembly side plates 272 and the mounting side plates 276) facilitates modification of the structure of the frame 200 just by changing the size and location of the side plates.

Hereinafter are described various alternative embodiments to the frame 200. The alternative embodiments shown in FIGS. 3A-11C may be substantially the same as or similar to the frame 200 as shown in FIGS. 2A-2M, except as described below. Elements having the same or similar names and similar reference numerals may be substantially the same, except as described below. By way of example, the front lift structure 230 is substantially similar or the same as a front lift structure 330. The various embodiments described below may correspond to different vehicle variants.

Figure 3A:
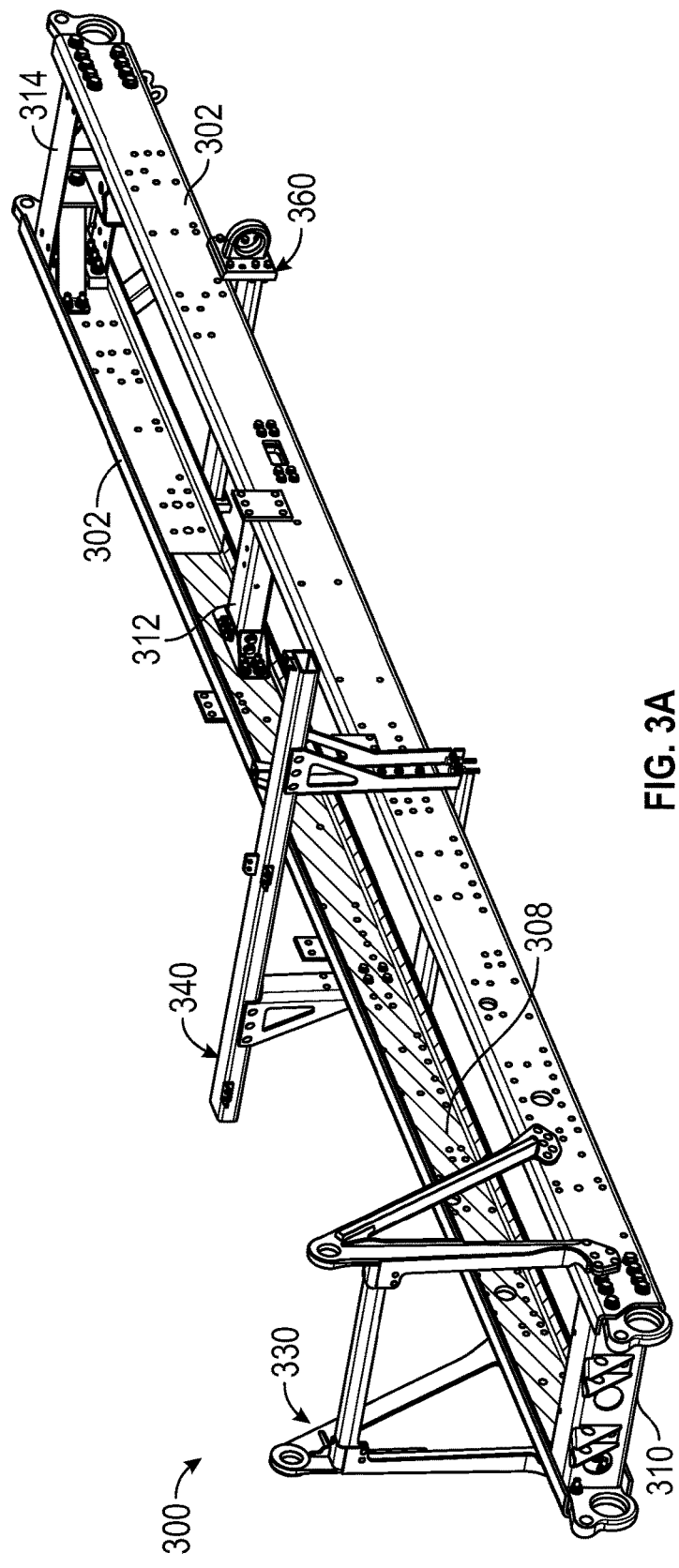
FIGS. 3A-3C are various views of a frame structure for a vehicle, according to various exemplary embodiments.
Figure 3B:
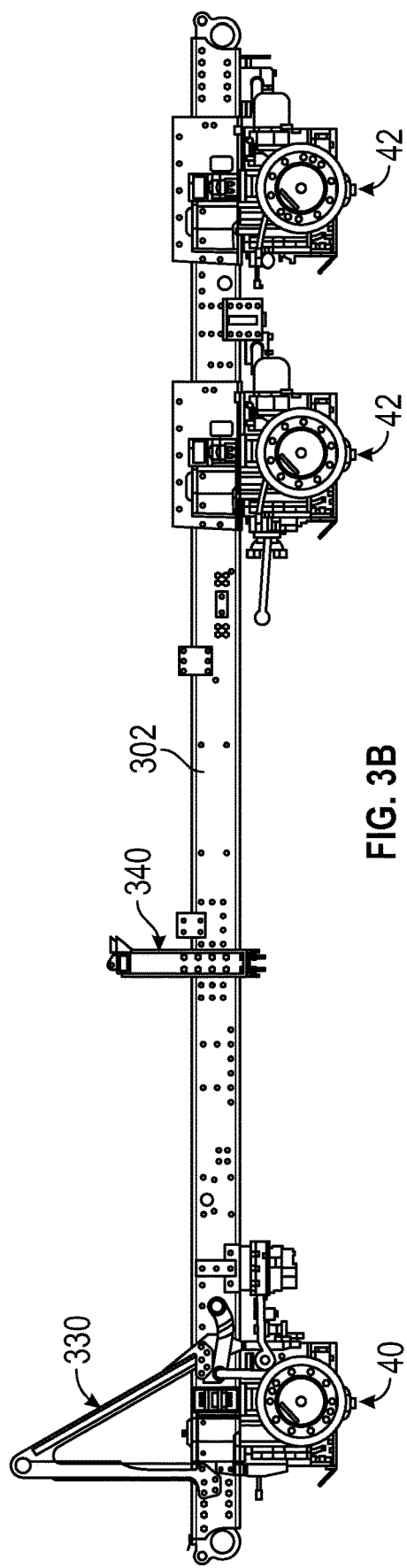

Referring to FIG. 3A, a frame, shown as frame 300, is an alternative embodiment to the frame 200. The frame 300 may include one or more of longitudinal frame rails 302, frame liners 308, a front cross member 310, a mid-section cross member 312, a rear cross member 314, a front lift structure 330, an accessory bracket 340, and a rear lift structure 360. The frame 300 may not include a rear bumper. The frame liners 308 may extend from immediately behind the front cross member 310 to between the mid-section cross member 312 and the rear lift structure 360. The frame rails 302 may be extended to accommodate a front tractive assembly 40 and two rear tractive assemblies 42, as shown in FIG. 3B. As shown in FIG. 3B, one rear tractive assembly is located between the rear cross member 314 and the rear lift structure 360, and the other rear tractive assembly is located immediately forward of the rear lift structure 360.

Figure 3C:
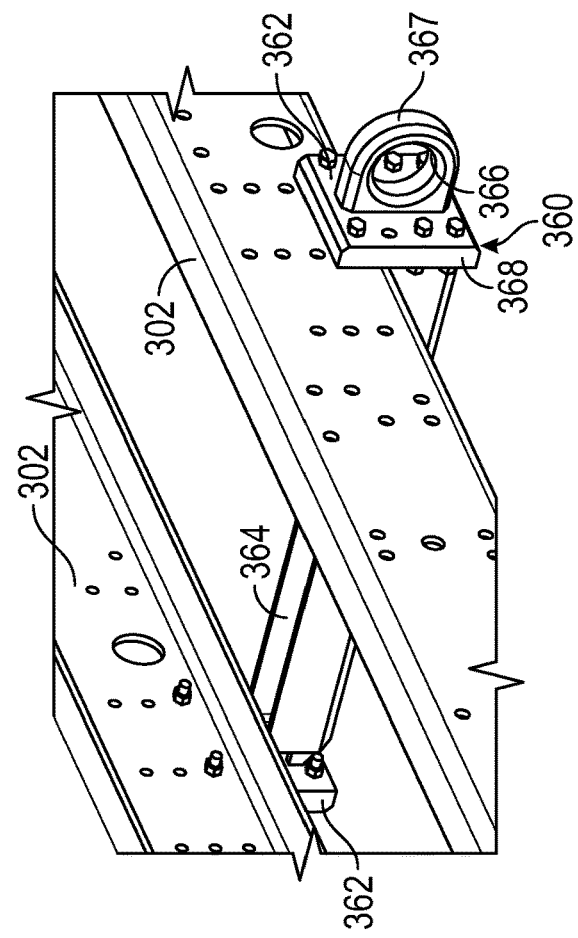

The rear lift structure 360 shown in FIG. 3C includes lift brackets 362 and cross member 364. The lift brackets 362 form a forward-facing lift interface 366 in an interface member 367, which is coupled to a base plate 368. The base plate 368 may be coupled (e.g., bolted, welded, etc.) to both the cross member 364 and the frame rail 302. In some embodiments, the cross member 364 has a C-shaped cross-section and interfaces with the base plate 368 by way of a series of flanges coupled to the cross member 364.

Figure 4C:
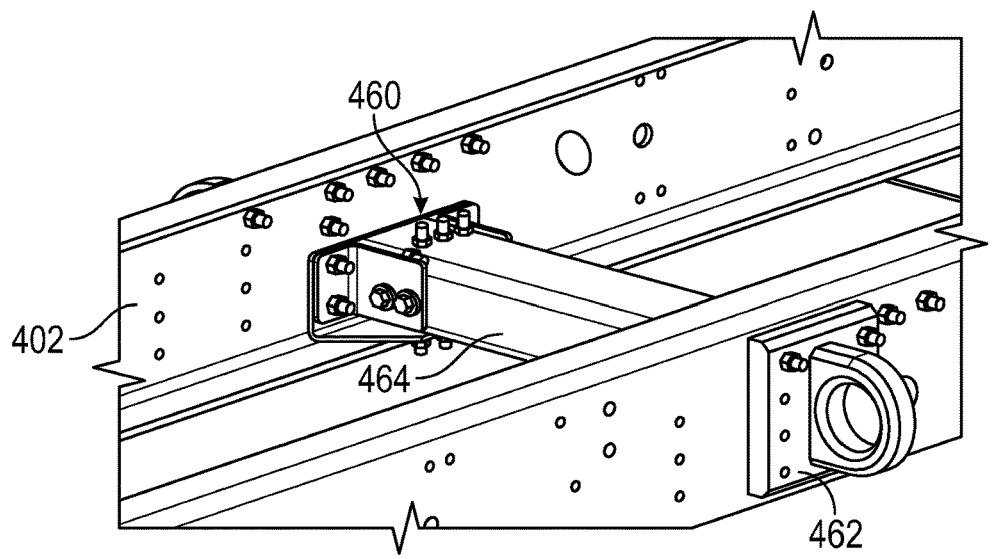
Figure 4D:
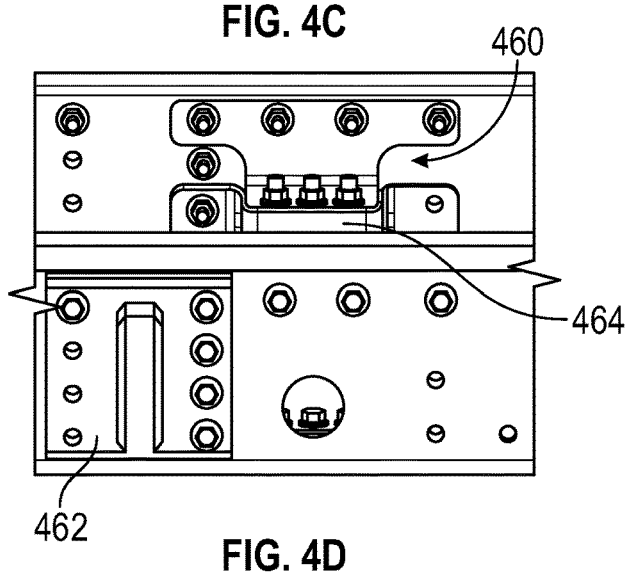
Figure 4E:
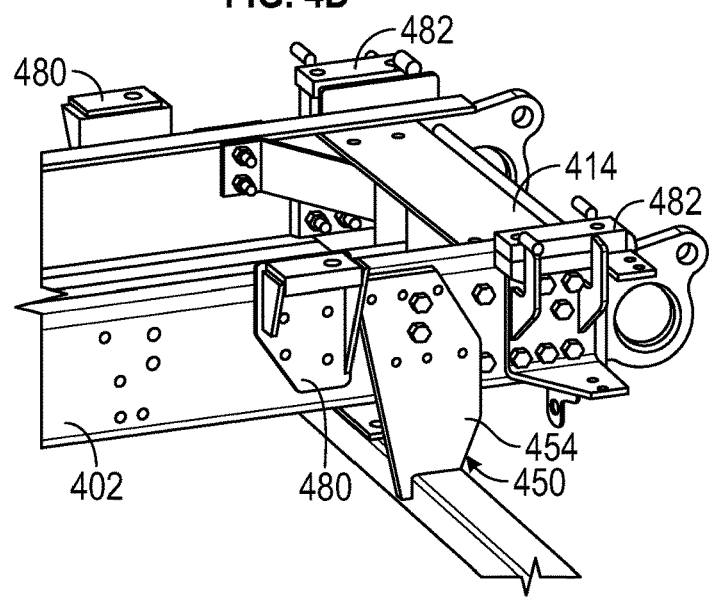

Referring to FIG. 4A, a frame, shown as frame 400, is an alternative embodiment to the frame 200. The frame 400 may include one or more of longitudinal frame rails 402, frame liners 408, a front cross member 410, a mid-section cross member 412, a rear cross member 414, a front lift structure 430, an accessory bracket 440, a rear bumper 450, and a rear lift structure 460. The frame liners 408 may extend from immediately behind the front cross member 410 to between the mid-section cross member 412 and the rear lift structure 460. The frame rails 402 are extended to accommodate a front tractive assembly 40 and two rear tractive assemblies 42, as shown in FIG. 4B. As shown in FIG. 4A, the rear bumper 450 includes a structural section 452 and side plates 454. The structural section 452 may include one continuous, straight tube and may be coupled to the side plates 454. As shown in FIGS. 4C and 4D, the rear lift structure 460 includes a lift bracket 462 substantially similar to the lift brackets 362. The lift brackets 462 are directly coupled to the frame rails 402, forward of a cross member 464 that is coupled to the interior of the frame rails 402, an between the two rear tractive assemblies 42. In some embodiments, the frame 400 includes brackets 480 and brackets 482 coupled to the frame rails 402, as shown in FIG. 4E.

Referring to FIG. 5A, a frame, shown as frame 500, is an alternative embodiment to the frame 200. The frame 500 may include one or more of longitudinal frame rails 502, frame liners 508, a front cross member 510, a mid-section cross member 512, a rear cross member 514, a front lift structure 530, an accessory bracket 540, a rear bumper 550, and a rear lift structure 560. The frame liners 508 may extend from immediately behind the front cross member 510 to behind the rear lift structure 560. The rear lift structure 560 may be substantially similar to the rear lift structure 460. The rear bumper 550 may be substantially similar to the rear bumper 450. The frame rails 502 are extended to accommodate a front tractive assembly 40 and two rear tractive assemblies 42, and further extended beyond the rearmost tractive assembly, as shown in FIG. 5B.

Referring to FIG. 6A, a frame, shown as frame 600 is an alternative embodiment to the frame 200. The frame 600 may include one or more of longitudinal frame rails 602, frame liners 608, a front cross member 610, a mid-section cross member 612, a rear cross member 614, a front lift structure 630, an accessory bracket 640, a rear bumper 650, and a rear lift structure 660. The frame liners 608 may extend from immediately behind the front cross member 610 to immediately forward of the rear cross member 614, as shown in FIG. 6B. The rear bumper 650 may be substantially similar to the rear bumper 450. The rear lift structure 660 may be substantially similar to the rear lift structure 460. The frame rails 602 are extended to accommodate a front tractive assembly 40 and two rear tractive assemblies 42, and further extended beyond the rearmost tractive assembly as shown in FIG. 6C. As shown in FIG. 6B, the frame 600 includes brackets 680 and brackets 682, substantially similar to the brackets 480 and the brackets 482, respectively, coupled to the frame rails 602

Referring to FIG. 7A, a frame, shown as frame 700, is an alternative embodiment to the frame 200. The frame 700 may include one or more of longitudinal frame rails 702, frame liners 708, a front cross member 710, a mid-section cross member 712, a rear cross member 714, a front lift structure 730, an accessory bracket 740, a rear bumper 750, and a rear lift structure 760. The frame liners 708 may extend from immediately behind the front cross member 710 to between the mid-section cross member 712 and the rear lift structure 760. The rear bumper 750 may be substantially similar to the rear bumper 450. The rear lift structure 760 may be substantially similar to the to the rear lift structure 760. As shown in FIG. 7B, the frame rails 702 are extended to accommodate a front tractive assembly 40 and two rear tractive assemblies 42, and further extended beyond the rearmost tractive assembly. As shown in FIG. 7C, the brackets 782 and the brackets 784 are coupled to the side surface of the frame rails 702 to facilitate mounting other components to the frame 700. The brackets 784 may be located immediately behind the rearmost rear tractive assembly 42 and the brackets 786 are located proximate the rear cross member 714.

Figures 8A, 8B, 8C:
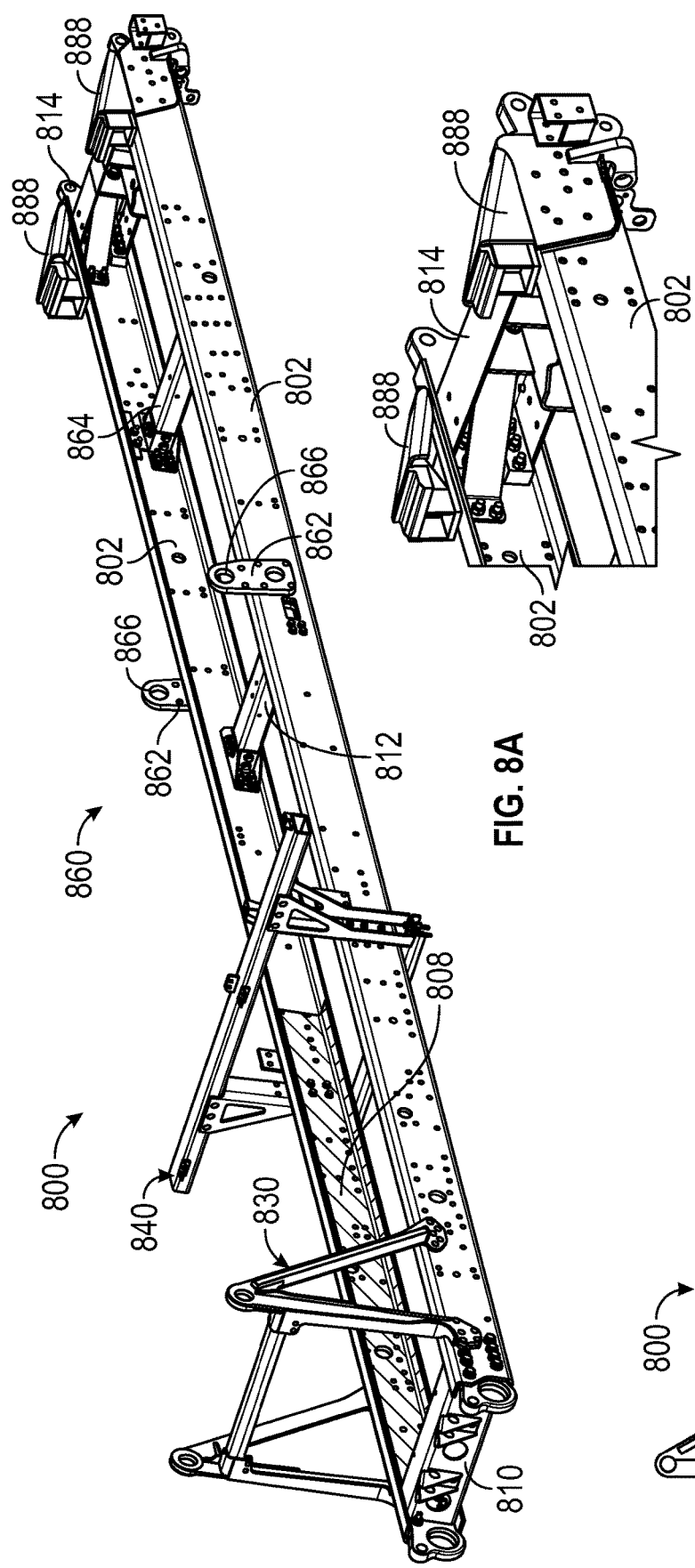
FIGS. 8A-8C are various views of a frame structure for a vehicle, according to various exemplary embodiments.

Referring to FIG. 8A, a frame, shown as frame 800, is an alternative embodiment to the frame 200. The frame 800 may include one or more of longitudinal frame rails 802, frame liners 808, a front cross member 810, a mid-section cross member 812, a rear cross member 814, a front lift structure 830, an accessory bracket 840, and a rear lift structure 860. The frame liners 808 extend from immediately behind the front cross member 810 to between the accessory bracket 840 and the mid-section cross member 812. The frame 800 may not have a rear bumper. As shown in FIG. 8B, the frame rails 802 accommodate a front tractive assembly 40 and two rear tractive assemblies 42. The rear lift structure 860, shown in FIG. 8A, includes lift brackets 862 and cross member 864. The lift brackets 862 are flat and form a side-facing lift interface 866. The lift brackets 862 may be coupled (e.g., bolted, welded, etc.) to the side surface of the frame rail 802 immediately rearward of the mid-section cross member 812. The cross member 864 may have a tubular cross-section and may be coupled to the inside of the side surfaces of the frame rails 802 by way of a series of flanges that are in turn coupled to the cross member 864. The cross member 864 may be located rearward of the lift brackets 862. As shown in FIG. 8C, the frame 800 further includes brackets 888 coupled (e.g., bolted, welded, etc.) to frame rails 802 proximate the rear cross member 814. The brackets 888 include an angled protrusion near the top of the brackets 888 that increases in thickness towards the front end of the frame 800.

Referring to FIG. 9A, a frame, shown as frame 900, is an alternative embodiment to the frame 200. The frame 900 may include one or more of longitudinal frame rails 902, frame liners 908, a front cross member 910, a mid-section cross member 912, an accessory bracket 940, and a rear lift structure 960. The frame liners 908 may extend from immediately behind the front cross member 910 to immediately forward of the rear end of the frame rails 902. The frame 900 may not include a rear bumper or a rear cross member. As shown in FIG. 9B, the frame rails 902 are extended to accommodate a front tractive assembly 40 and two rear tractive assemblies 42. The rear lift structure 960, shown in FIG. 9A, includes cross member 964 substantially similar to the cross member 864, but does not include any lift interfaces. In some embodiments, the frame 900 interfaces with one or more pieces of equipment (not shown). In some such embodiments, one or more of a bracket, a cross member, a lift interface, a tie down, and a tow eye are incorporated into the equipment and provide a functional benefit (e.g., a towing interface, structural stability, etc.) to the frame 900.

Figure 10C:
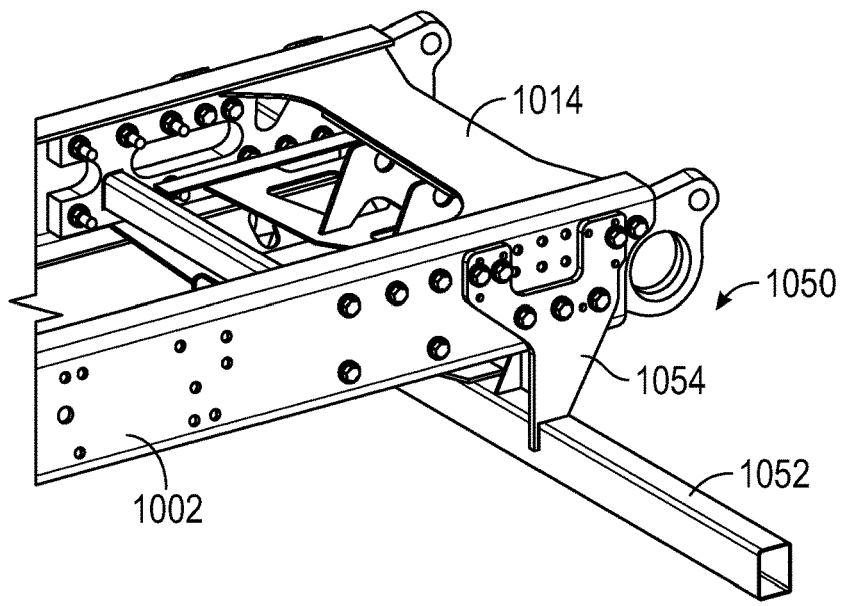
Figure 10D:
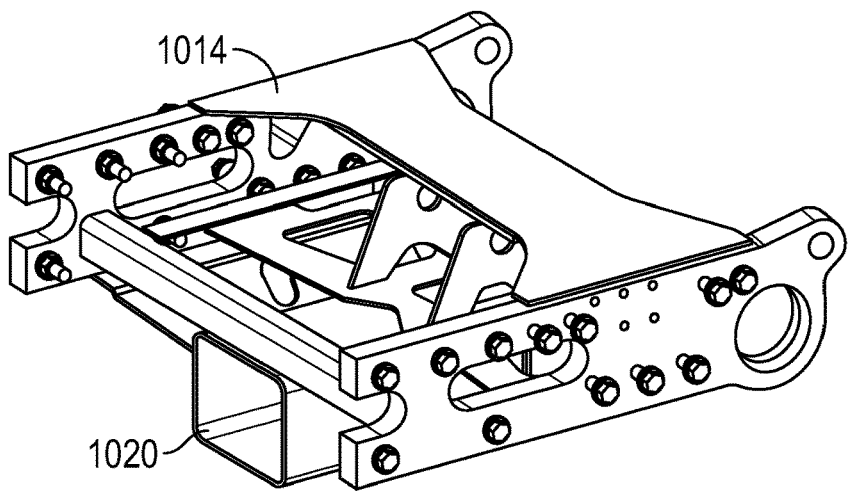
Figure 10E:
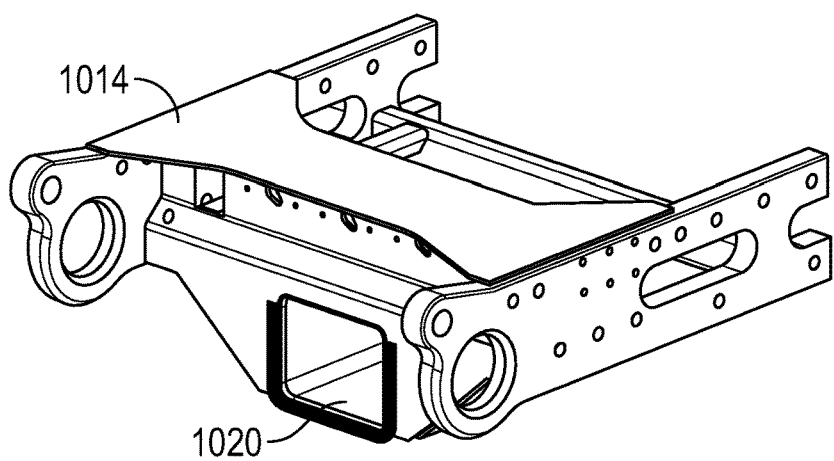

Referring to FIG. 10A, a frame, shown as frame 1000, is an alternative embodiment to the frame 200. The frame 1000 may include one or more of longitudinal frame rails 1002, frame liners 1008, a front cross member 1010, a mid-section cross member 1012, a rear cross member 1014 including a receiver 1020, a front lift structure 1030, an accessory bracket 1040, a rear bumper 1050, and a rear lift structure 1060. The frame liners 1008 may extend from immediately behind the front cross member 1010 to immediately forward of the rear cross member 1014. As shown in FIG. 10B, the frame rails 1002 are extended accommodate a front tractive assembly 40 and two rear tractive assemblies 42. Referring to FIGS. 10C and 10D, the rear cross member 1014 is longitudinally extended to compared to the rear cross member 214 (e.g., to facilitate supporting the receiver, etc.). As shown in FIG. 10A, the rear bumper 1050 includes a structural section 1052 including a section (e.g., a single, straight tubular section, etc.) coupled to side plates 1054. The side plates 1054 are coupled to the frame rails 1002 proximate the rear cross member 1014, and in some embodiments, the side plates 1054 have a shape that does not cover certain areas of the frame rails 1002 (e.g., to facilitate fastening other components, etc.). As shown in FIG. 10A, the rear lift structure 1060 includes lift brackets 1062 and cross member 1064, substantially similar to the cross member 864. The lift brackets 1062 form a side-facing lift interface 1066. The lift brackets 1062 include a lower portion 1067 that is coupled (e.g., bolted, welded, etc.) to the side surface of the frame rail 1002 a distance (e.g., 2 feet, 8 feet, etc.) rearward of the mid-section cross member 1012. An upper portion 1068 is coupled to the lower portion and is offset outwards from the lower portion 1067. The cross member 1064 may be located a distance (e.g., 2 feet, 8 feet, etc.) rearward of the lift brackets 1062.

Referring to FIG. 10B, the frame 1000 further includes a lift axle 1090 (e.g., a pusher axle, etc.) coupled to the frame rails 1002 between the front tractive assembly 40 and the rear tractive assemblies 42. The lift axle 1090 is configured to selectively bear a portion of the weight of the vehicle 10. By way of example, the lift axle 1090 may be selectively engaged with a support surface by applying a pressurized gas (e.g., air) to a portion of the lift axle 1090. The lift axle 1090 may be coupled (e.g., bolted, welded, etc.) to the outside side surfaces of the frame rails 1002 using lift axle side plates 1092. The lift axles 1090 include a structural member 1094 rotatably coupled to the side plates 1092, an axle 1096 rotatably coupled to the structural member 1094, one or more tractive elements (not shown) coupled to the axle 1096, and one or more suspension elements 1098 (e.g., shock absorbers, struts, air bags, springs, pneumatic cylinders, etc.) to selectively raise and lower the axle 1096 relative to the frame rails 1002. In some embodiments, the axle 1096 spins freely.

Figure 11A:
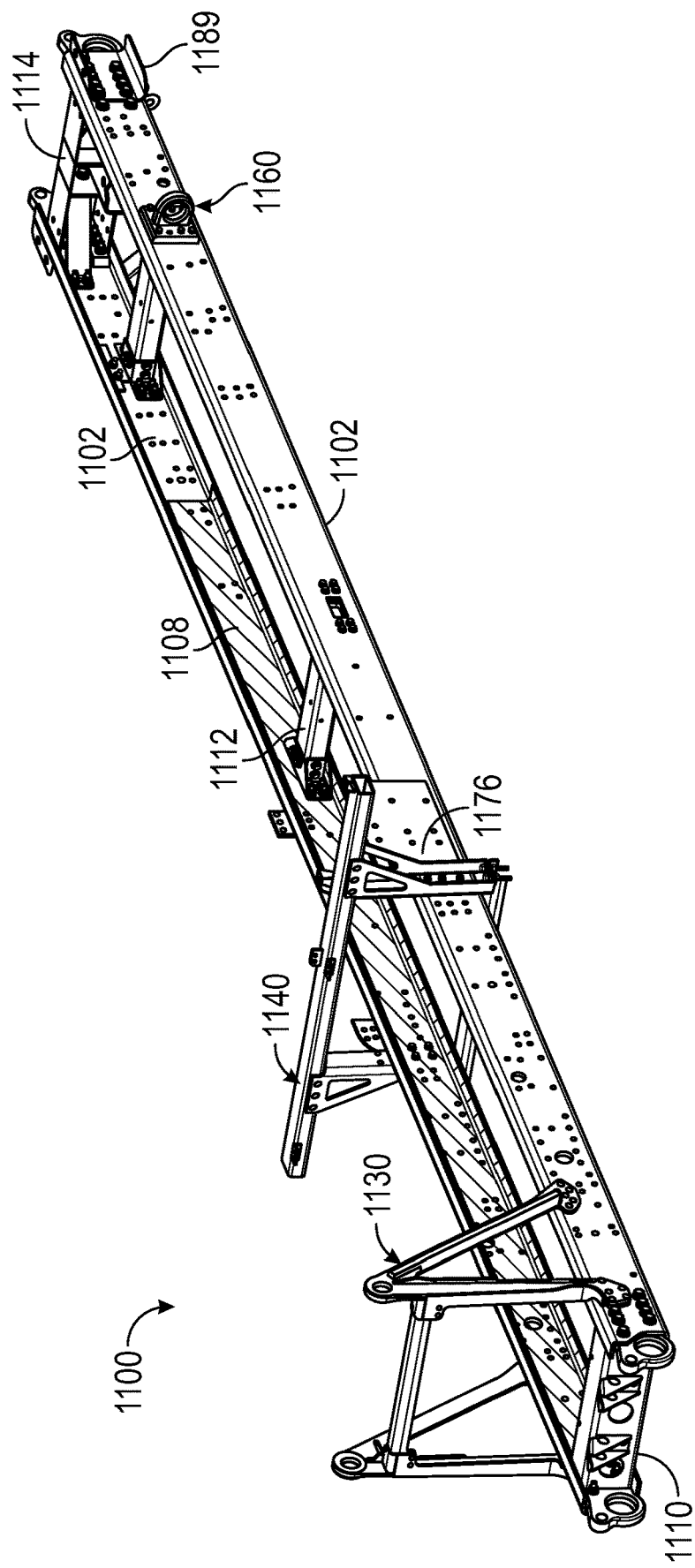

Referring to FIG. 11A, a frame, shown as frame 1100, is an alternative embodiment to the frame 200. The frame 1100 may include one or more of longitudinal frame rails 1102, frame liners 1108, a front cross member 1110, a mid-section cross member 1112, a rear cross member 1114, a front lift structure 1130, an accessory bracket 1140, a rear lift structure 1160, and mounting side plates 1176. The frame liners 1108 may extend from immediately behind the front cross member 1110 to between the mid-section cross member 1112 and the rear lift structure 1160. The rear lift structure 1160 may be substantially similar to the rear lift structure 460. As shown in FIG. 11A, the frame 1100 includes brackets 1189 with C-shaped cross-sections coupled to the frame rails 1102 proximate the rear cross member 1114. As shown in FIGS. 11B and 11C, the frame rails 1102 are extended to accommodate a front tractive assembly 40 and two rear tractive assemblies 42. In some embodiments, the frame 1100 includes a lift axle 1190 substantially similar to the lift axle 1090.

Referring to FIGS. 12A-12G, a frame reinforcement, shown as reinforcement system 1200, provides additional structural rigidity to a frame of a vehicle. The reinforcement system 1200 may be configured to interface with the various frame embodiments described herein, (e.g., the frame 200, the frame 1100, etc.). The reinforcement system 1200 may increase the carrying capacity of the vehicle to which it is attached. In some embodiments, the reinforcement system 1200 may provide additional mounting points (e.g., bolt holes, side plates, etc.) onto which other components may be secured. In some embodiments, the reinforcement system 1200 may be removed from a frame on a vehicle and attached to a similar frame (e.g., a frame with the same components and dimensions) on another vehicle. The reinforcement system 1200 may be removed from a frame on a vehicle and attached to a different frame (e.g., a frame with different components and different dimensions) on another vehicle. The reinforcement system 1200 may be added or removed from a frame on a vehicle depending on the application of the vehicle.

Figure 12A:
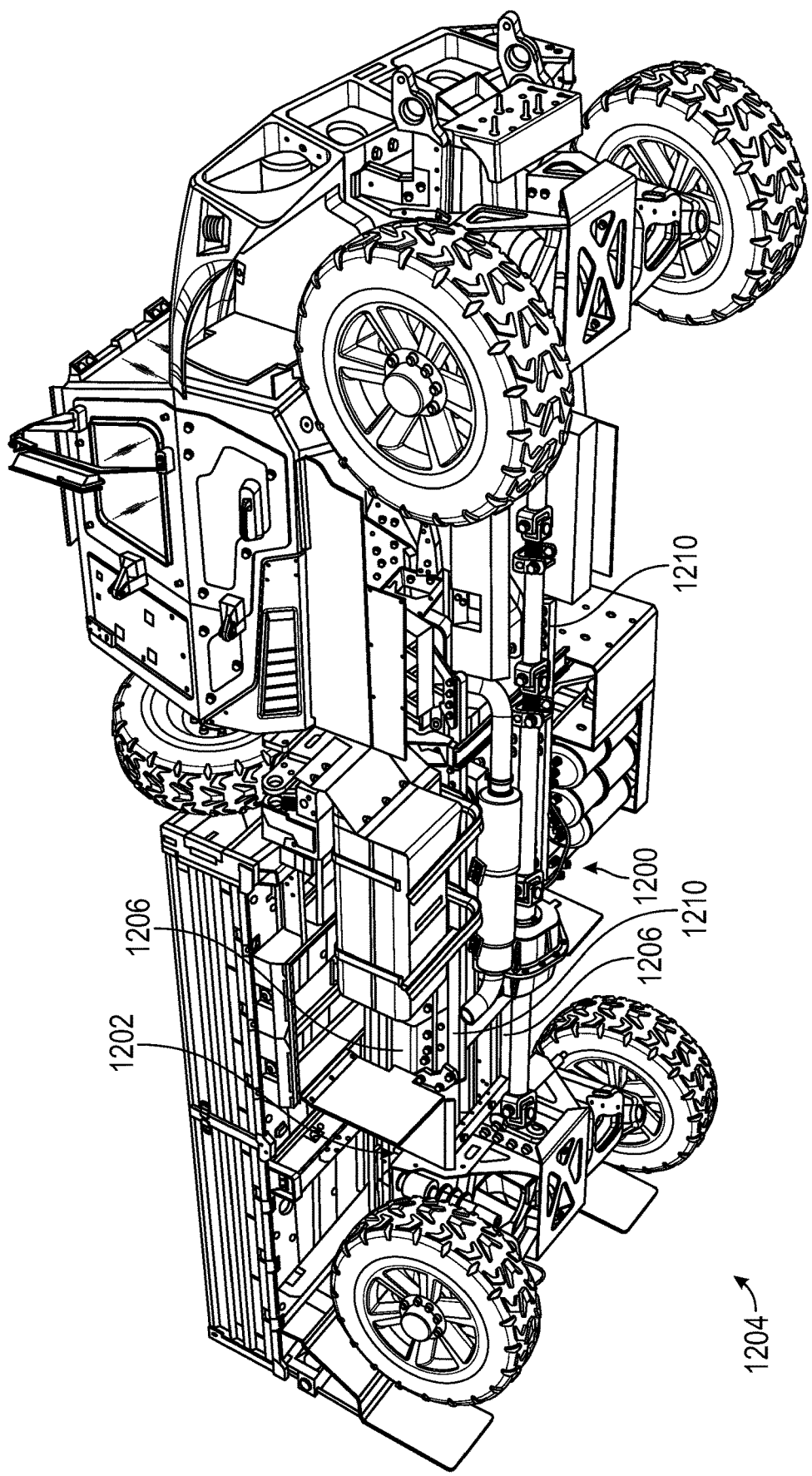

Referring to FIG. 12A, the reinforcement system 1200 is attached to a frame, shown as frame 1202, of a vehicle (e.g., the vehicle 10, etc.), shown as vehicle 1204. The frame 1202 includes frame rails, shown as longitudinal frame rails 1206. FIGS. 12B and 12C show the reinforcement system 1200 removed from the vehicle 1204. As shown in FIG. 12C, the reinforcement system 1200 includes a pair of assemblies, shown as reinforcement assemblies 1210. As shown in FIG. 12C, each reinforcement assembly includes a reinforcement member, shown as longitudinal reinforcement member 1220, and a number of side plates, shown as reinforcement side plates 1230. In some embodiments, the longitudinal reinforcement member 1220 is constructed from single piece with a solid cross-section. In other embodiments, the longitudinal reinforcement member 1220 has various cross-sectional shapes and/or is constructed from multiple pieces. The location, quantity, and shape of the reinforcement side plates 1230 may vary. As shown, the reinforcement side plates 1230 are flat, however in other embodiments, the reinforcement side plates 1230 are bent to facilitate mounting to various parts of the frame 1202. By way of example, the reinforcement side plates 1230 may be arranged to avoid certain components of a vehicle to which the reinforcement system 1200 is attached. The reinforcement side plates 1230 may be located on one or both sides of the longitudinal reinforcement members 1220.

Figure 12D:
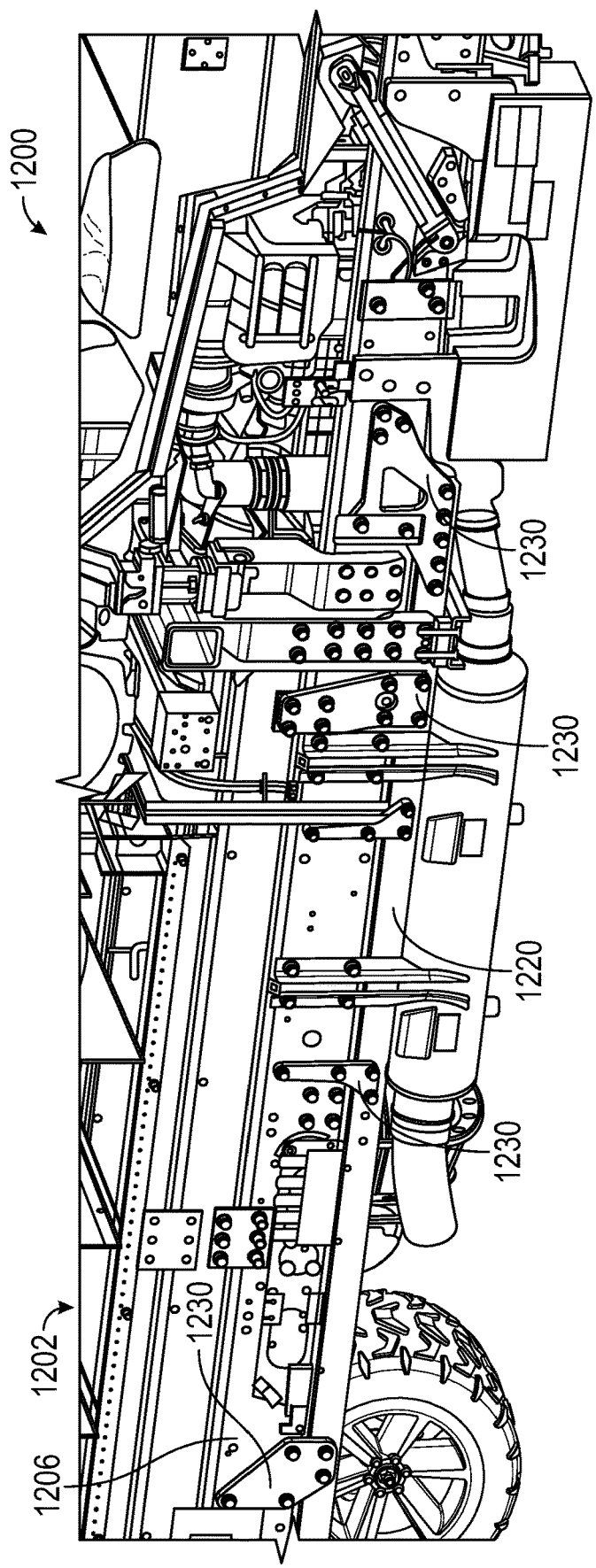
Figure 12E:
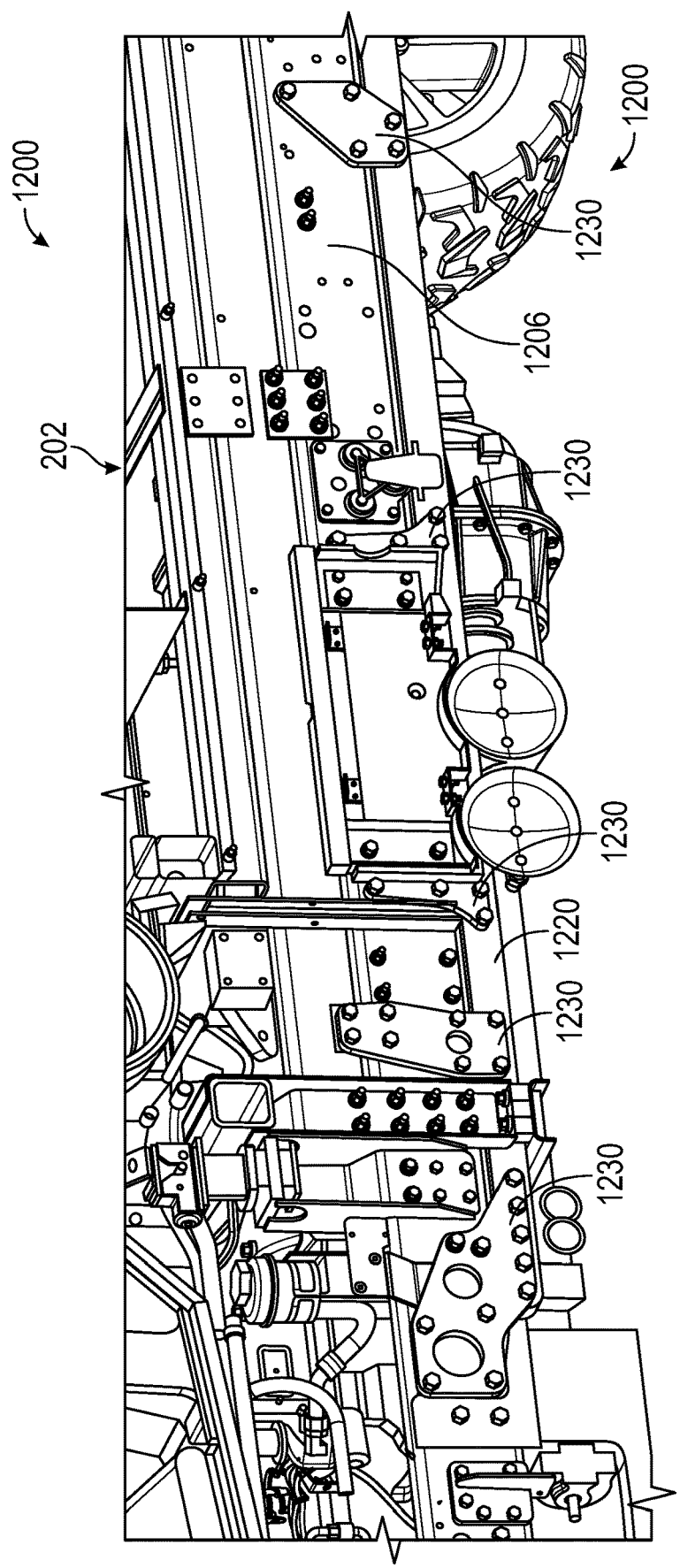
Figure 12F:
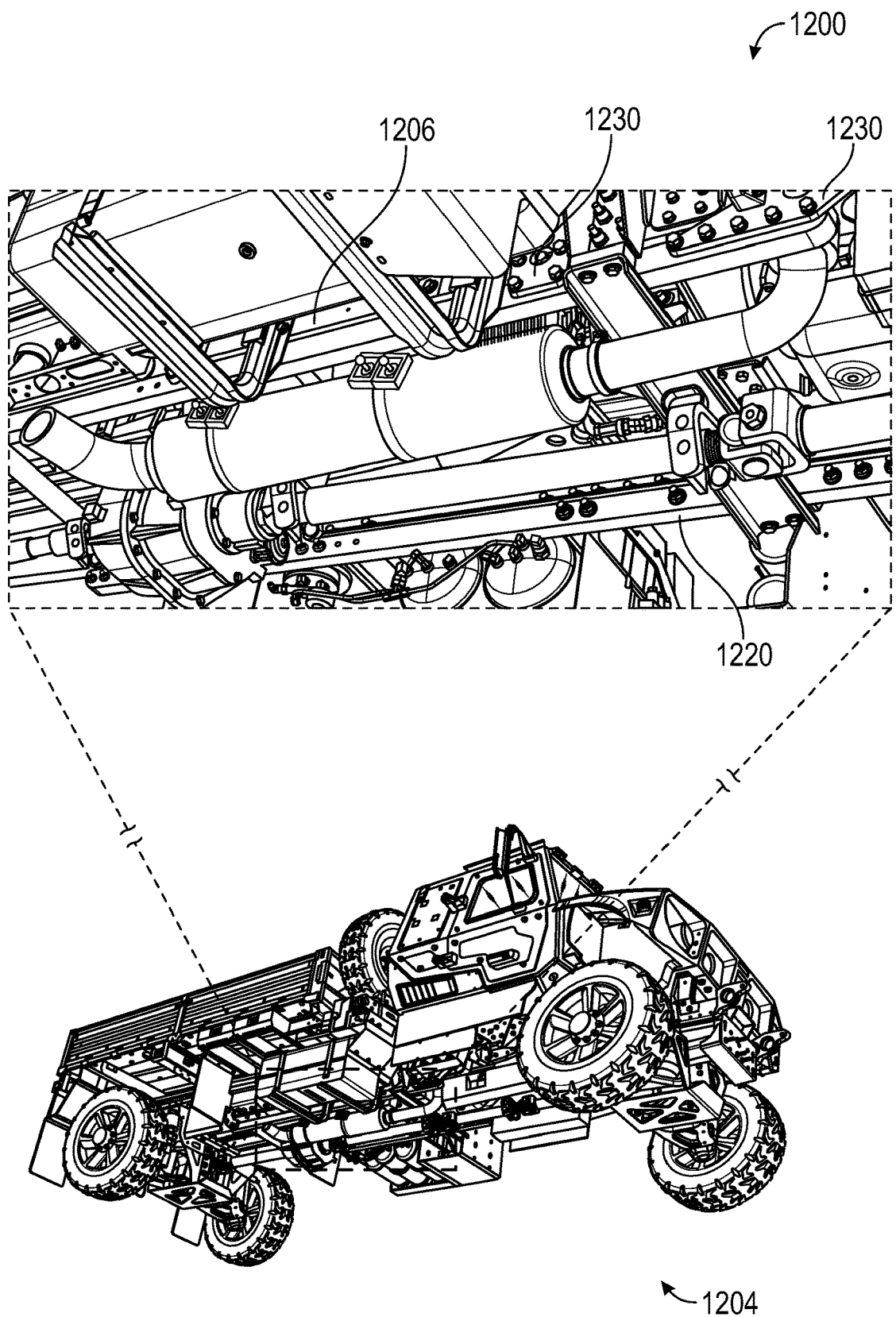

Referring to FIGS. 12D-12F, the reinforcement system 1200 is shown attached to the frame 1202. As shown in FIGS. 12D and 12E, the reinforcement side plates 1230 are coupled directly to an outside face of the longitudinal frame rails 1206. In some embodiments, the reinforcement side plates 1230 are removably coupled to the longitudinal frame rails 1206 (e.g., using bolts) in order to facilitate removal and reattachment on the same frame 1202 or a different frame. In some embodiments, the reinforcement side plates 1230 are coupled to another part of the frame 1202 (e.g., an upper surface of the longitudinal frame rails 1206, a lower surface of longitudinal frame rails 1206, etc.). In some embodiments, various components of the vehicle 1204 (e.g., wires, parts of the exhaust system, various hoses, etc.) are coupled to the reinforcement system 1200. The use of side plates 1230 facilitates adding or removing the reinforcement system 1200 from a vehicle depending on the intended application of the vehicle.

Hereinafter are described various alternative embodiments to the reinforcement system 1200. The alternative embodiments shown in FIGS. 13A-14F may be substantially the same as or similar to the reinforcement system 1200 as shown in FIGS. 12A-12F, except as described below. Elements having the same or similar names and similar reference numerals may be substantially the same, except as described below.

Figure 13A:
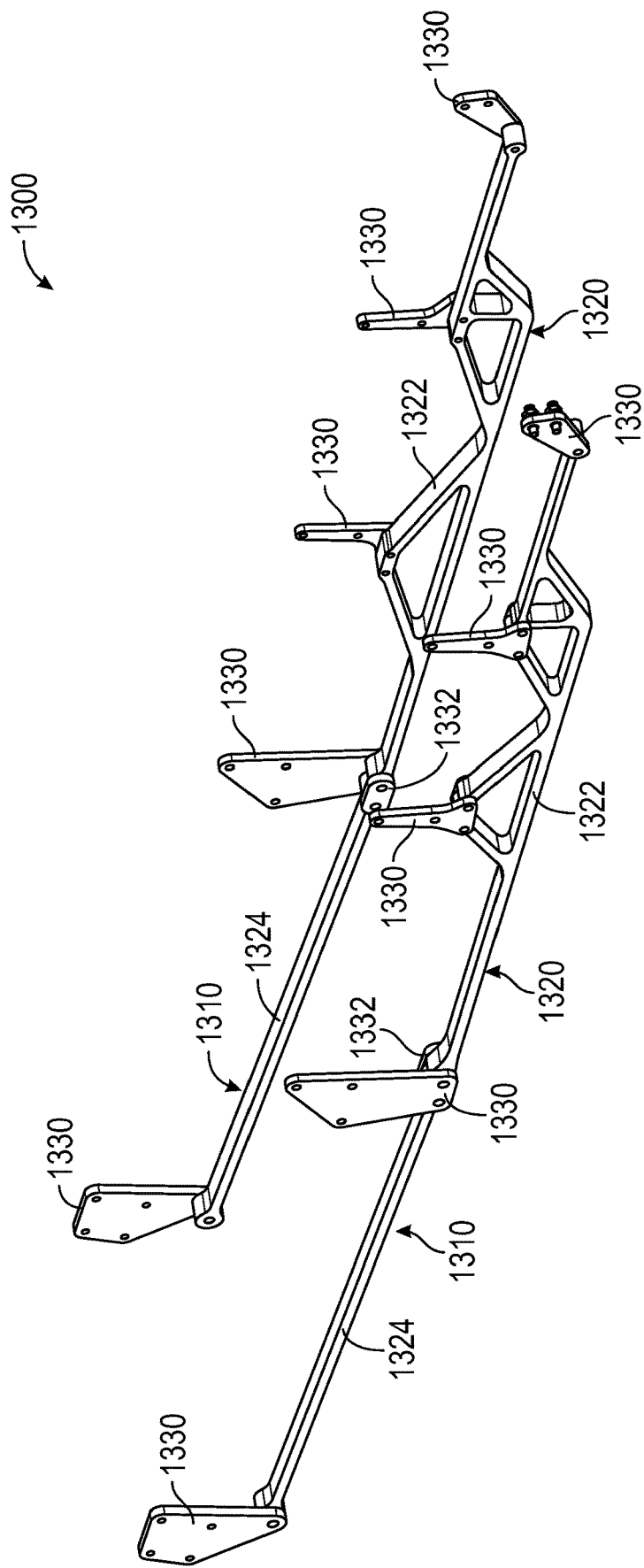
FIGS. 13A-13G are various views of a frame reinforcement system, according to various exemplary embodiments.
Figure 13B:
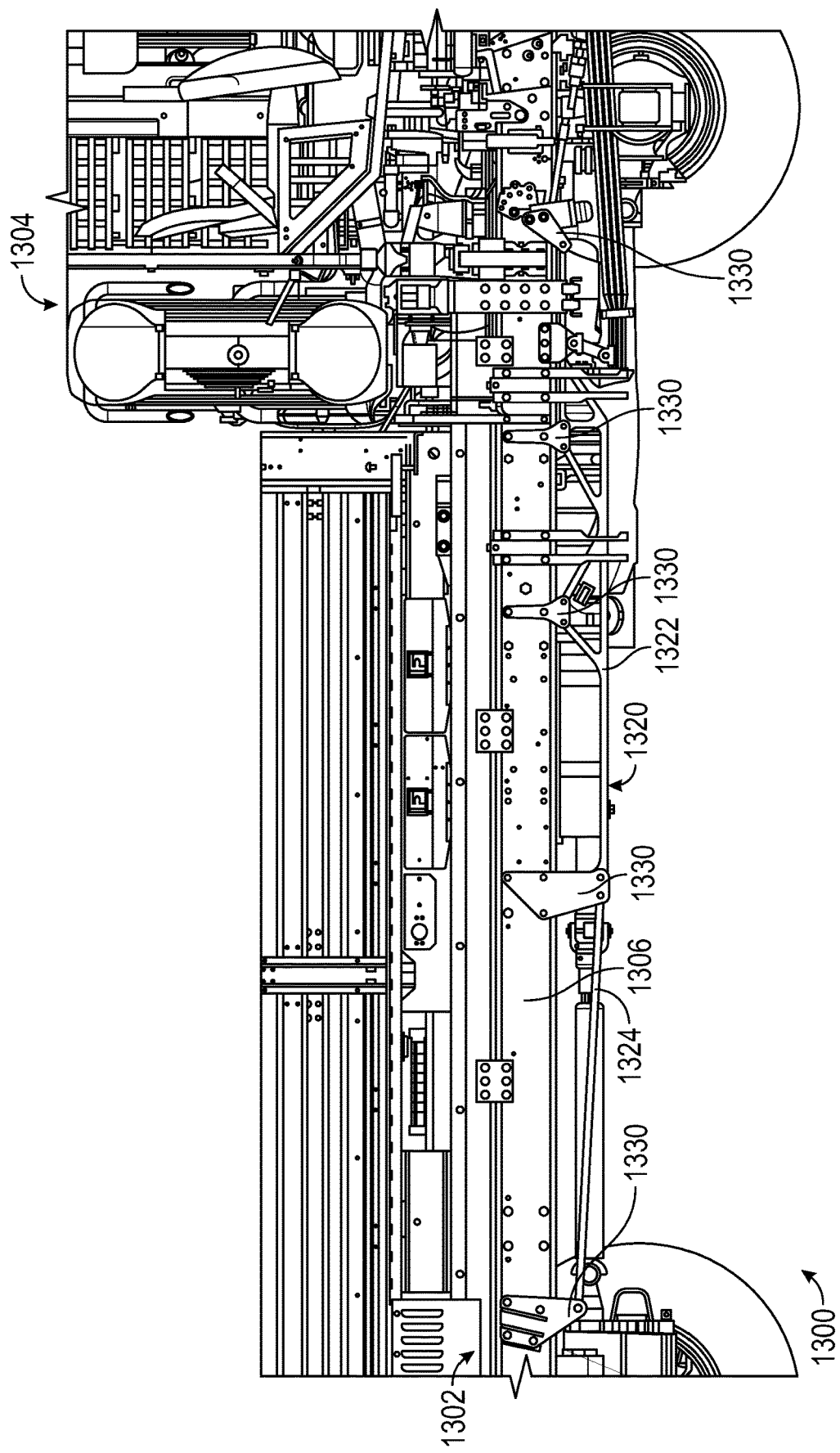
Figure 13C:
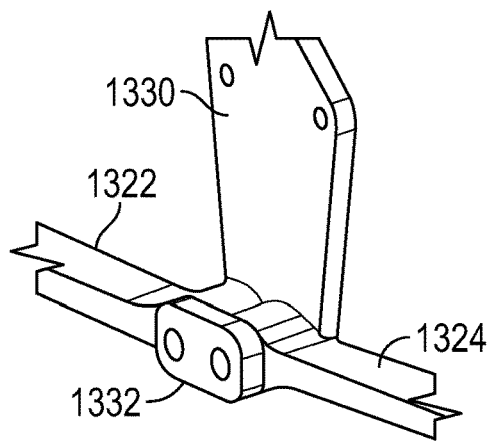
Figure 13D:
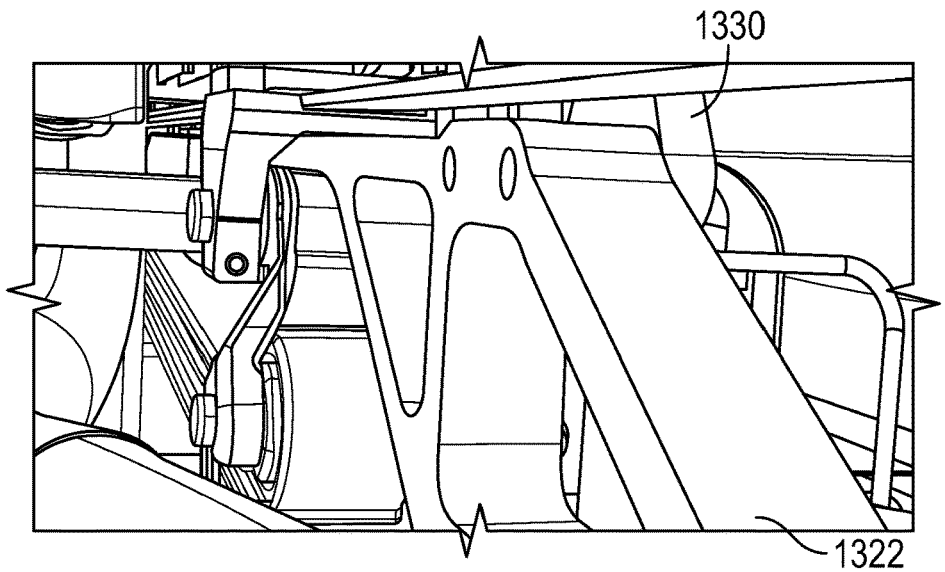
Figure 13E:
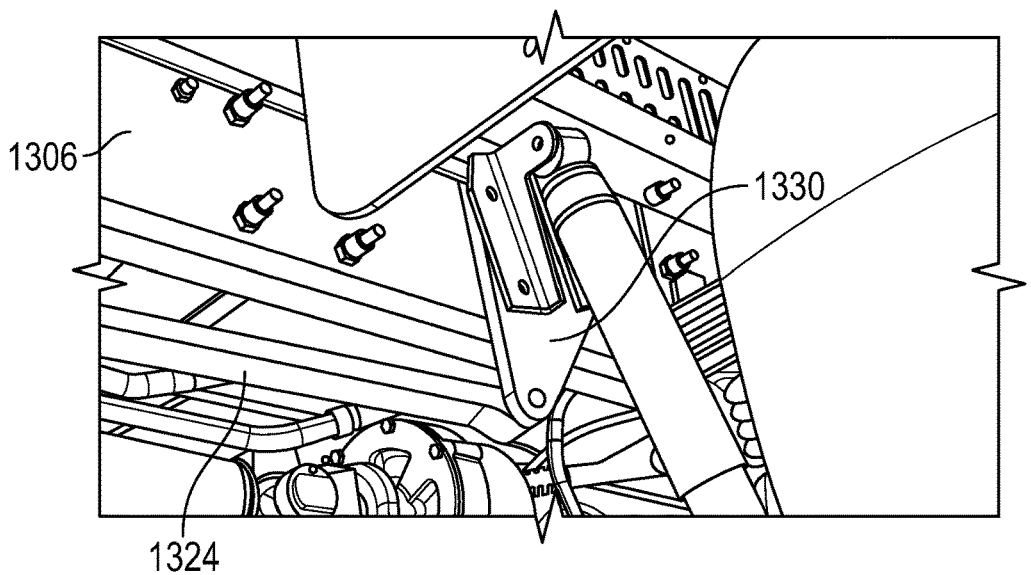
Figure 13F:
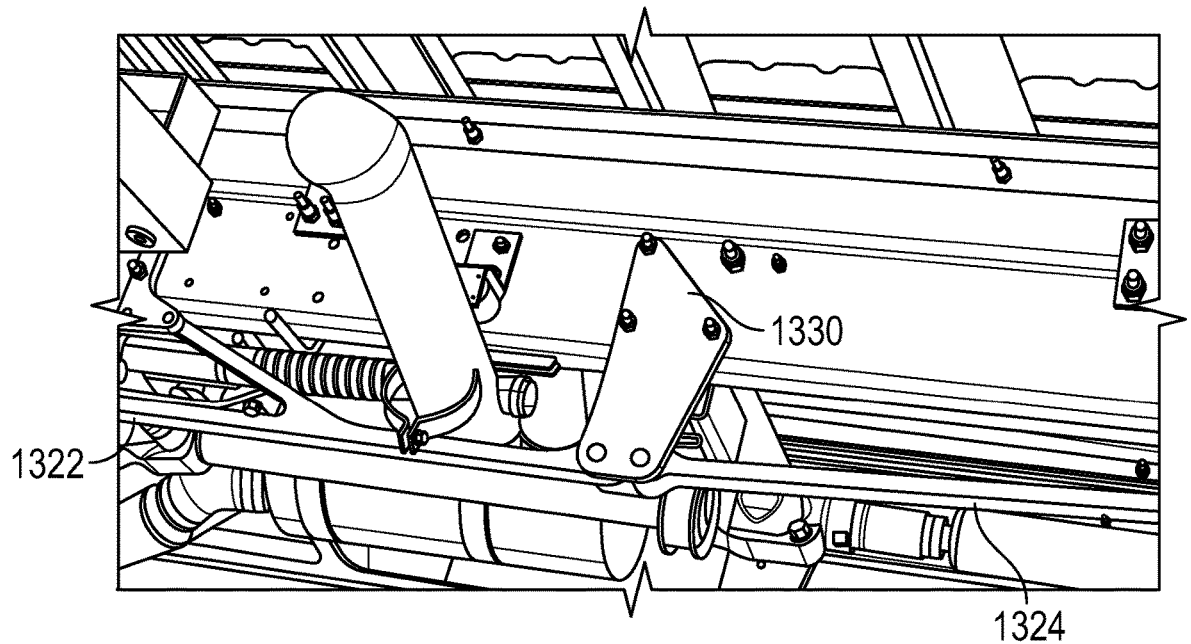
Figure 13G:
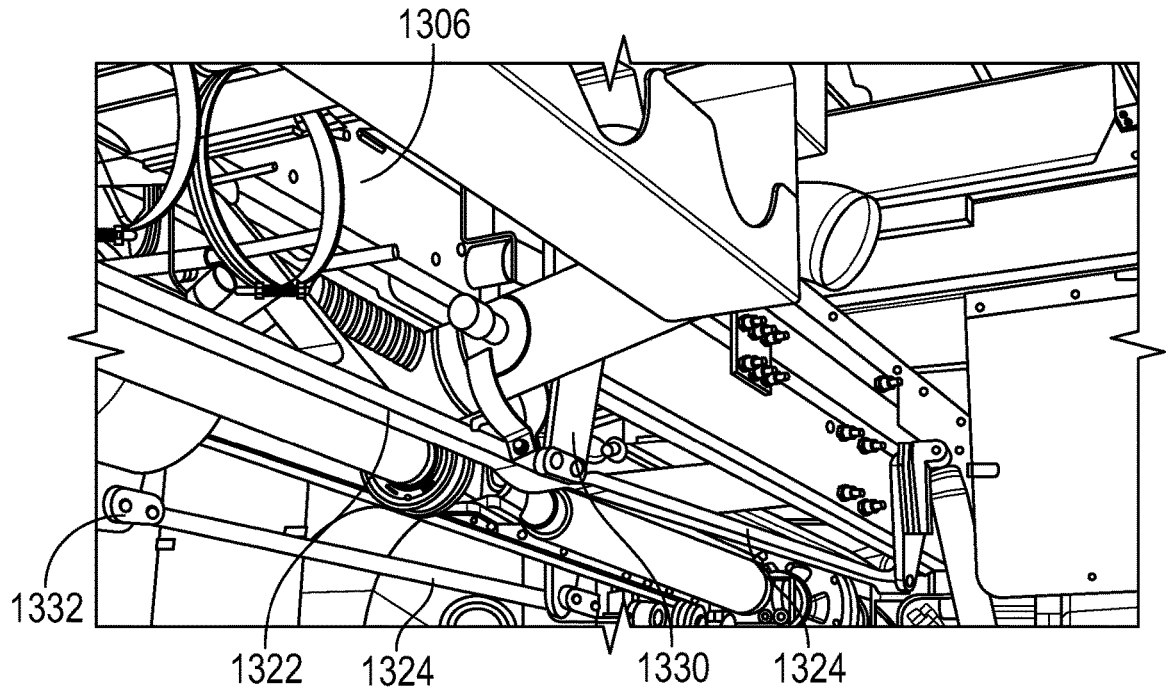
Figure 14A:
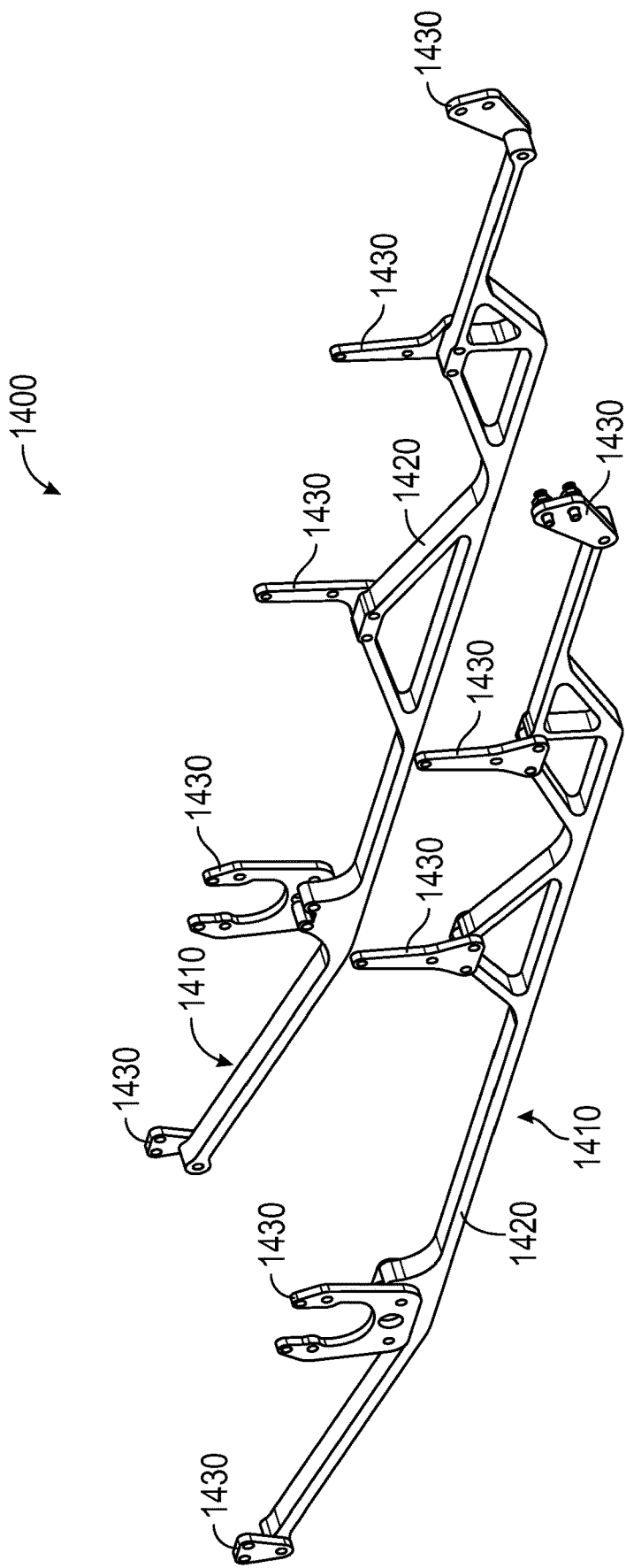
FIGS. 14A-14F are various views of a frame reinforcement system, according to various exemplary embodiments.
Figure 14B:
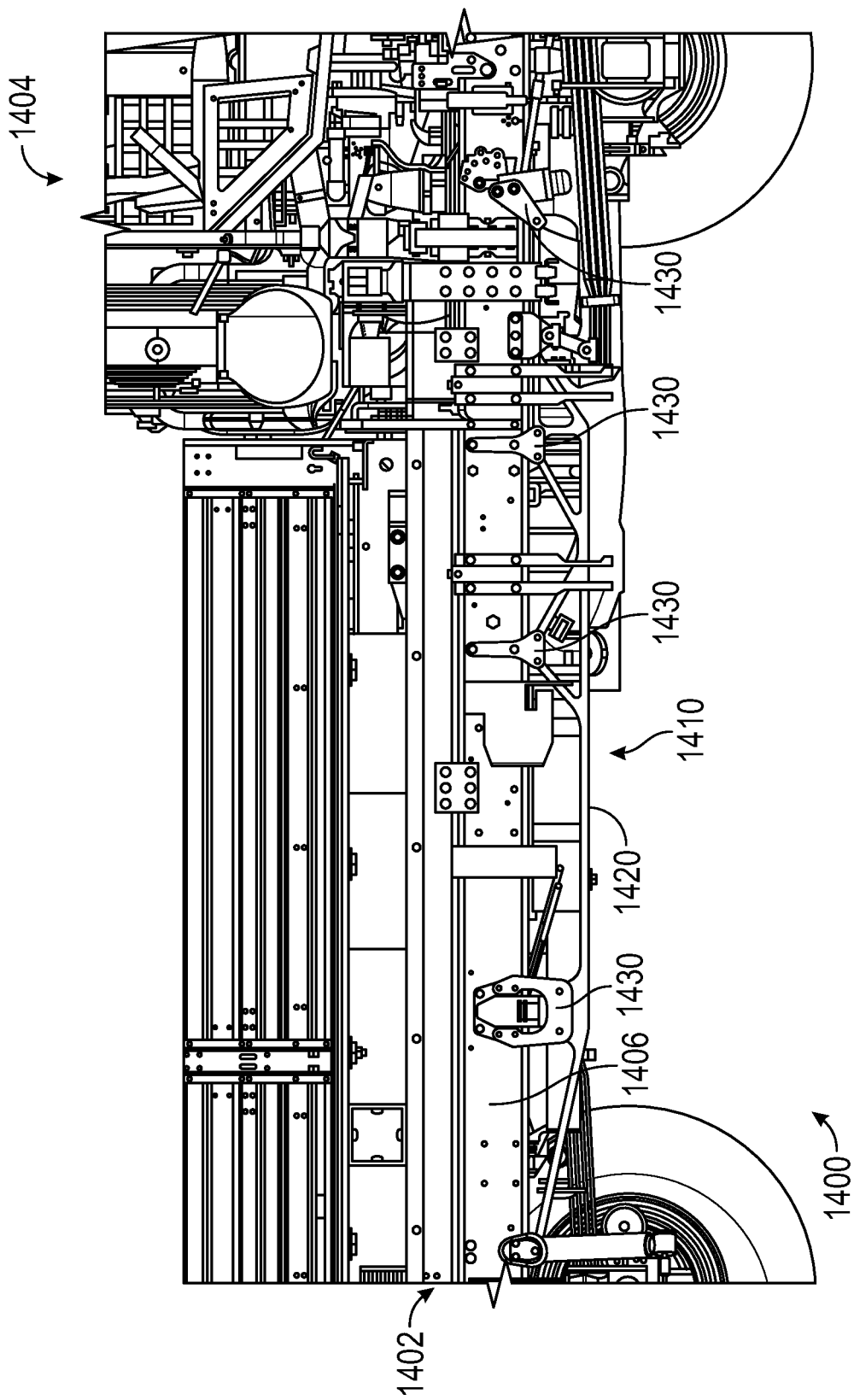
Figure 14C:
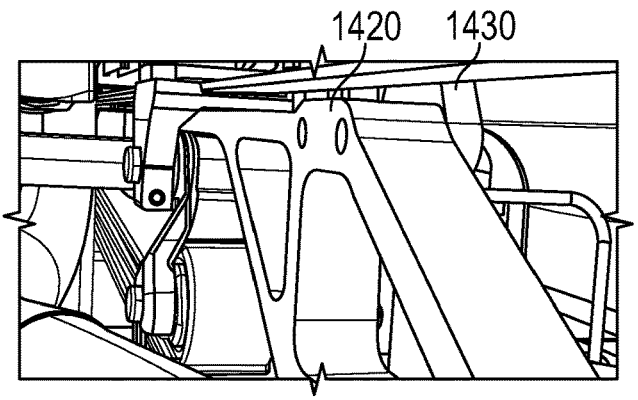
Figure 14D:
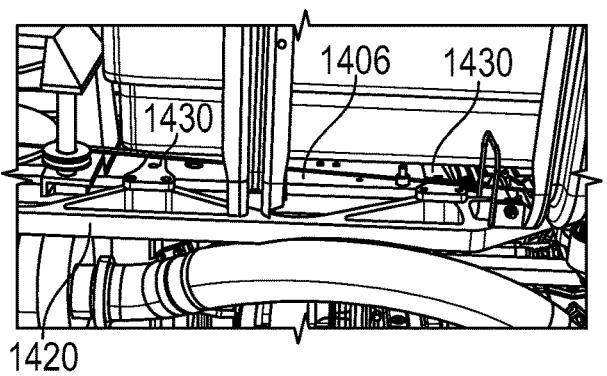
Figure 14E:
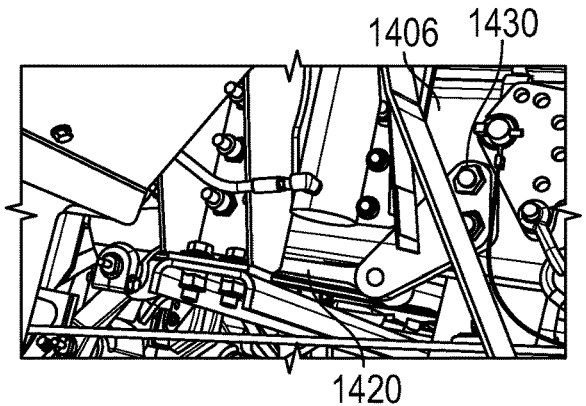
Figure 14F:
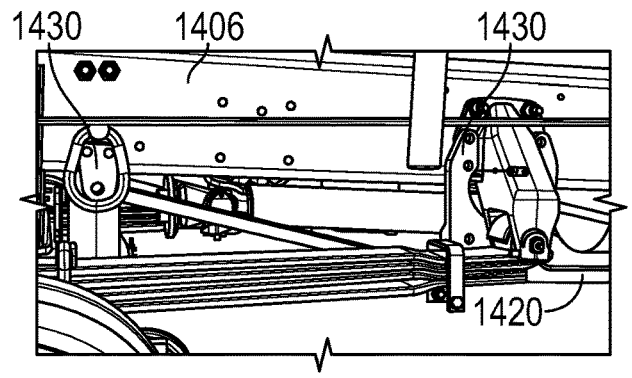

Referring to FIGS. 13A-13G, a reinforcement system, shown as reinforcement system 1300, is an alternative embodiment to the reinforcement system 1200. Reinforcement system 1300 may attach to a frame 1302 of a vehicle 1304, the frame 1302 having longitudinal frame rails 1306. Reinforcement system 1300 may include reinforcement assemblies 1310 each including a longitudinal reinforcement member 1320 and one or more reinforcement side plates 1330. As shown in FIG. 13A, the longitudinal reinforcement member 1320 includes a front portion 1322 and a rear portion 1324 separate from the front portion 1322. The front portion 1322 may be coupled to the rear portion 1324 using a reinforcement side plate 1330. By way of example, the reinforcement side plate 1330 may be widened in order to couple to both the front portion 1322 and the rear portion 1324. As shown in FIG. 13C, the reinforcement system additionally includes a coupling plate 1332. The coupling plate 1332 may be coupled to both the front portion 1322 and the rear portion 1324. As shown, the coupling plate 1332 does not extend to the frame 1302. The shape of the longitudinal reinforcement member 1320 may be modified (e.g., extended, cut out, etc.) to avoid portions of the vehicle 1304 and/or to increase structural rigidity in some areas. The shapes of the reinforcement side plates 1330 may be modified to fit around certain features or components (e.g., a bracket attached to the frame 1432).

Referring to FIGS. 14A-14F, a reinforcement system, shown as reinforcement system 1400, is an alternative embodiment to the reinforcement system 1200. Reinforcement system 1400 may attach to a frame 1402 of a vehicle 1404, the frame 1402 having longitudinal frame rails 1406. Reinforcement system 1400 may include reinforcement assemblies 1410 each including a longitudinal reinforcement member 1420 and one or more reinforcement side plates 1430. The shape of the longitudinal reinforcement member 1420 may be modified (e.g., extended, cut out, etc.) to avoid portions of the vehicle 1404 and/or to increase structural rigidity in some areas. The shapes of the reinforcement side plates 1430 may be modified to fit around certain features or components (e.g., a bracket attached to the frame 1402).

Frame Cross Member Assemblies

According to the exemplary embodiment shown in FIGS. 15-23, a frame assembly, shown as frame assembly 2012, includes a first frame rail, shown as left frame rail 2100; a second frame rail, shown as right frame rail 2120, spaced a target distance from the left frame rail 2100; a first cross member assembly, shown as front cross member assembly 2200; a second cross member assembly, shown as rear cross member assembly 2300; and/or a third cross member assembly, shown as rear cross member assembly 2400. The frame assembly 2012 may be used with the vehicle 10 and/or be the frame 12. As shown in FIGS. 15, 16, 18, and 21, the frame assembly 2012 has a first end, shown as front end 2014, and an opposing second end, shown as rear end 2016.

Figure 15:
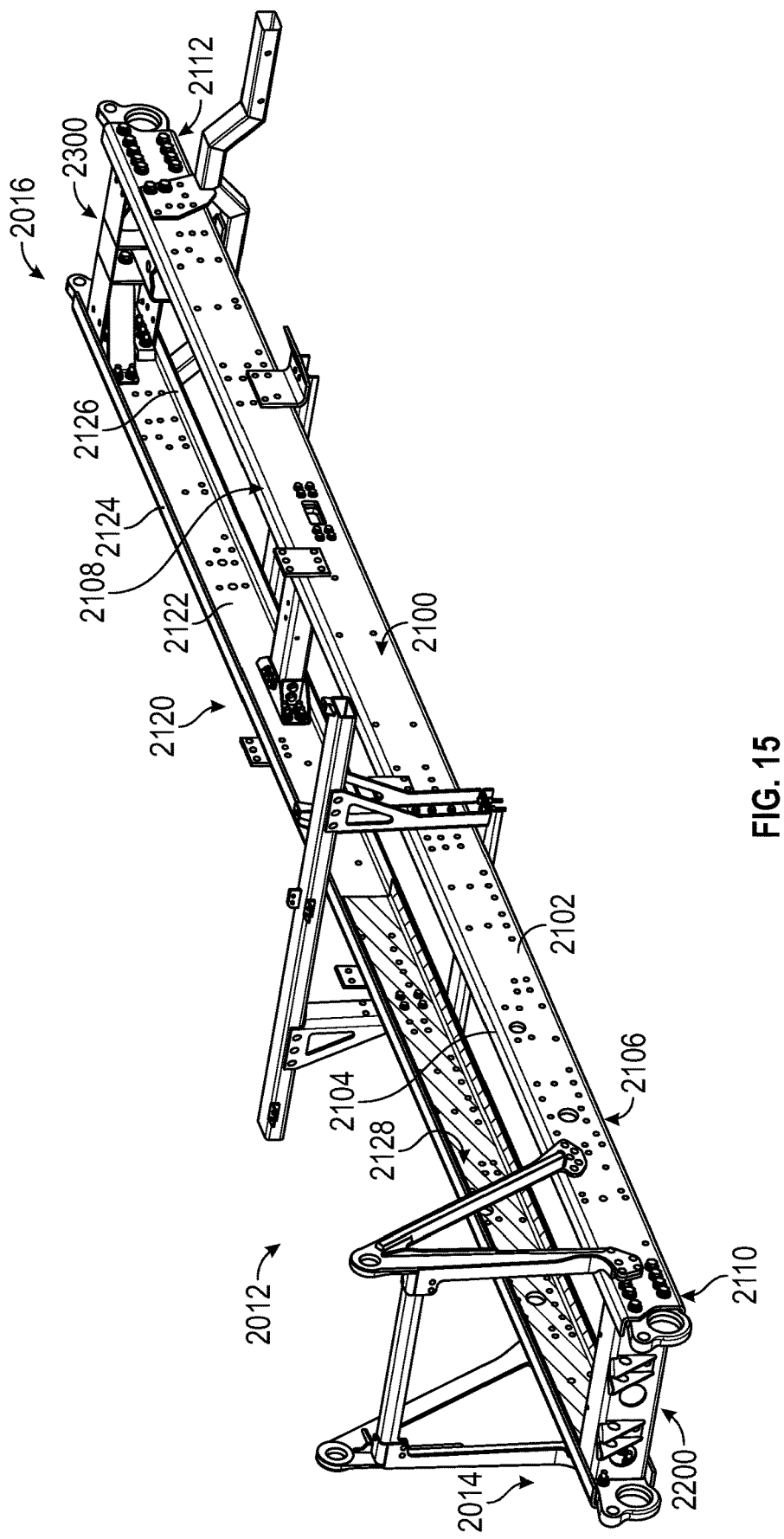
FIG. 15 is a perspective view of a frame assembly of the vehicle of FIG. 1, according to an exemplary embodiment.
Figure 16:
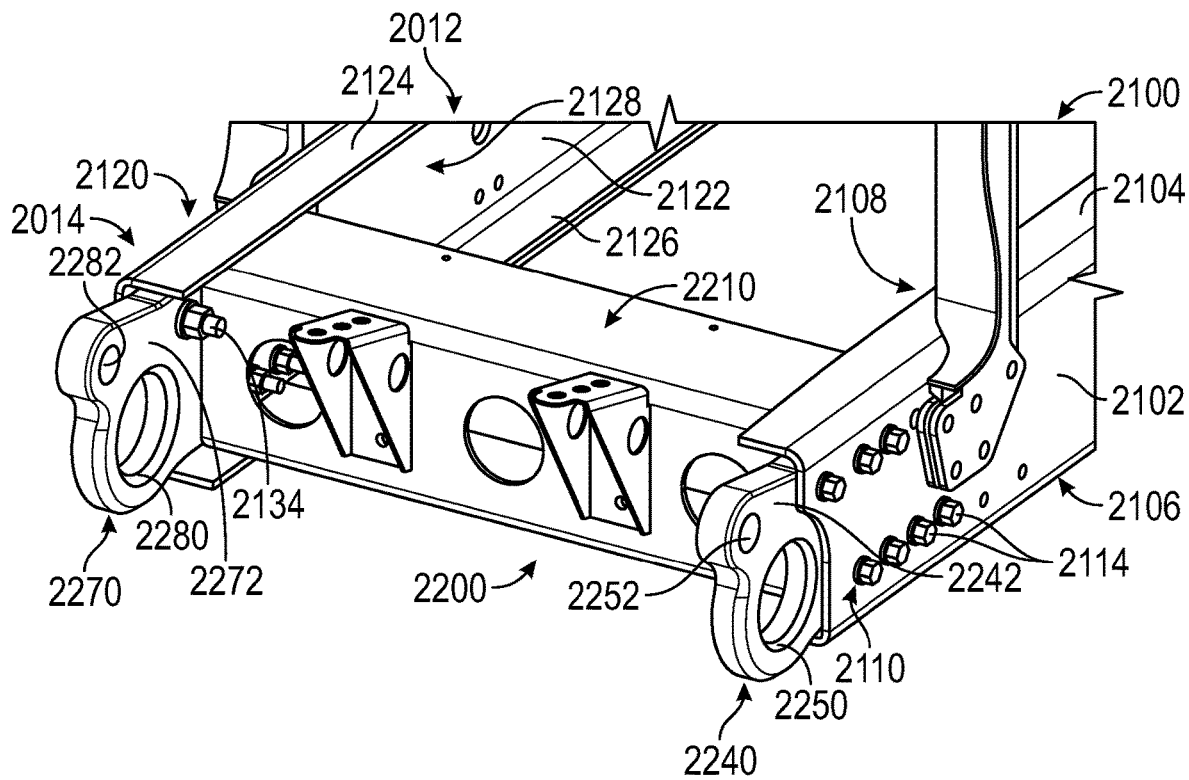
FIG. 16 is a detailed perspective view of a front cross member assembly coupled to the frame assembly of FIG. 15, according to an exemplary embodiment.
Figure 18:
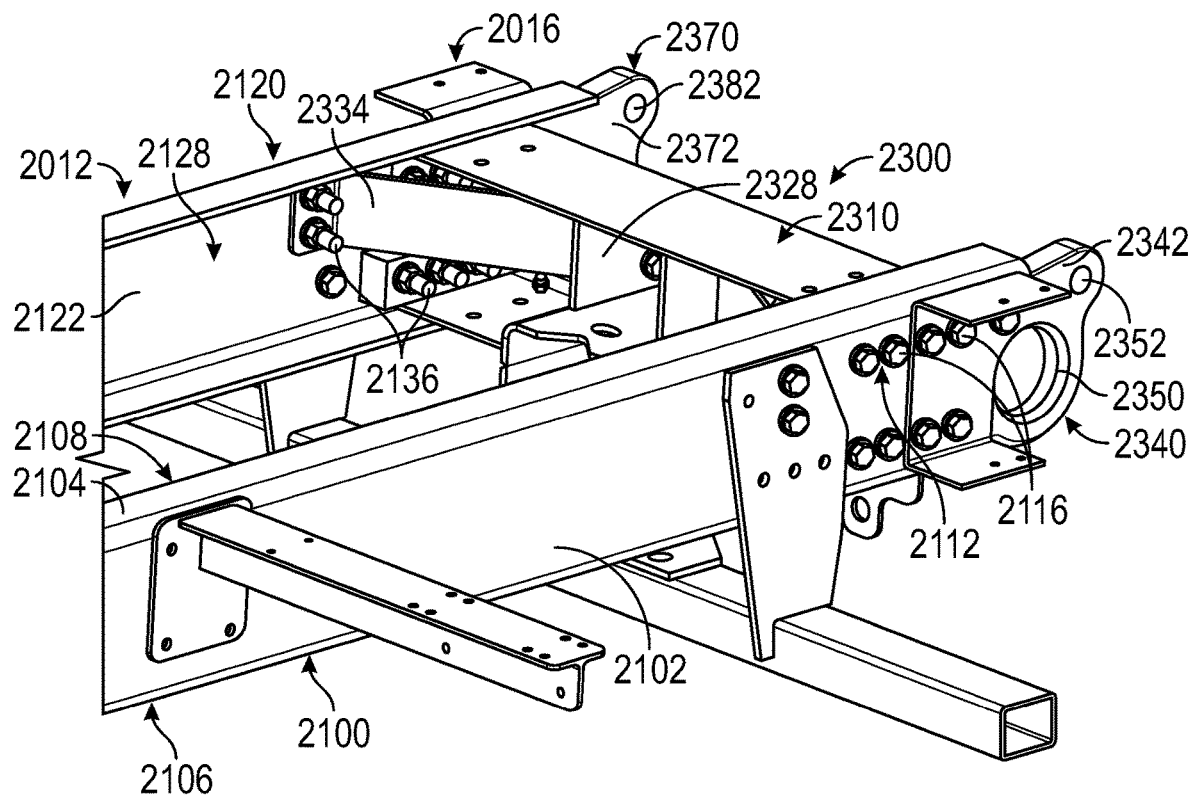
FIG. 18 is a detailed perspective view of a rear cross member assembly coupled to the frame assembly of FIG. 15, according to an exemplary embodiment.
Figure 21:
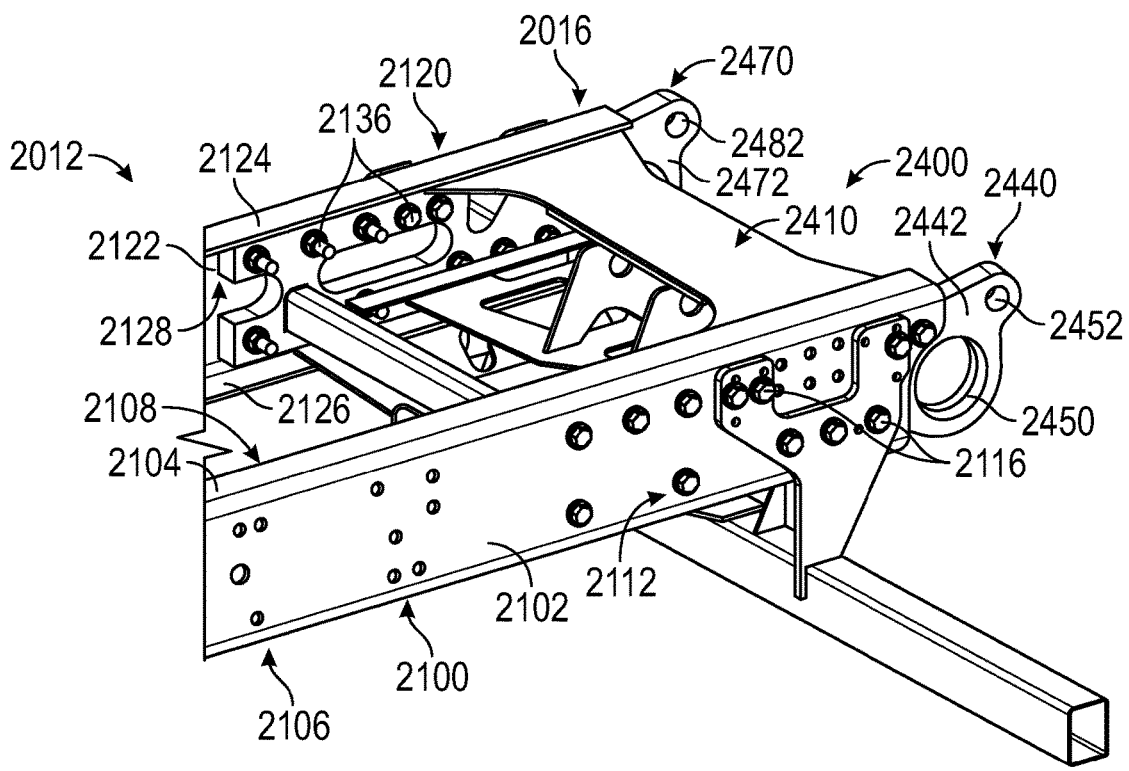
FIG. 21 is a detailed perspective view of a rear cross member assembly coupled to the frame assembly of FIG. 15, according to another exemplary embodiment.

As shown in FIGS. 15, 16, 18, and 21, the left frame rail 2100 includes a base, shown as base plate 2102; a first arm, shown as upper flange 2104, extending at angle (e.g., perpendicularly, etc.) from an upper end of the base plate 2102; and a second arm, shown as lower flange 2106, extending at an angle (e.g., perpendicularly, etc.) from a lower end of the base plate 2102. According to the exemplary embodiment shown in FIGS. 15, 16, 18, and 21, the base plate 2102, the upper flange 2104, and the lower flange 2106 of the left frame rail 2100 cooperatively define a first recess, shown as left C-channel 2108. In other embodiments, the left frame rail 2100 has a different cross-sectional shape. The upper flange 2104 and the lower flange 2106 may define a width of the left frame rail 2100, and the base plate 2102 may define a height of the left frame rail 2100. As shown in FIGS. 15 and 16, the front end 2014 of the base plate 2102 of the left frame rail 2100 defines a first plurality of apertures, shown as front apertures 2110. As shown in FIGS. 15, 18, and 21, the rear end 2016 of the base plate 2102 of the left frame rail 2100 defines a second plurality of apertures, shown as rear apertures 2112.

As shown in FIGS. 15, 16, 18, and 21, the right frame rail 2120 includes a base, shown as base plate 2122; a first arm, shown as upper flange 2124, extending at an angle (e.g., perpendicularly, etc.) from an upper end of the base plate 2122; and a second arm, shown as lower flange 2126, extending at an angle (e.g., perpendicularly, etc.) from a lower end of the base plate 2122. According to the exemplary embodiment shown in FIGS. 15, 16, 18, and 21, the base plate 2122, the upper flange 2124, and the lower flange 2126 of the right frame rail 2120 cooperatively define a second recess, shown as right C-channel 2128. In other embodiments, the right frame rail 2120 has a different cross-sectional shape. The upper flange 2124 and the lower flange 2126 may define a width of the right frame rail 2120, and the base plate 2122 may define a height of the right frame rail 2120. According to an exemplary embodiment, the front end 2014 of the base plate 2122 of the right frame rail 2120 defines a first plurality of apertures (e.g., front apertures, similar to the front apertures 2110 of the left frame rail 2100, etc.) and the rear end 2016 of the right frame rail 2120 defines a second plurality of apertures (e.g., rear apertures, similar to the rear apertures 2112 of the left frame rail 2100, etc.).

Figure 17:
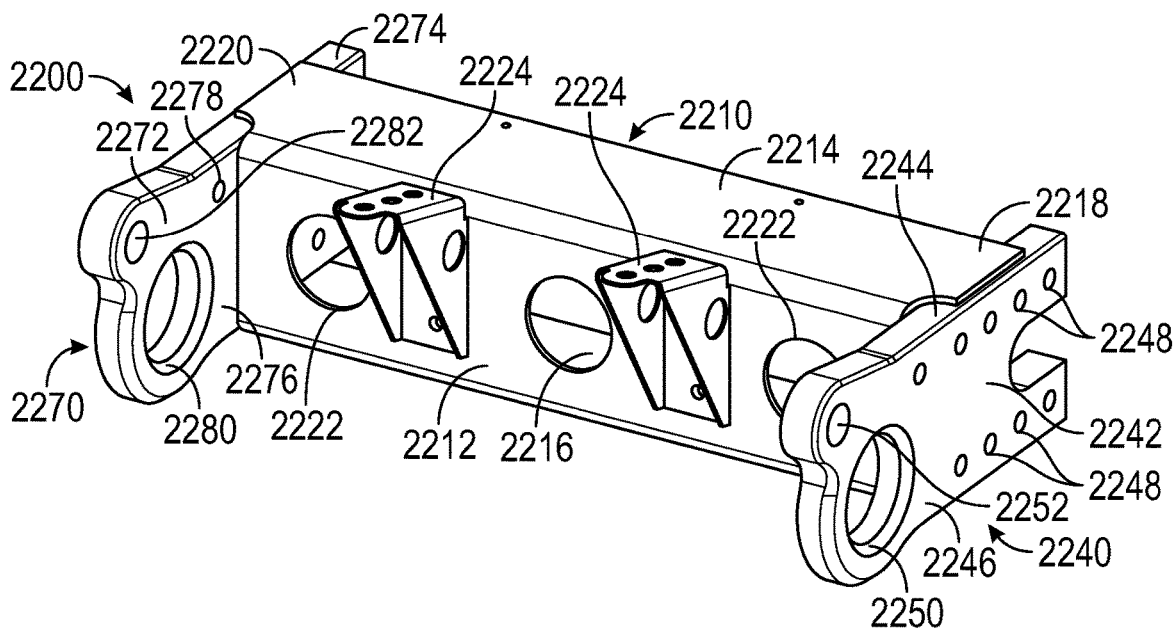
FIG. 17 is a front perspective view of the front cross member assembly of FIG. 16, according to an exemplary embodiment.

As shown in FIGS. 15 and 16, the front cross member assembly 2200 is coupled to the front end 2014 of the frame assembly 2012 and extends between the left frame rail 2100 and the right frame rail 2120. As shown in FIGS. 16 and 17, the front cross member assembly 2200 includes a cross member, shown as front cross member 2210; a first coupling member, shown as left attachment member 2240; and a second coupling member, shown as right attachment member 2270. As shown in FIG. 17, the front cross member 2210 includes a first plate, shown as front plate 2212; a second plate, shown as upper plate 2214, extending at an angle (e.g., perpendicularly, etc.) from the front plate 2212; and a third plate, shown as lower plate 2216, extending at an angle (e.g., perpendicularly, etc.) from the front plate 2212. According to an exemplary embodiment, the front plate 2212, the upper plate 2214, and the lower plate 2216 are integrally formed. In other embodiments, the front plate 2212, the upper plate 2214, and the lower plate 2216 are fixedly coupled (e.g., welded together, etc.).

As shown in FIG. 17, the upper plate 2214 has a first extension, shown as left flange 2218, extending from a first lateral end (e.g., a left end, etc.) of the upper plate 2214 and a second extension, shown as right flange 2220, extending from an opposing second lateral end (e.g., a right end, etc.) of the upper plate 2214. According to an exemplary embodiment, the lower plate 2216 has a first extension (e.g., a left flange, similar to the left flange 2218 of the upper plate 2214, etc.) extending from a first lateral end (e.g., a left end, etc.) of the lower plate 2216 and a second extension (e.g., a right flange, similar to the right flange 2220 of the upper plate 2214, etc.) extending from an opposing second lateral end (e.g., a right end, etc.) of the lower plate 2216. As shown in FIG. 17, the front plate 2212 defines a plurality of apertures, shown as front apertures 2222, spaced along a longitudinal length thereof. As shown in FIG. 17, the front cross member 2210 includes a plurality of brackets, shown as front brackets 2224, coupled to and extending from the front plate 2212. The front brackets 2224 may be used to facilitate coupling other components of the vehicle 10 (e.g., the front cabin 20, the hood 238, a front bumper, etc.) to the frame assembly 2012.

As shown in FIGS. 16 and 17, the left attachment member 2240 includes a body, shown as left end plate 2242, having a first surface, shown as upper edge 2244, and an opposing second surface, shown as lower edge 2246. As shown in FIG. 17, the left flange 2218 of the upper plate 2214 and the left flange of the lower plate 2216 are positioned to receive the left end plate 2242 such that the left flange 2218 of the upper plate 2214 engages the upper edge 2244 of the left end plate 2242 and the left flange of the lower plate 2216 engages the lower edge 2246 of the left end plate 2242. According to an exemplary embodiment, the front cross member 2210 and the left end plate 2242 are fixedly coupled together (e.g., welded, etc.). In other embodiments, the front cross member 2210 and the left end plate 2242 are releasably coupled together (e.g., with fasteners, etc.). In an alternative embodiment, the front cross member 2210 and the left end plate 2242 are integrally formed. As shown in FIG. 17, the left end plate 2242 defines a plurality of apertures, shown as left apertures 2248.

As shown in FIGS. 16 and 17, the right attachment member 2270 includes a body, shown as right end plate 2272, having a first surface, shown as upper edge 2274, and an opposing second surface, shown as lower edge 2276. As shown in FIG. 17, the right flange 2220 of the upper plate 2214 and the right flange of the lower plate 2216 are positioned to receive the right end plate 2272 such that the right flange 2220 of the upper plate 2214 engages the upper edge 2274 of the right end plate 2272 and the right flange of the lower plate 2216 engages the lower edge 2276 of the right end plate 2272. As shown in FIGS. 16 and 17, the front cross member 2210 extends between the left end plate 2242 and the right end plate 2272. According to an exemplary embodiment, the front cross member 2210 and the right end plate 2272 are fixedly coupled together (e.g., welded, etc.). In other embodiments, the front cross member 2210 and the right end plate 2272 are releasably coupled together (e.g., with fasteners, etc.). In an alternative embodiment, the front cross member 2210 and the right end plate 2272 are integrally formed. As shown in FIG. 17, the right end plate 2272 defines a plurality of apertures, shown as right apertures 2278.

As shown in FIG. 16, the left end plate 2242 is positioned within, and releasably received by, the left C-channel 2108 of the left frame rail 2100. According to an exemplary embodiment, the left apertures 2248 of the left end plate 2242 are positioned to correspond and align with the front apertures 2110 of the base plate 2102 of the left frame rail 2100. As shown in FIG. 16, the frame assembly 2012 includes a first plurality of fasteners, shown as fasteners 2114. According to an exemplary embodiment, the fasteners 2114 are configured to be received by the front apertures 2110 of the base plate 2102 of the left frame rail 2100 and the left apertures 2248 of the left end plate 2242 to facilitate releasably coupling the left end plate 2242 and the front cross member 2210 to the left frame rail 2100.

As shown in FIG. 16, the right end plate 2272 is positioned within, and releasably received by, the right C-channel 2128 of the right frame rail 2120. According to an exemplary embodiment, the right apertures 2278 of the right end plate 2272 are positioned to correspond and align with the front apertures of the base plate 2122 of the right frame rail 2120. As shown in FIG. 16, the frame assembly 2012 includes a second plurality of fasteners, shown as fasteners 2134. According to an exemplary embodiment, the fasteners 2134 are configured to be received by the front apertures of the base plate 2122 of the right frame rail 2120 and the right apertures 2278 of the right end plate 2272 to facilitate releasably coupling the right end plate 2272 and the front cross member 2210 to the right frame rail 2120.

As shown in FIGS. 16 and 17, the left attachment member 2240 includes a first interface (e.g., an aperture, etc.), shown as left tow eye 2250, and a second interface (e.g., an aperture, etc.), shown left tie down 2252, extending from the left end plate 2242. As shown in FIG. 16, the left tow eye 2250 and the left tie down 2252 are positioned such that the left tow eye 2250 and the left tie down 2252 extend from the front end 2014 of the left C-channel 2108 of the left frame rail 2100. As shown in FIGS. 16 and 17, the right attachment member 2270 includes a first interface (e.g., an aperture, etc.), shown as right tow eye 2280, and a second interface (e.g., an aperture, etc.), shown right tie down 2282, extending from the right end plate 2272. As shown in FIG. 16, the right tow eye 2280 and the right tie down 2282 are positioned such that the right tow eye 2280 and the right tie down 2282 extend from the front end 2014 of the right C-channel 2128 of the right frame rail 2120.

According to an exemplary embodiment, the left tow eye 2250 and the right tow eye 2280 are configured to facilitate (i) towing (e.g., pushing, pulling, etc.) an object and/or another vehicle with the vehicle 10 and/or (ii) towing the vehicle 10. By way of example, the left tow eye 2250 and/or the right tow eye 2280 may receive a chain, a rope, and/or a strap to connect the front end 2014 of the frame assembly 2012 to an object and/or another vehicle 10. According to an exemplary embodiment, the left tow eye 2250, the right tow eye 2280, the left tie down 2252, the right tie down 2282, and/or the front apertures 2222 are configured to facilitate securing the front end 2014 of the frame assembly 2012 and/or the vehicle 10 to a surface or object. By way of example, the left tow eye 2250, the right tow eye 2280, the left tie down 2252, the right tie down 2282, and/or the front apertures 2222 may receive a chain, a rope, and/or a strap to secure the front end 2014 of the frame assembly 2012 and/or the vehicle 10 to the platform of a rail car, the floor of an aircraft carrier, the bed of a trailer, etc.

Figure 19:
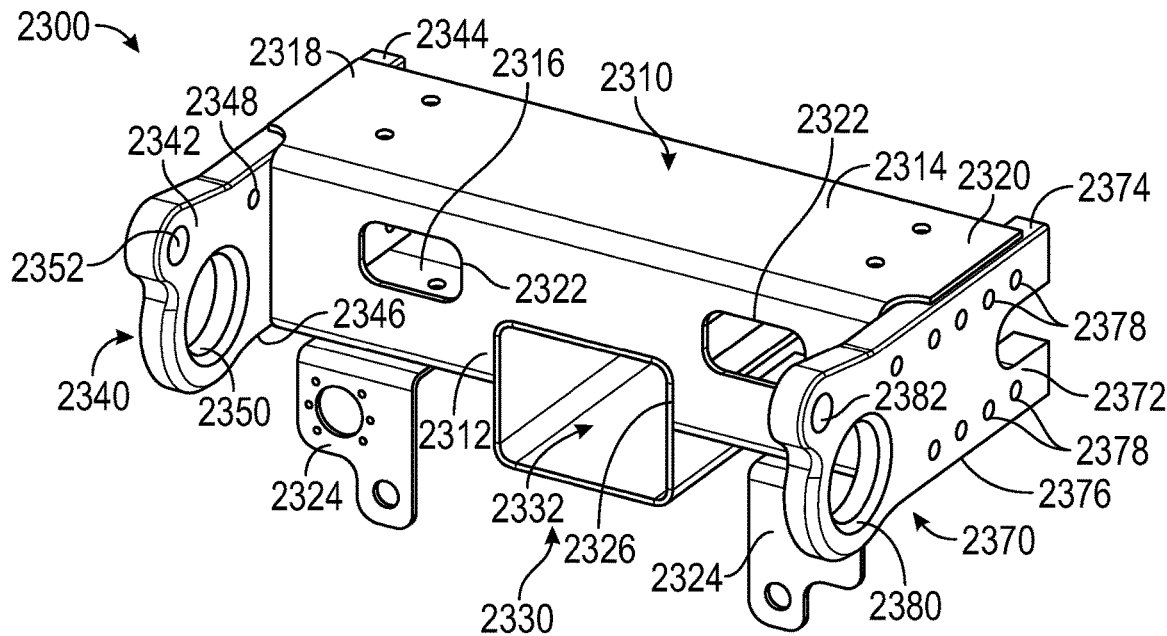
FIG. 19 is a front perspective view of the rear cross member assembly of FIG. 18, according to an exemplary embodiment.
Figure 20:
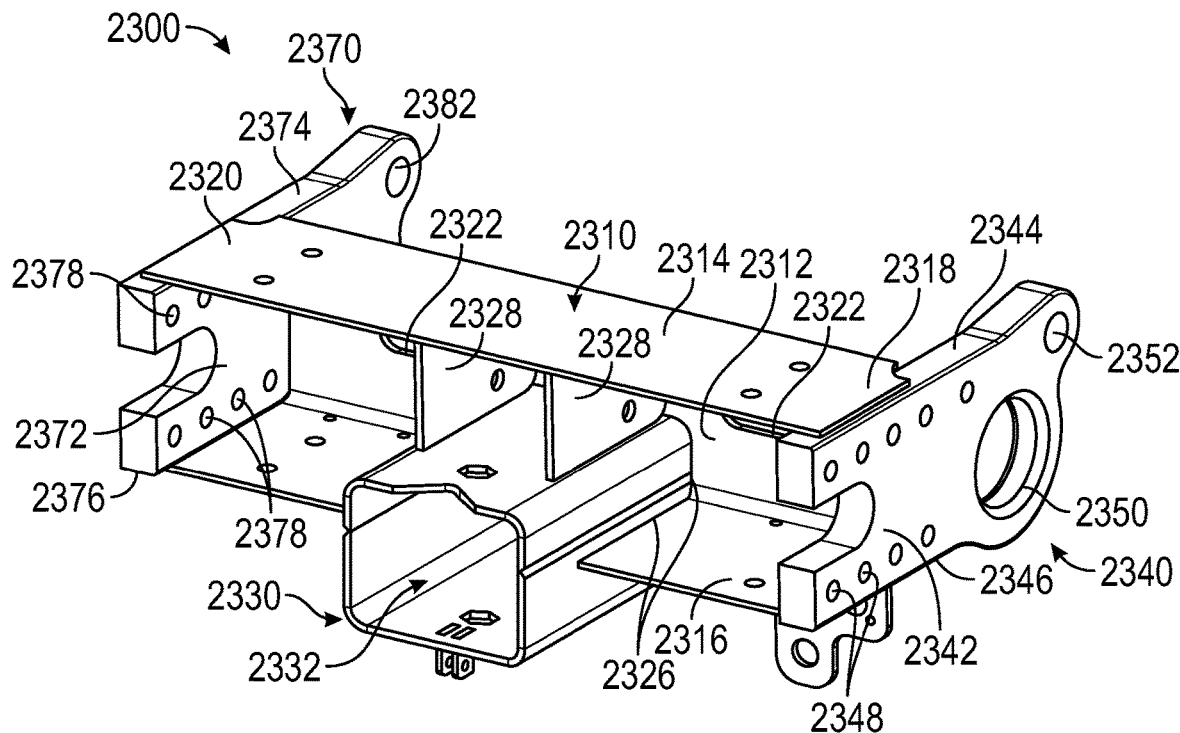
FIG. 20 is a rear perspective view of the rear cross member assembly of FIG. 18, according to an exemplary embodiment.

As shown in FIGS. 15 and 18, the rear cross member assembly 2300 is coupled to the rear end 2016 of the frame assembly 2012 and extends between the left frame rail 2100 and the right frame rail 2120. In an alternative embodiment, the front cross member assembly 2200 is coupled to the rear end 2016 of the frame assembly 2012 and extends between the left frame rail 2100 and the right frame rail 2120. As shown in FIGS. 18-20, the rear cross member assembly 2300 includes a cross member, shown as rear cross member 2310; a receiver, shown as hitch receiver 2330; a first coupling member, shown as left attachment member 2340; and a second coupling member, shown as right attachment member 2370. As shown in FIGS. 19 and 20, the rear cross member 2310 includes a first plate, shown as rear plate 2312; a second plate, shown as upper plate 2314, extending at an angle (e.g., perpendicularly, etc.) from the rear plate 2312; and a third plate, shown as lower plate 2316, extending at an angle (e.g., perpendicularly, etc.) from the rear plate 2312. According to an exemplary embodiment, the rear plate 2312, the upper plate 2314, and the lower plate 2316 are integrally formed. In other embodiments, the rear plate 2312, the upper plate 2314, and the lower plate 2316 are fixedly coupled (e.g., welded together, etc.).

As shown in FIGS. 19 and 20, the upper plate 2314 has a first extension, shown as left flange 2318, extending from a first lateral end (e.g., a left end, etc.) of the upper plate 2314 and a second extension, shown as right flange 2320, extending from an opposing second lateral end (e.g., a right end, etc.) of the upper plate 2314. According to an exemplary embodiment, the lower plate 2316 has a first extension (e.g., a left flange, similar to the left flange 2318 of the upper plate 2314, etc.) extending from a first lateral end (e.g., a left end, etc.) of the lower plate 2316 and a second extension (e.g., a right flange, similar to the right flange 2320 of the upper plate 2314, etc.) extending from an opposing second lateral end (e.g., a right end, etc.) of the lower plate 2316. As shown in FIGS. 19 and 20, the rear plate 2312 defines a plurality of apertures, shown as rear apertures 2322, spaced along a longitudinal length thereof. As shown in FIG. 19, the rear cross member 2310 includes a plurality of brackets, shown as rear brackets 2324, coupled to and extending from the lower plate 2316. The rear brackets 2324 may be used to facilitate coupling other components of the vehicle 10 to the frame assembly 2012.

As shown in FIGS. 19 and 20, the rear plate 2312 and the lower plate 2316 cooperatively define an aperture, shown as cutout 326. The cutout 2326 is configured (e.g., positioned, sized, structured, etc.) to receive the hitch receiver 2330 such that the hitch receiver 2330 extends from the rear plate 2312 towards the front end 2014 of the frame assembly 2012. As shown in FIGS. 19 and 20, the hitch receiver 2330 defines an aperture, shown as hitch slot 2332. According to an exemplary embodiment, the hitch slot 2332 is configured to selectively and slidably receive a towing mechanism (e.g., a ball hitch, a pintle hook hitch, etc.). By way of example, a pin may be configured to pass through both the hitch receiver 2330 and the towing mechanism to selectively fix the towing mechanism within the hitch slot 2332. The hitch receiver 2330 may thereby facilitate towing (e.g., pushing, pulling, etc.) an object, a trailer, and/or another vehicle with the vehicle 10. As shown in FIGS. 18 and 20, the rear cross member assembly 2300 includes supports, shown as support plates 2328, positioned to extend (e.g., vertically, etc.) between the upper plate 2314, the rear plate 2312, and the hitch receiver 2330.

As shown in FIG. 18, the rear cross member assembly 2300 includes brackets, shown as support brackets 2334, positioned to extend (e.g., at an angle, etc.) between (i) the support plates 2328 and (ii) the base plate 2102 of the left frame rail 2100 and the base plate 2122 of the right frame rail 2120. According to an exemplary embodiment, the support brackets 2334 are releasably coupled to the support plates 2328, the left frame rail 2100, and the right frame rail 2120 (e.g., with fasteners, etc.). The support plates 2328 and/or the support brackets 2334 may provide support to the hitch receiver 2330 to increase the strength of the rear cross member assembly 2300 and/or increase the towing capacity of the rear cross member assembly 2300. According to an exemplary embodiment, the rear cross member 2310, the support plates 2328, and the hitch receiver 2330 are fixedly coupled together (e.g., welded, etc.). In other embodiments, the rear cross member 2310, the support plates 2328, and/or the hitch receiver 2330 are releasably coupled together (e.g., with fasteners, etc.). In an alternative embodiment, the rear cross member 2310, the support plates 2328, and/or the hitch receiver 2330 are integrally formed.

As shown in FIGS. 18-20, the left attachment member 2340 includes a body, shown as left end plate 2342, having a first surface, shown as upper edge 2344, and an opposing second surface, shown as lower edge 2346. As shown in FIGS. 19 and 20, the left flange 2318 of the upper plate 2314 and the left flange of the lower plate 2316 are positioned to receive the left end plate 2342 such that the left flange 2318 of the upper plate 2314 engages the upper edge 2344 of the left end plate 2342 and the left flange of the lower plate 2316 engages the lower edge 2346 of the left end plate 2342. According to an exemplary embodiment, the rear cross member 2310 and the left end plate 2342 are fixedly coupled together (e.g., welded, etc.). In other embodiments, the rear cross member 2310 and the left end plate 2342 are releasably coupled together (e.g., with fasteners, etc.). In an alternative embodiment, the rear cross member 2310 and the left end plate 2342 are integrally formed. As shown in FIGS. 19 and 20, the left end plate 2342 defines a plurality of apertures, shown as left apertures 2348.

As shown in FIGS. 18-20, the right attachment member 2370 includes a body, shown as right end plate 2372, having a first surface, shown as upper edge 2374, and an opposing second surface, shown as lower edge 2376. As shown in FIGS. 19 and 20, the right flange 2320 of the upper plate 2314 and the right flange of the lower plate 2316 are positioned to receive the right end plate 2372 such that the right flange 2320 of the upper plate 2314 engages the upper edge 2374 of the right end plate 2372 and the right flange of the lower plate 2316 engages the lower edge 2376 of the right end plate 2372. As shown in FIGS. 18-20, the rear cross member 2310 extends between the left end plate 2342 and the right end plate 2372. According to an exemplary embodiment, the rear cross member 2310 and the right end plate 2372 are fixedly coupled together (e.g., welded, etc.). In other embodiments, the rear cross member 2310 and the right end plate 2372 are releasably coupled together (e.g., with fasteners, etc.). In an alternative embodiment, the rear cross member 2310 and the right end plate 2372 are integrally formed. As shown in FIGS. 19 and 20, the right end plate 2372 defines a plurality of apertures, shown as right apertures 2378.

As shown in FIG. 18, the left end plate 2342 is positioned within, and releasably received by, the left C-channel 2108 of the left frame rail 2100. According to an exemplary embodiment, the left apertures 2348 of the left end plate 2342 are positioned to correspond and align with the rear apertures 2112 of the base plate 2102 of the left frame rail 2100. As shown in FIG. 18, the frame assembly 2012 includes a third plurality of fasteners, shown as fasteners 2116. According to an exemplary embodiment, the fasteners 2116 are configured to be received by the rear apertures 2112 of the base plate 2102 of the left frame rail 2100 and the left apertures 2348 of the left end plate 2342 to facilitate releasably coupling the left end plate 2342 and the rear cross member 2310 to the left frame rail 2100.

As shown in FIG. 18, the right end plate 2372 is positioned within, and releasably received by, the right C-channel 2128 of the right frame rail 2120. According to an exemplary embodiment, the right apertures 2378 of the right end plate 2372 are positioned to correspond and align with the rear apertures of the base plate 2122 of the right frame rail 2120. As shown in FIG. 18, the frame assembly 2012 includes a fourth plurality of fasteners, shown as fasteners 2136. According to an exemplary embodiment, the fasteners 2136 are configured to be received by the rear apertures of the base plate 2122 of the right frame rail 2120 and the right apertures 2378 of the right end plate 2372 to facilitate releasably coupling the right end plate 2372 and the rear cross member 2310 to the right frame rail 2120.

As shown in FIGS. 18-20, the left attachment member 2340 includes a first interface (e.g., an aperture, etc.), shown as left tow eye 2350, and a second interface (e.g., an aperture, etc.), shown left tie down 2352, extending from the left end plate 2342. As shown in FIG. 18, the left tow eye 2350 and the left tie down 2352 are positioned such that the left tow eye 2350 and the left tie down 2352 extend from the rear end 2016 of the left C-channel 2108 of the left frame rail 2100. As shown in FIGS. 18-20, the right attachment member 2370 includes a first interface (e.g., an aperture, etc.), shown as right tow eye 2380, and a second interface (e.g., an aperture, etc.), shown right tie down 2382, extending from the right end plate 2372. As shown in FIG. 18, the right tow eye 2380 and the right tie down 2382 are positioned such that the right tow eye 2380 and the right tie down 2382 extend from the rear end 2016 of the right C-channel 2128 of the right frame rail 2120.

According to an exemplary embodiment, the left tow eye 2350 and the right tow eye 2380 are configured to facilitate (i) towing (e.g., pushing, pulling, etc.) an object and/or another vehicle with the vehicle 10 and/or (ii) towing the vehicle 10. By way of example, the left tow eye 2350 and/or the right tow eye 2380 may receive a chain, a rope, and/or a strap to connect the rear end 2016 of the frame assembly 2012 to an object and/or another vehicle 10. According to an exemplary embodiment, the left tow eye 2350, the right tow eye 2380, the left tie down 2352, the right tie down 2382, and/or the rear apertures 2322 are configured to facilitate securing the rear end 2016 of the frame assembly 2012 and/or the vehicle 10 to a surface or object. By way of example, the left tow eye 2350, the right tow eye 2380, the left tie down 2352, the right tie down 2382, and/or the rear apertures 2322 may receive a chain, a rope, and/or a strap to secure the rear end 2016 of the frame assembly 2012 and/or the vehicle 10 to the platform of a rail car, the floor of an aircraft carrier, the bed of a trailer, etc.

Figure 22:
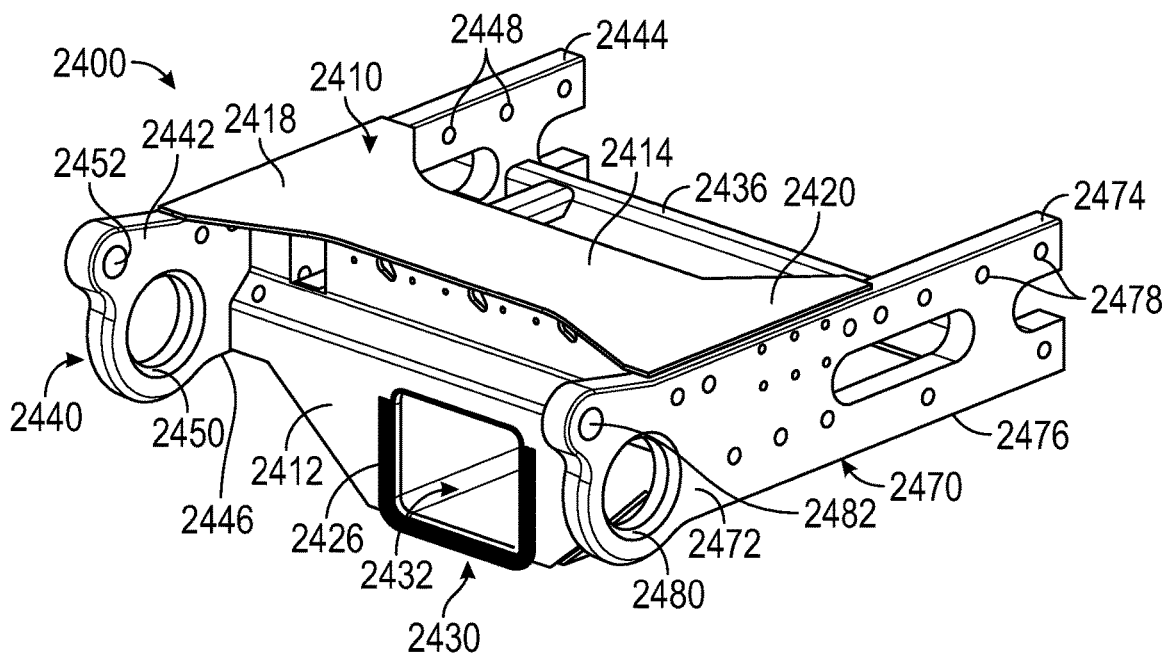
FIG. 22 is a front perspective view of the rear cross member assembly of FIG. 21, according to an exemplary embodiment.
Figure 23:
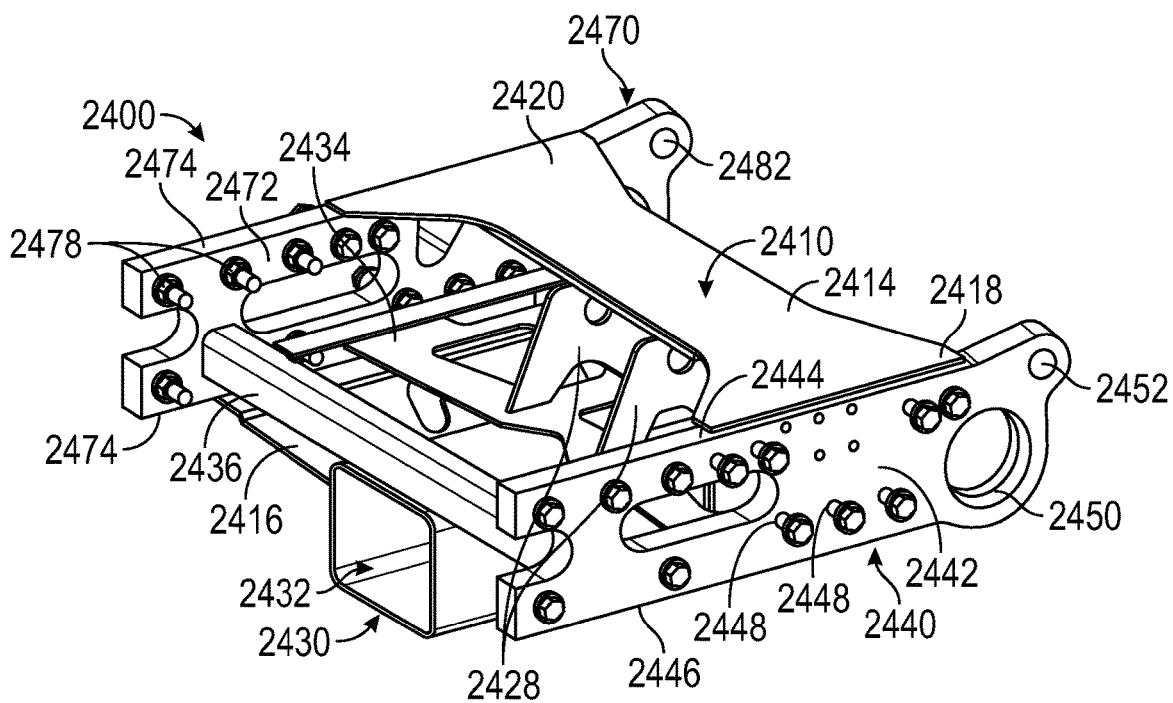
FIG. 23 is a rear perspective view of the rear cross member assembly of FIG. 21, according to an exemplary embodiment.

As shown in FIG. 21, the rear cross member assembly 2400 is coupled to the rear end 2016 of the frame assembly 2012 and extends between the left frame rail 2100 and the right frame rail 2120 (e.g., the rear cross member assembly 2400 may replace and/or be interchangeable with the rear cross member assembly 2300, etc.). As shown in FIGS. 21-23, the rear cross member assembly 2400 includes a cross member, shown as rear cross member 2410; a receiver, shown as hitch receiver 2430; a first coupling member, shown as left attachment member 2440; and a second coupling member, shown as right attachment member 2470. As shown in FIGS. 22 and 23, the rear cross member 2410 includes a first plate, shown as rear plate 2412; a second plate, shown as upper plate 2414, extending at an angle (e.g., perpendicularly, etc.) from the rear plate 2412; and a third plate, shown as lower plate 2416, extending at an angle (e.g., perpendicularly, etc.) from the rear plate 2412. In some embodiments, the rear plate 2412, the upper plate 2414, and the lower plate 2416 are integrally formed. In some embodiments, the rear plate 2412, the upper plate 2414, and the lower plate 2416 are fixedly coupled (e.g., welded together, etc.).

As shown in FIGS. 22 and 23, the upper plate 2414 has a first extension, shown as left flange 2418, extending from a first lateral end (e.g., a left end, etc.) of the upper plate 2414 and a second extension, shown as right flange 2420, extending from an opposing second lateral end (e.g., a right end, etc.) of the upper plate 2414. According to an exemplary embodiment, the lower plate 2416 has a first extension (e.g., a left flange, similar to the left flange 2418 of the upper plate 2414, etc.) extending from a first lateral end (e.g., a left end, etc.) of the lower plate 2416 and a second extension (e.g., a right flange, similar to the right flange 2420 of the upper plate 2414, etc.) extending from an opposing second lateral end (e.g., a right end, etc.) of the lower plate 2416.

As shown in FIG. 22, the rear plate 2412 defines an aperture, shown as cutout 2426. The cutout 2426 is configured (e.g., positioned, sized, structured, etc.) to receive the hitch receiver 2430 such that the hitch receiver 2430 extends from the rear plate 2412 towards the front end 2014 of the frame assembly 2012. As shown in FIGS. 22 and 23, the hitch receiver 2430 defines an aperture, shown as hitch slot 2432. According to an exemplary embodiment, the hitch slot 2432 is configured to selectively and slidably receive a towing mechanism (e.g., a ball hitch, a pintle hook hitch, etc.). By way of example, a pin may be configured to pass through both the hitch receiver 2430 and the towing mechanism to selectively fix the towing mechanism within the hitch slot 2432. The hitch receiver 2430 may thereby facilitate towing (e.g., pushing, pulling, etc.) an object and/or another vehicle with the vehicle 10.

As shown in FIG. 23, the rear cross member assembly 2400 includes an intermediate plate, shown as intermediate plate 2434, positioned to extend from the rear plate 2412 along a top surface of the hitch receiver 2430. As shown in FIG. 23, the rear cross member assembly 2400 includes supports, shown as support plates 2428, positioned to extend between the upper plate 2414, the rear plate 2412, and intermediate plate 2434. As shown in FIGS. 22 and 23, the rear cross member assembly 2400 includes a support member, shown as lateral support bar 2436, positioned to extend between the left attachment member 2440 and the right attachment member 2470 (e.g., proximate a front end thereof, an end opposite the rear plate 2412, etc.). The support plates 2428, the intermediate plate 2434, and the lateral support bar 2436 may provide support to the hitch receiver 2430 to increase the strength of the rear cross member assembly 2400 and/or increase the towing capacity of the rear cross member assembly 2400. According to an exemplary embodiment, the rear cross member 2410, the support plates 2428, the hitch receiver 2430, the intermediate plate 2434, and the lateral support bar 2436 are fixedly coupled together (e.g., welded, etc.). In other embodiments, the rear cross member 2410, the support plates 2428, the hitch receiver 2430, the intermediate plate 2434, and/or the lateral support bar 2436 are releasably coupled together (e.g., with fasteners, etc.). In an alternative embodiment, the rear cross member 2410, the support plates 2428, the hitch receiver 2430, the intermediate plate 2434, and/or the lateral support bar 2436 are integrally formed.

As shown in FIGS. 21-23, the left attachment member 2440 includes a body, shown as left end plate 2442, having a first surface, shown as upper edge 2444, and an opposing second surface, shown as lower edge 2446. As shown in FIGS. 22 and 23, the left flange 2418 of the upper plate 2414 and the left flange of the lower plate 2416 are positioned to receive the left end plate 2442 such that the left flange 2418 of the upper plate 2414 engages the upper edge 2444 of the left end plate 2442 and the left flange of the lower plate 2416 engages the lower edge 2446 of the left end plate 2442. According to an exemplary embodiment, the rear cross member 2410 and the left end plate 2442 are fixedly coupled together (e.g., welded, etc.). In other embodiments, the rear cross member 2410 and the left end plate 2442 are releasably coupled together (e.g., with fasteners, etc.). In an alternative embodiment, the rear cross member 2410 and the left end plate 2442 are integrally formed. As shown in FIGS. 22 and 23, the left end plate 2442 defines a plurality of apertures, shown as left apertures 2448.

As shown in FIGS. 21-23, the right attachment member 2470 includes a body, shown as right end plate 2472, having a first surface, shown as upper edge 2474, and an opposing second surface, shown as lower edge 2476. As shown in FIGS. 22 and 23, the right flange 2420 of the upper plate 2414 and the right flange of the lower plate 2416 are positioned to receive the right end plate 2472 such that the right flange 2420 of the upper plate 2414 engages the upper edge 2474 of the right end plate 2472 and the right flange of the lower plate 2416 engages the lower edge 2476 of the right end plate 2472. As shown in FIGS. 21-23, the rear cross member 2410 extends between the left end plate 2442 and the right end plate 2472. According to an exemplary embodiment, the rear cross member 2410 and the right end plate 2472 are fixedly coupled together (e.g., welded, etc.). In other embodiments, the rear cross member 2410 and the right end plate 2472 are releasably coupled together (e.g., with fasteners, etc.). In an alternative embodiment, the rear cross member 2410 and the right end plate 2472 are integrally formed. As shown in FIGS. 22 and 23, the right end plate 2472 defines a plurality of apertures, shown as right apertures 2478.

As shown in FIG. 21, the left end plate 2442 is positioned within, and releasably received by, the left C-channel 2108 of the left frame rail 2100. According to an exemplary embodiment, the left apertures 2448 of the left end plate 2442 are positioned to correspond and align with the rear apertures 2112 of the base plate 2102 of the left frame rail 2100. According to an exemplary embodiment, the fasteners 2116 are configured to be received by the rear apertures 2112 of the base plate 2102 of the left frame rail 2100 and the left apertures 2448 of the left end plate 2442 to facilitate releasably coupling the left end plate 2442 and the rear cross member 2410 to the left frame rail 2100.

As shown in FIG. 21, the right end plate 2472 is positioned within, and releasably received by, the right C-channel 2128 of the right frame rail 2120. According to an exemplary embodiment, the right apertures 2478 of the right end plate 2472 are positioned to correspond and align with the rear apertures of the base plate 2122 of the right frame rail 2120. According to an exemplary embodiment, the fasteners 2136 are configured to be received by the rear apertures of the base plate 2122 of the right frame rail 2120 and the right apertures 2478 of the right end plate 2472 to facilitate releasably coupling the right end plate 2472 and the rear cross member 2410 to the right frame rail 2120.

As shown in FIGS. 21-23, the left attachment member 2440 includes a first interface (e.g., an aperture, etc.), shown as left tow eye 2450, and a second interface (e.g., an aperture, etc.), shown left tie down 2452, extending from the left end plate 2442. As shown in FIG. 21, the left tow eye 2450 and the left tie down 2452 are positioned such that the left tow eye 2450 and the left tie down 2452 extend from the rear end 2016 of the left C-channel 2108 of the left frame rail 2100. As shown in FIGS. 21-23, the right attachment member 2470 includes a first interface (e.g., an aperture, etc.), shown as right tow eye 2480, and a second interface (e.g., an aperture, etc.), shown right tie down 2482, extending from the right end plate 2472. As shown in FIG. 21, the right tow eye 2480 and the right tie down 2482 are positioned such that the right tow eye 2480 and the right tie down 2482 extend from the rear end 2016 of the right C-channel 2128 of the right frame rail 2120.

According to an exemplary embodiment, the left tow eye 2450 and the right tow eye 2480 are configured to facilitate (i) towing (e.g., pushing, pulling, etc.) an object and/or another vehicle with the vehicle 10 and/or (ii) towing the vehicle 10. By way of example, the left tow eye 2450 and/or the right tow eye 2480 may receive a chain, a rope, and/or a strap to connect the rear end 2016 of the frame assembly 2012 to an object and/or another vehicle 10. According to an exemplary embodiment, the left tow eye 2450, the right tow eye 2480, the left tie down 2452, and/or the right tie down 2482 are configured to facilitate securing the rear end 2016 of the frame assembly 2012 and/or the vehicle 10 to a surface or object. By way of example, the left tow eye 2450, the right tow eye 2480, the left tie down 2452, and/or the right tie down 2482 may receive a chain, a rope, and/or a strap to secure the rear end 2016 of the frame assembly 2012 and/or the vehicle 10 to the platform of a rail car, the floor of an aircraft carrier, the bed of a trailer, etc.

Axle Forward Mechanical Arrangement

Figure 24:
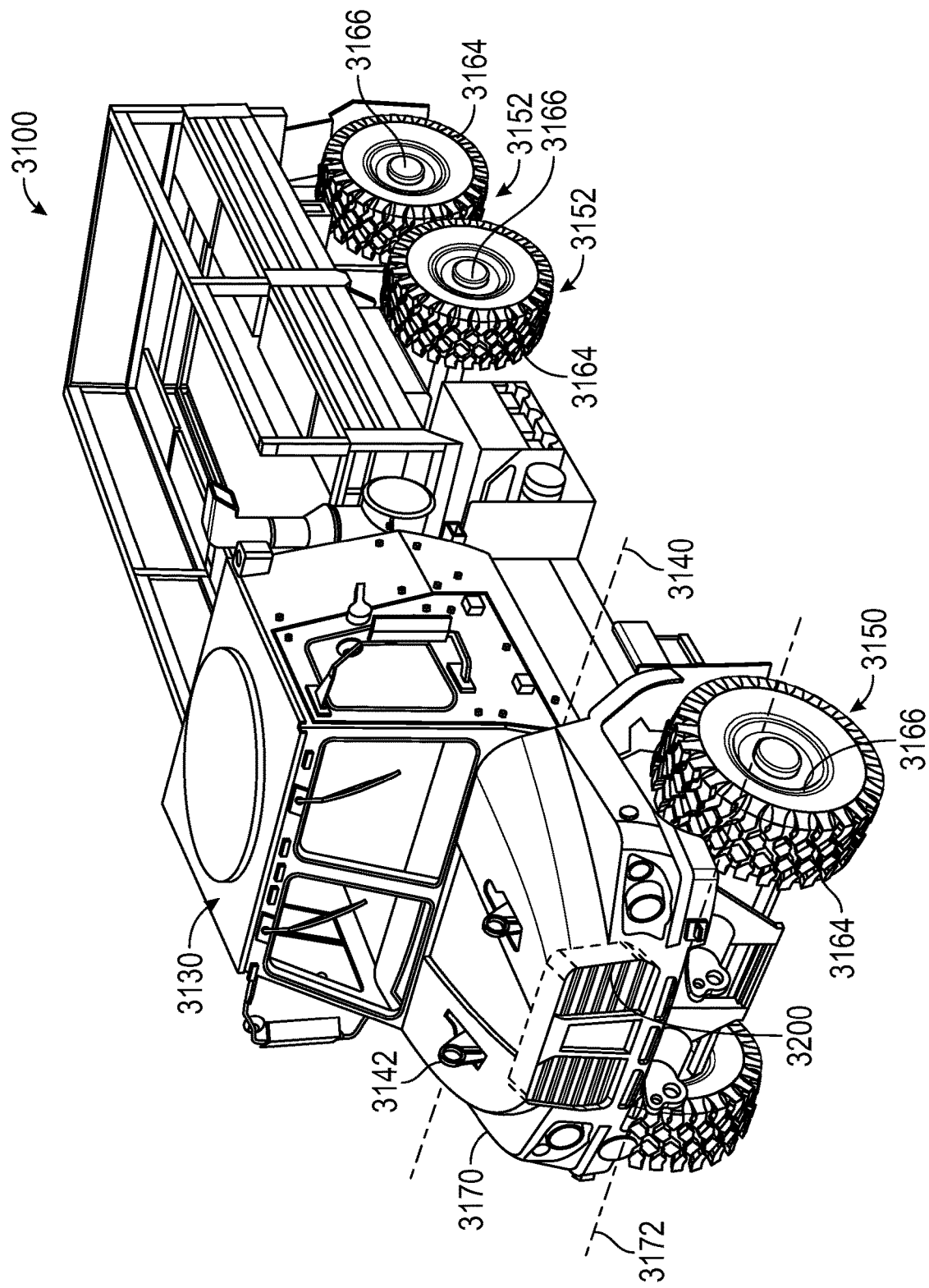
FIG. 24 is a perspective view of a vehicle, according to an exemplary embodiment.
Figure 25:
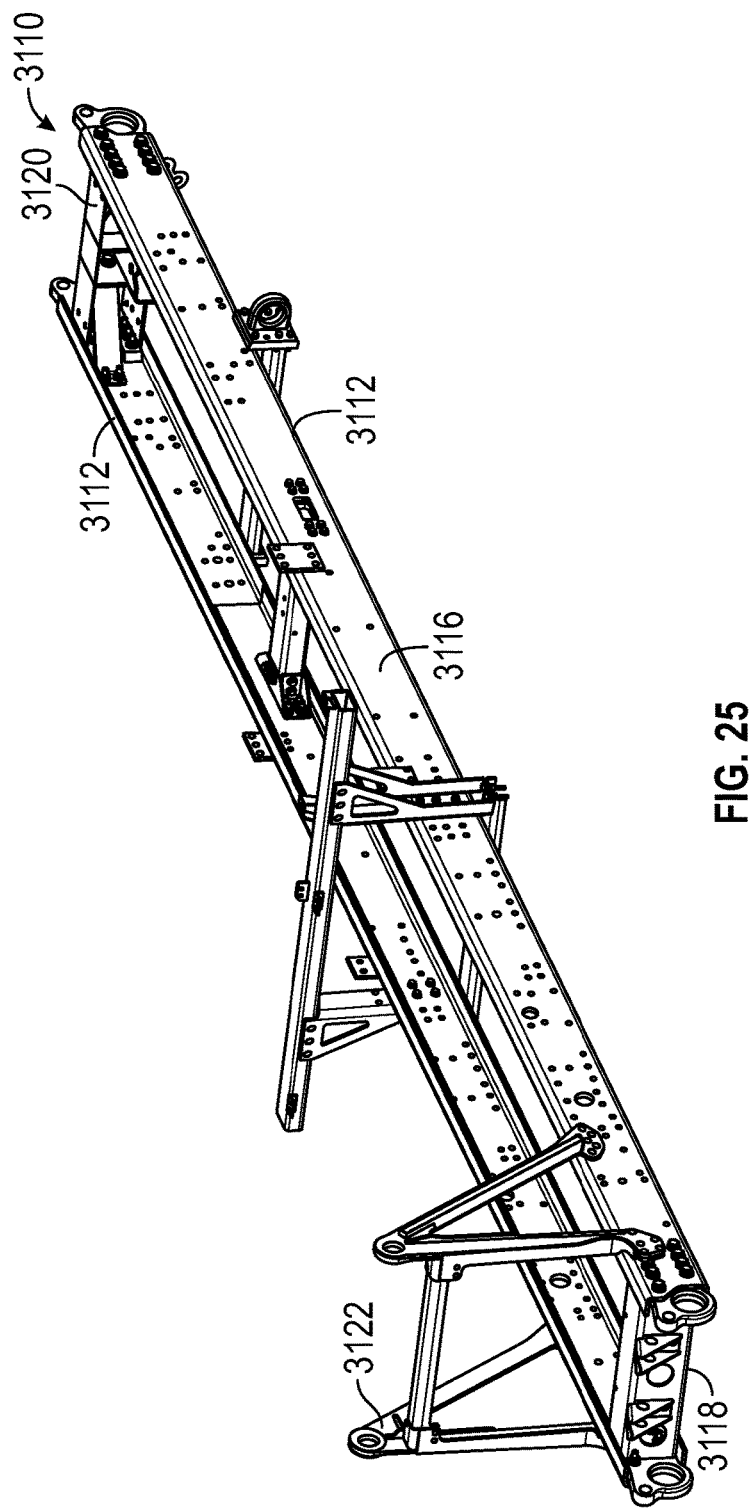
FIG. 25 is a perspective view of a frame of the vehicle of FIG. 24, according to an exemplary embodiment.
Figure 26:
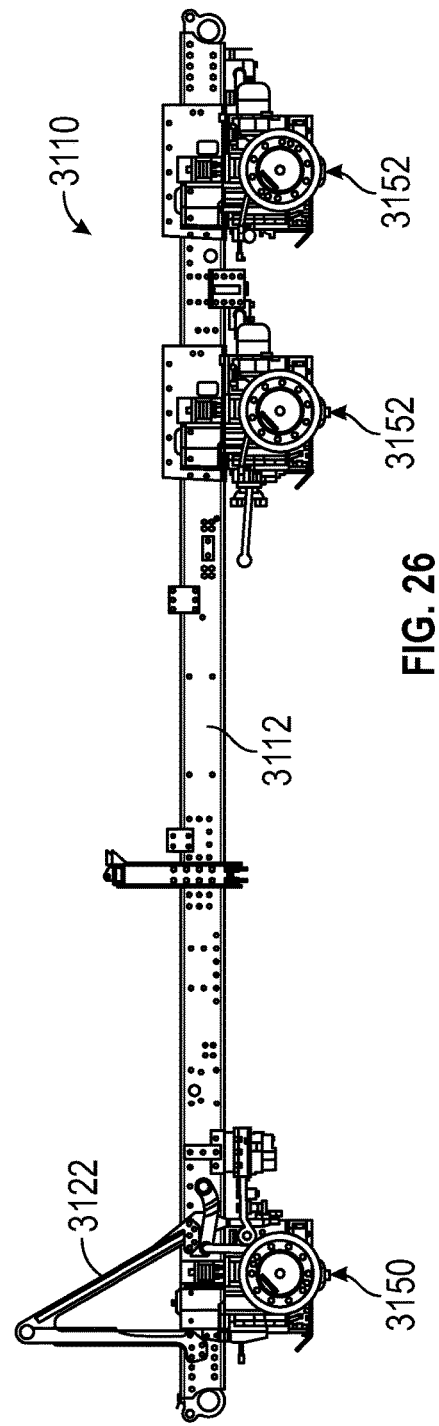
FIG. 26 is a side view of the frame of FIG. 25, according to an exemplary embodiment.

Referring to FIGS. 24-32, a vehicle 3100 is shown. Unless otherwise specified, the vehicle 3100 may be substantially similar to the vehicle 10. Referring to FIGS. 25 and 26, the vehicle 3100 includes a chassis, shown as frame 3110. The frame 3110 includes a pair of longitudinal members, shown as frame rails 3112, extending along the length of the vehicle 3100. As shown, the frame rails 3112 are formed from a C-shaped channel. The C-shape includes a base section 3116, to which other components are coupled (e.g., using fasteners, etc.). The frame 3110 further includes a front cross member 3118 and a rear cross member 3120 disposed between and coupled to both frame rails 3112. A front lift structure 3122 is coupled to both frame rails 3112 and extends upwards. The front lift structure 3122 provides a pair of points from which to lift the vehicle 3100 (e.g., using a crane, a helicopter, etc.).

Referring to FIGS. 24 and 27-32, the vehicle 3100 includes a cabin, shown as front cabin 3130. The front cabin 3130 is coupled to the frame 3110. The front cabin 3130 is configured to contain one or more operators during operation of the vehicle 3100. According to an exemplary embodiment, the front cabin 3130 includes one or more doors, shown as doors 3132, that facilitate entering and exiting an interior of the front cabin 3130. The interior of the front cabin 3130 may include a plurality of seats (e.g., two, three, four, five, etc.), vehicle controls, driving components (e.g., steering wheel, accelerator pedal, brake pedal, etc.), etc. The interior of the front cabin 3130 is disposed between a frontmost surface 3134 and a rearmost surface 3136 of the front cabin 3130. The frontmost surface 3134 is defined by a front wall of the front cabin 3130, and the rearmost surface 3136 is defined by a rear wall of the front cabin 3130. As shown in FIG. 24, the front cabin 3130 is pivotable about an axis 3140 extending laterally across the vehicle 3100. In other embodiments, the front cabin 3130 is fixed to the frame 3110. The vehicle 3100 may include an actuator (e.g., a hydraulic actuator, a pneumatic actuator, etc.) configured to rotate the front cabin 3130 about the axis 3140 between a lowered position (shown in FIG. 24) and a raised position. Rotating the front cabin 3130 to the raised position facilitates accessing the components (e.g., an engine, etc.) underneath the front cabin 3130.

The front cabin 3130 may be configured to receive an armor kit that includes a number of armor panels. The armor panels can be coupled to the exterior surfaces (e.g., the left and right sides, the bottom, etc.) of the front cabin 3130 to increase the level of protection afforded by the front cabin 3130 during a blast event, contact with a projectile, etc. When operating the vehicle 3100 in a situation where armor is not necessary, the armor panels may be removed from the front cabin 3130. Accordingly, the front cabin 3130 may be outfitted with connection points (e.g., built-in threaded fasteners, etc.) to facilitate quick removal or addition of armor panels throughout the life of the vehicle 3100.

Figure 27:
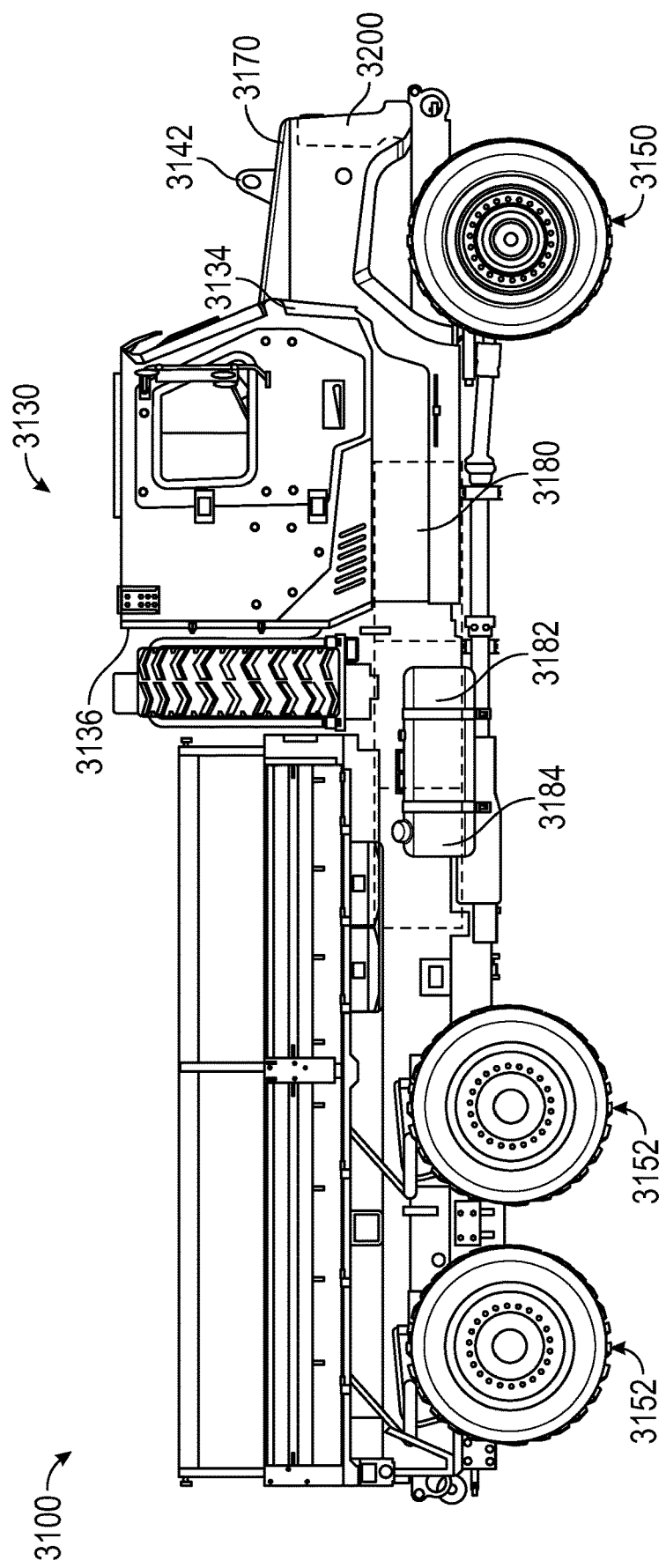
FIG. 27 is a side view of the vehicle of FIG. 24, according to an exemplary embodiment.
Figure 28:
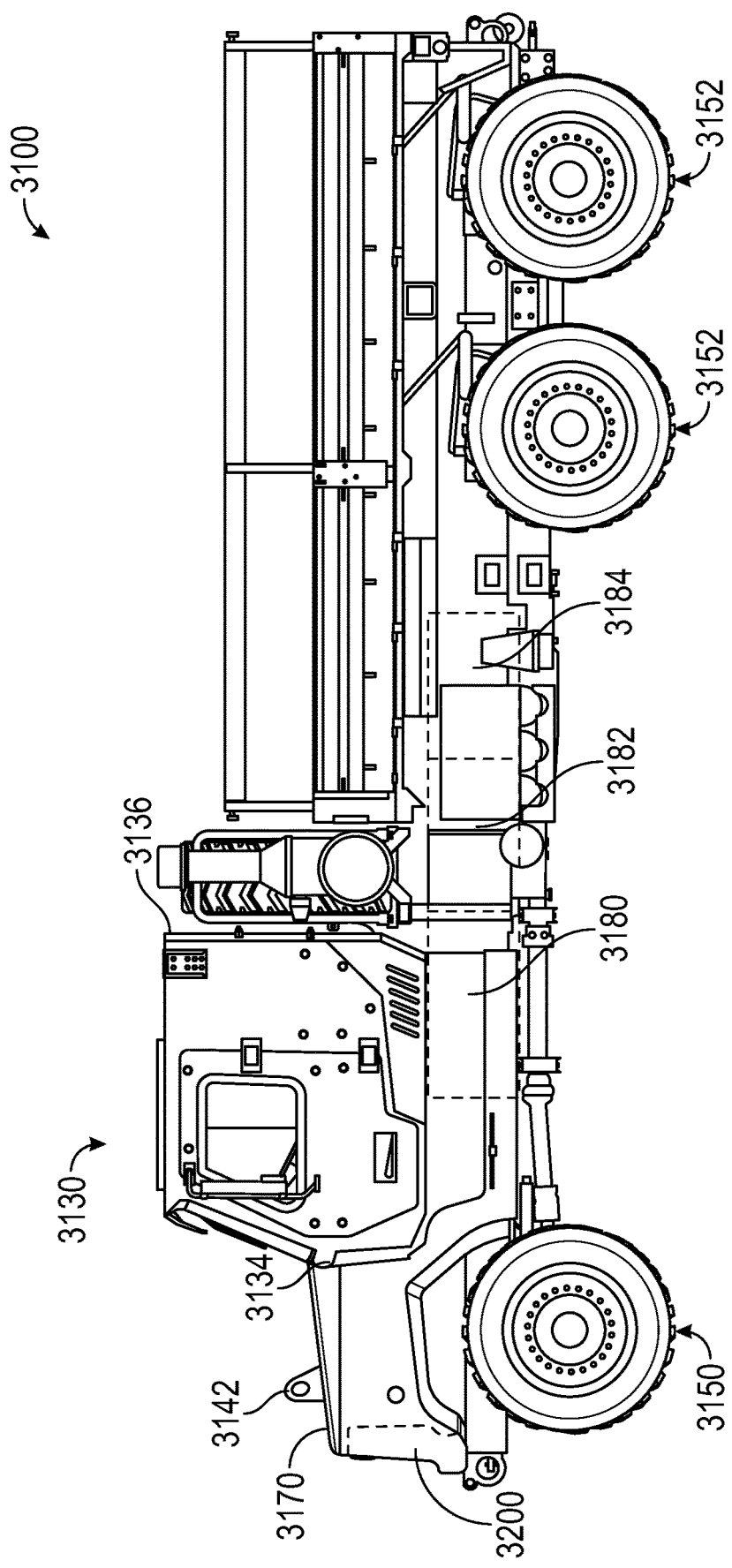
FIG. 28 is a side view of the vehicle of FIG. 24, according to an exemplary embodiment.
Figure 29:
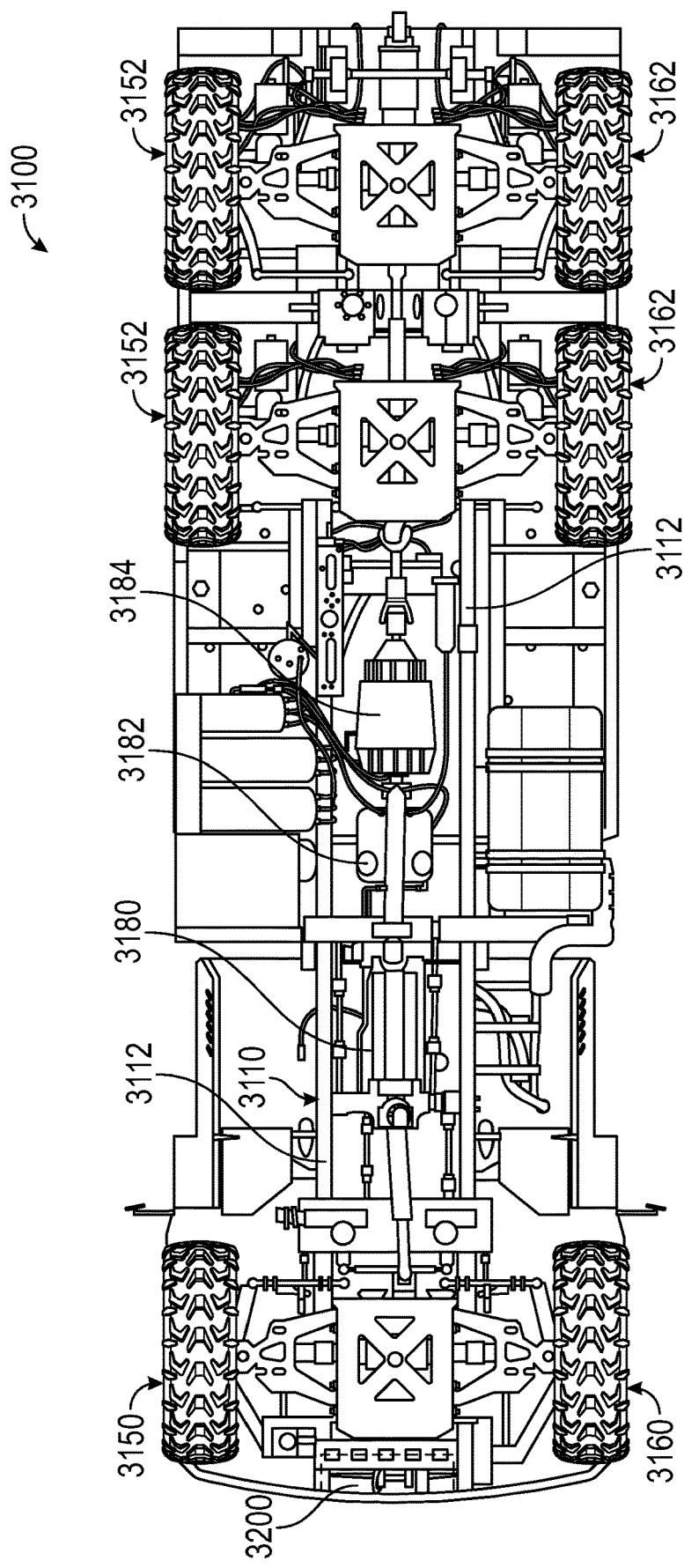
FIG. 29 is a bottom view of the vehicle of FIG. 24, according to an exemplary embodiment.

Referring to FIGS. 24 and 27-29, the vehicle 3100 includes a front tractive assembly, shown as front axle assembly 3150, and a pair of rear tractive assemblies, shown as rear axle assemblies 3152. In other embodiments, the vehicle 3100 includes one or more rear axle assemblies 3152. The front and rear axle assemblies 3150, 3152 may be substantially similar to the front and rear tractive assemblies 40, 42. As shown in FIG. 26, each axle assembly 3150, 3152 is coupled to the base sections 3116 of the frame rails 3112 (e.g., using side plates, etc.). As shown in FIG. 28, a central axis of the front axle assembly 3150 (i.e., a lateral axis passing through the center of the front axle assembly 3150) is disposed entirely forward of the front cabin 3130 (i.e., forward of the frontmost surface 3134). The rear axle assemblies 3152 are disposed rearward of the front cabin 3130, under the mission equipment (e.g., the mission equipment 30, etc.). The front axle assembly 3150 includes a pair of tractive elements, shown as front wheel and tire assemblies 3160. Each rear axle assembly 3152 includes a pair of tractive elements, shown as rear wheel and tire assemblies 3162. Each wheel and tire assembly 3160, 3162 includes a tire 3164 configured to provide traction with the ground and a wheel 3166 coupling the tire to the rest of the axle assembly. As shown in FIGS. 28 and 29, the front and rear wheel and tire assemblies 3160 and 3162 are the same size (e.g., the same diameter, the same width, etc.).

Figure 30:
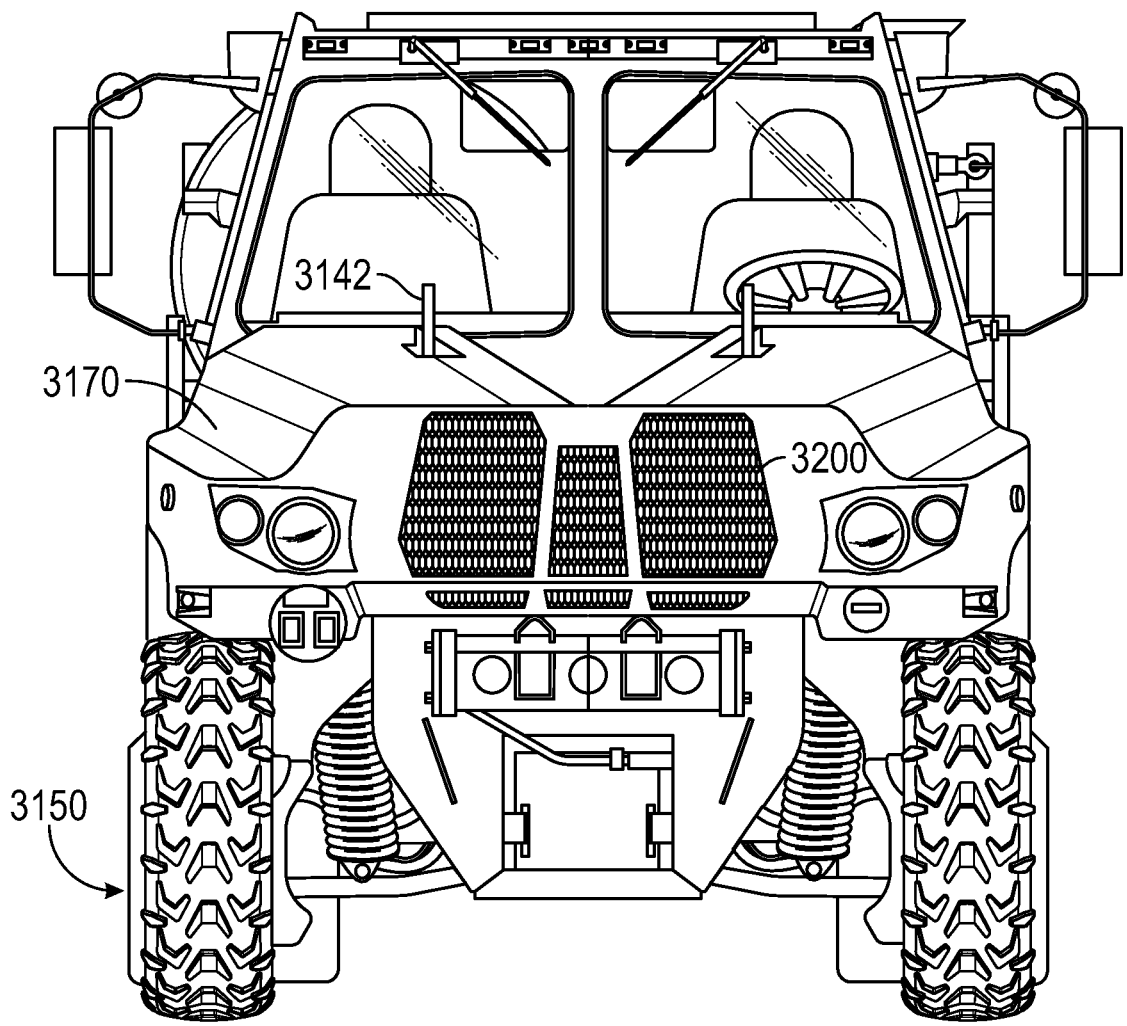
FIG. 30 is a front view of the vehicle of FIG. 24, according to an exemplary embodiment.
Figure 31:
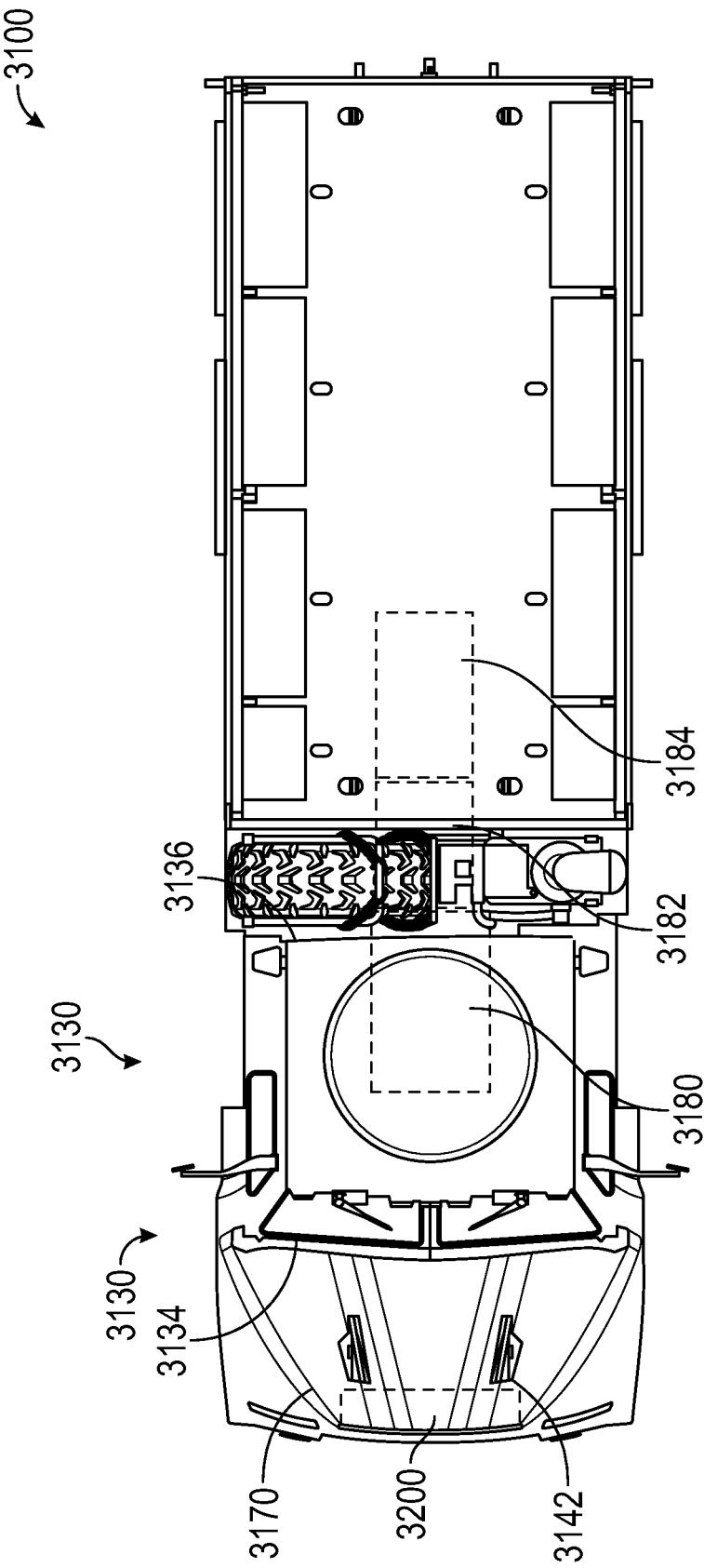
FIG. 31 is a top view of the vehicle of FIG. 24, according to an exemplary embodiment.
Figure 32:
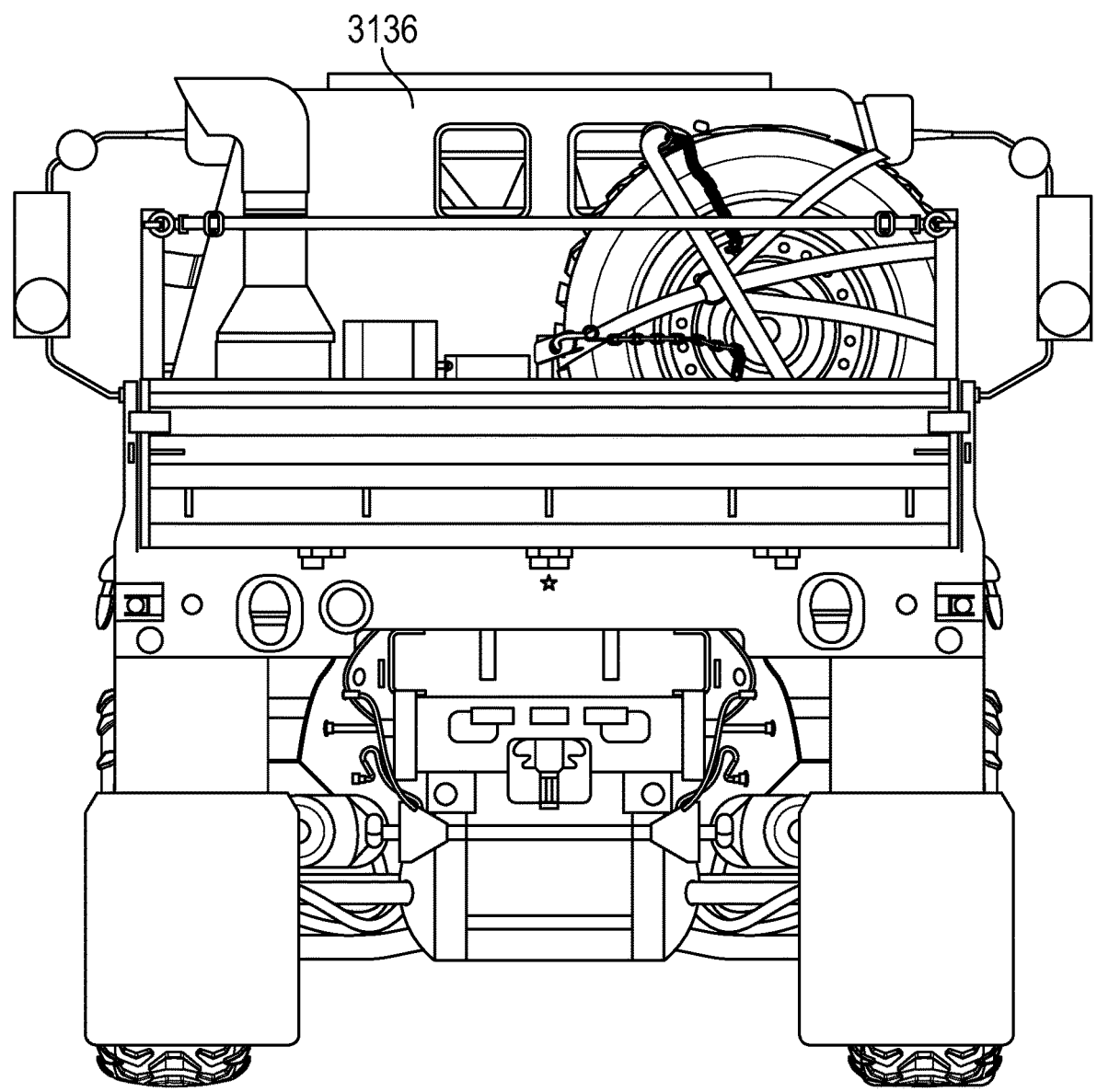
FIG. 32 is a rear view of the vehicle of FIG. 24, according to an exemplary embodiment.

Referring to FIGS. 24 and 30, the vehicle 3100 includes a body component, shown as hood 3170. The hood 3170 is disposed immediately forward of the front cabin 3130 and above the front axle assembly 3150. In some embodiments, the hood 3170 defines a frontmost surface of the vehicle 3100 or of a portion of the vehicle 3100 (e.g., the hood 3170 defines a frontmost surface above the front wheel and tire assemblies 3160, etc.). The hood 3170 may be configured to rotate about an axis 3172 extending laterally across the vehicle 100. Such rotation may facilitate forward movement of the front cabin 3130 without obstruction from the hood 3170. The hood 3170 is rotatable between a closed position (shown in FIG. 24) and an open position where the hood 3170 is rotated forward. The front lift structure 3142 extends through the hood 3170 such that the front lift structure 3142 may be accessed without moving the hood 3170 to the open position. The hood 3170 may provide a structure to support and/or contain various components of the vehicle 3100 (e.g., headlights, the radiator 3200, etc.).

Referring to FIGS. 27-29 and 31, the vehicle 3100 includes a powertrain system that includes a primary driver, shown as engine 3180, a transmission 3182, and a transfer case 3184. The engine 3180 is configured to consume stored energy from an energy source (e.g., chemical energy stored in fuel, electrical energy stored in a battery, etc.) provide a power output to the transmission 3182 to drive the vehicle 3100. The engine 3180 may be configured to provide power to drive one or more of the front and rear axle assemblies 3150, 3152. The transmission 3182 may be configured to adjust the speed of the engine power output and provide a power output to the transfer case 3184. The transfer case 3184 may split the power output from the transmission 3182 and provide power to the front and/or rear axle assemblies 3150, 3152 (e.g., via one or more drive shafts, etc.).

Referring still to FIGS. 27-29 and 31, the engine 3180, the transmission 3182, and the transfer case 3184 are arranged in line with one another. The engine 3180, the transmission 3182, and the transfer case 3184 are located between the frame rails 3112 and may be located along a vertical plane centered laterally along the vehicle 3100. As shown in FIGS. 27 and 28, the engine 3180 is disposed entirely behind the frontmost surface 3134 of the front cabin 3130. A portion of the engine 3180 (e.g., 10% of the engine 180, 20% of the engine 180, etc.) may be disposed behind the rearmost surface 3136 of the front cabin 3130. In some embodiments, the majority of the engine 3180 is disposed directly below the front cabin 3130 when the front cabin 3130 is in the lowered position. Moving the front cabin 3130 to the raised position facilitates access to the top of the engine 3180 (e.g., for maintenance, etc.) without having to disassemble the vehicle 3100. The transmission 3182 may be disposed rearward of the engine 3180. The transfer case 3184 may be disposed rearward of the transmission 3182. Placement of the engine 3180 and other components of the powertrain system rearward of the frontmost surface 3134 distributes their weight more evenly between the front and rear axle assemblies 3150, 3152 and opens a space under the hood 3170 for the front lift structure 3142.

Referring to FIG. 30, the vehicle 3100 includes a radiator 3200 disposed near the front end of the vehicle 3100. The radiator 3200 may be fluidly coupled to the engine 3180 and configured to transfer thermal energy from the engine 3180 to the air surrounding the vehicle 3100. The radiator 3200 may be exposed or covered with a permeable grill at the front end of the vehicle 3100 such that air passes through the radiator 3200, increasing its effectiveness when the vehicle 3100 drives forward. In some embodiments, the vehicle 3100 includes a fan to force air through the radiator 3200. Referring to FIG. 24, the radiator 3200 is located inside the hood 3170, with the hood 3170 partially cutaway to expose the radiator 3200. The radiator 3200 may be located forward of the front lift structure 3142 and/or the central axis of the front axle assembly 3150.

In some conventional vehicles, the front cabin is located directly above the front axle assembly. The distribution of the weight of the front cabin, and any other component on the vehicle, between the various axle assemblies of the vehicle is a function of the distance between the weight (e.g., the front cabin) and each axle assembly. With a greater the distance between the weight and the axle assembly, the axle assembly will support less weight. By way of example, semi-trucks used in Europe often place the front cabin directly over the front axle assembly such that nearly all the weight of the front cabin is supported by the front axle assembly. The load of the front cabin is generally relatively minimal and constant (any cargo on a semi-truck is generally placed rearward of the front cabin), and the front axle assembly may be sized accordingly. However, in some military applications, such as the vehicle 3100, the front cabin is armored, drastically increasing the weight of the front cabin. The vehicle 3100 is arranged with the front axle assembly 3150 positioned forward of the front cabin 3130 (i.e., in an axle-forward arrangement) and the powertrain system, which more evenly distributes the weight among the front and rear axle assemblies 3150, 3152 and reduces the load on the front axle assembly 3150 relative to conventional arrangements.

The reduction of load on the front axle assembly 3150 facilitates incorporating components rated for lesser loads. In some embodiments, the front axle assembly 3150 and rear axle assemblies 3152 each use axles rated to support the same or similar loads (e.g., 15,000 lbs., 20,000 lbs., 25,000 lbs., etc.). The front and rear axle assemblies 3150, 3152 may each use other components (e.g., springs, bearings, dampers, etc.) that are the same or similar for all of the axle assemblies 3150, 3152. The position of the front cabin 3130 thereby facilitates using one set of parts for all of the axle assemblies, reducing the amount of unique parts necessary to stock for maintenance of the vehicle 3100.

Some vehicles, including military vehicles, may be required to traverse terrain having a loosely packed surface, such as soft soil or sand. Supporting a significantly larger portion of the vehicle weight on one axle assembly than on another axle assembly increases the likelihood that one or more tires will sink into the surface of the terrain. Such sinking reduces the handling and performance of the vehicle as it forces its way through the terrain. Increasing the size of the vehicle tires (e.g., the diameter, the width, etc.) can reduce the sinking effect by applying the weight of the vehicle over a larger surface area. However, increasing the size of one set of wheels without increasing the size of the others requires the wheels on each axle to rotate at different speeds to achieve the same effective linear speed. Increasing the diameter of the wheels requires the body of the vehicle to sit higher to achieve the same amount of suspension travel. This raises the center of gravity of the vehicle, decreasing stability. The axle forward arrangement of the vehicle 3100 distributes the weight of the front cabin 3130 and powertrain system components between the front and rear axle assemblies 3150, 3152. The tires 3164 may be the same, minimal size (e.g., width and/or diameter), enabling the vehicle 3100 to pass through loose soil without raising the center of gravity of the vehicle 3100 to accommodate larger tires 3164.

The axle forward arrangement of the vehicle 3100 increases the ride quality for the passengers riding in the front cabin 3130. Moving the front cabin 3130 away from the front axle assembly 3150 reduces the effect of a disturbance (e.g., driving over a bump, etc.) experienced by the front axle assembly 3150 on the front cabin 3130. By way of example, a vertical displacement near the front end of the frame 3110 (e.g., caused by the front axle assembly 3150 driving over a bump, etc.) results in a smaller displacement near the middle of the frame 3110 and an even smaller displacement near the back of the frame 3110.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle comprising:
    a chassis having a first end and an opposing second end, the chassis including:
        a first frame rail defining a first channel;
        a second frame rail defining a second channel, the second frame rail spaced from the first frame rail; and
        a cross member assembly coupled to the first end of the frame and extending between the first frame rail and the second frame rail, the cross member assembly including:
            a first end plate positioned within, and releasably received by, the first channel of the first frame rail;
            a second end plate positioned within, and releasably received by, the second channel of the second frame rail; and
            a cross member extending between the first end plate and the second end plate;
    a rear axle assembly coupled to the chassis;
    a front axle assembly coupled to the chassis;
    a cabin coupled to the chassis, the cabin having a frontmost surface; and
    an engine configured to drive at least one of the front axle assembly and the rear axle assembly, the engine disposed entirely rearward of the frontmost surface of the cabin;
    wherein a central axis of the front axle assembly is disposed entirely forward of the frontmost surface of the cabin.

2. The vehicle of claim 1, wherein the cabin is pivotable relative to the chassis between a lowered position and a raised position.

3. The vehicle of claim 1, wherein a majority portion of the engine is disposed directly beneath the cabin.

4. The vehicle of claim 1, further comprising a transmission directly coupled to the engine and positioned rearward thereof.

5. The vehicle of claim 4, further comprising a transfer case directly coupled to the transmission and positioned rearward thereof, the transfer case configured to facilitate providing power from the engine to at least one of the rear axle assembly and the front axle assembly.

6. The vehicle of claim 1, wherein the chassis includes:
    a frame liner selectively coupled to an interior surface of the first frame rail and the second frame rail; and
    a front lift structure coupled to the chassis;

wherein first frame rail and the second frame rail have a first length;

wherein the first frame rail and the second frame rail are a first set of frame rails;

wherein the first set of frame rails is interchangeable with a second set of frame rails having a second length different than the first length to facilitate producing different vehicle variants;

wherein the frame liner is a first frame liner having a third length;

wherein at least one of (i) a position of the first frame liner is variable based on a respective vehicle variant and (ii) the first frame liner is interchangeable with a second frame liner having a fourth length different than the third length based on the respective vehicle variant; and wherein the front lift structure is positioned in a consistent location relative to the first end of the chassis regardless of a length of the chassis and the respective vehicle variant.

7. The vehicle of claim 6, further comprising a rear lift structure coupled to the chassis rearward of the front lift structure, wherein the rear lift structure is positioned in a variable location relative to the first end of the chassis based on the respective vehicle variant.

8. The vehicle of claim 6, wherein the front axle assembly is coupled to the chassis directly beneath the front lift structure.

9. The vehicle of claim 6, further comprising a reinforcement assembly coupled to an exterior surface of the chassis based on the respective vehicle variant, the reinforcement assembly including at least one longitudinal reinforcement member and a plurality of plates coupled to the at least one longitudinal reinforcement member, the plurality of plates coupled directly to the exterior surface of the chassis along the length of the chassis.

10. The vehicle of claim 6, further comprising an accessory bracket coupled to the chassis rearward of the front lift structure, wherein the accessory bracket is positioned in a consistent location relative to the first end of the chassis regardless of the length of the chassis and the respective vehicle variant.

11. The vehicle of claim 1, wherein the cross member is a first cross member, wherein the chassis includes a second cross member coupled to the opposing second end of the chassis and extending between the first frame rail and the second frame rail, wherein the second cross member is or is not releasably coupled to the chassis.

12. The vehicle of claim 1, wherein the first end plate defines a first tow eye and the second end plate defines a second tow eye, and wherein the first end plate defines a first tie down and the second end plate defines a second tie down.

13. The vehicle of claim 1, wherein the first end plate defines a first plurality of apertures positioned to facilitate releasably coupling the first end plate to the first frame rail with a first plurality of fasteners, and wherein the second end plate defines a second plurality of apertures positioned to facilitate releasably coupling the second end plate to the second frame rail with a second plurality of fasteners.

14. The vehicle of claim 1, wherein the cross member has (i) a first extension positioned to interface with and is coupled to the first end plate and (ii) a second extension positioned to interface with and is coupled to the second end plate.

15. The vehicle of claim 1, wherein the cross member assembly is a first cross member assembly, further comprising a second cross member assembly coupled to the opposing second end of the frame and extending between the first frame rail and the second frame rail, wherein the first cross member assembly has a different structure than the second cross member assembly.

16. The vehicle of claim 15, wherein the second cross member assembly includes:
a third end plate positioned within, and releasably received by, the first channel of the first frame rail;
a fourth end plate positioned within, and releasably received by, the second channel of the second frame rail;
a second cross member extending between the third end plate and the fourth end plate, the second cross member defining an aperture; and
a receiver positioned to align with the aperture and extend from the second cross member, the receiver configured to selectively and slidably receive a towing mechanism.

17. The vehicle of claim 16, wherein the second cross member assembly further includes at least one support plate extending from the second cross member to the receiver.

18. The vehicle of claim 17, wherein the second cross member assembly further includes an intermediate plate extending along an upper surface of the receiver between the third end plate and the fourth end plate.

19. The vehicle of claim 17, wherein the second cross member includes (i) a first bracket extending between the first frame rail and the at least one support plate and (ii) a second bracket extending between the second frame rail and the at least one support plate.

* * * * *